(12) United States Patent
Horii et al.

(10) Patent No.: US 7,374,320 B2
(45) Date of Patent: May 20, 2008

(54) VEHICULAR HEADLAMP APPARATUS

(75) Inventors: Yasutoshi Horii, Nagoya (JP); Junichi Hasegawa, Kariya (JP); Toshio Sugimoto, Okazaki (JP)

(73) Assignee: Denso Corporation, Kariya (JP)

( * ) Notice: Subject to any disclaimer, the term of this patent is extended or adjusted under 35 U.S.C. 154(b) by 274 days.

(21) Appl. No.: 11/194,727

(22) Filed: Aug. 2, 2005

(65) Prior Publication Data
US 2006/0028832 A1 Feb. 9, 2006

(30) Foreign Application Priority Data
Aug. 6, 2004 (JP) ............... 2004-231383
May 13, 2005 (JP) ............... 2005-140658

(51) Int. Cl.
*B60Q 1/00* (2006.01)
*B60Q 1/02* (2006.01)
*F21V 1/00* (2006.01)

(52) U.S. Cl. ............ 362/466; 362/460; 362/464; 362/465; 315/82

(58) Field of Classification Search ............. 362/460, 362/464–466; 315/82
See application file for complete search history.

(56) References Cited

U.S. PATENT DOCUMENTS 5,588,733 A * 12/1996 Gotou ................ 362/37
5,931,572 A * 8/1999 Gotoh ................ 362/466
6,010,237 A * 1/2000 Gotou ................ 362/460
6,633,027 B2 * 10/2003 Kobayashi et al. ...... 250/208.1
6,752,508 B2 * 6/2004 Kobayashi ............ 362/37
6,755,560 B2 * 6/2004 Horii ................. 362/466

FOREIGN PATENT DOCUMENTS

| JP | 61-211146 | 9/1986 |
| JP | 2-296550 | 12/1990 |
| JP | 2001-221332 | 8/2001 |

* cited by examiner

*Primary Examiner*—Sandra O'Shea
*Assistant Examiner*—Sean P Gramling
(74) *Attorney, Agent, or Firm*—Nixon & Vanderhye P.C.

(57) ABSTRACT

A control unit of a vehicular headlamp apparatus can selectively perform steering angle control and navigation-cooperative control. The steering angle control operates a drive mechanism based on a steering angle and a speed of a vehicle to control a headlamp's swivel angle. The navigation-cooperative control operates the drive mechanism using a navigation unit to control the swivel angle. When a current position of the vehicle reaches an entry control start point, the control unit starts navigation-cooperative control at the entry into a curved road. The control unit finds a target swivel angle based on a curvature radius and curved road direction information about the curved road. While the vehicle moves from the entry control start point to a curved road start point, the control unit operates the drive mechanism to gradually change the headlamp's swivel angle to the target swivel angle.

42 Claims, 36 Drawing Sheets

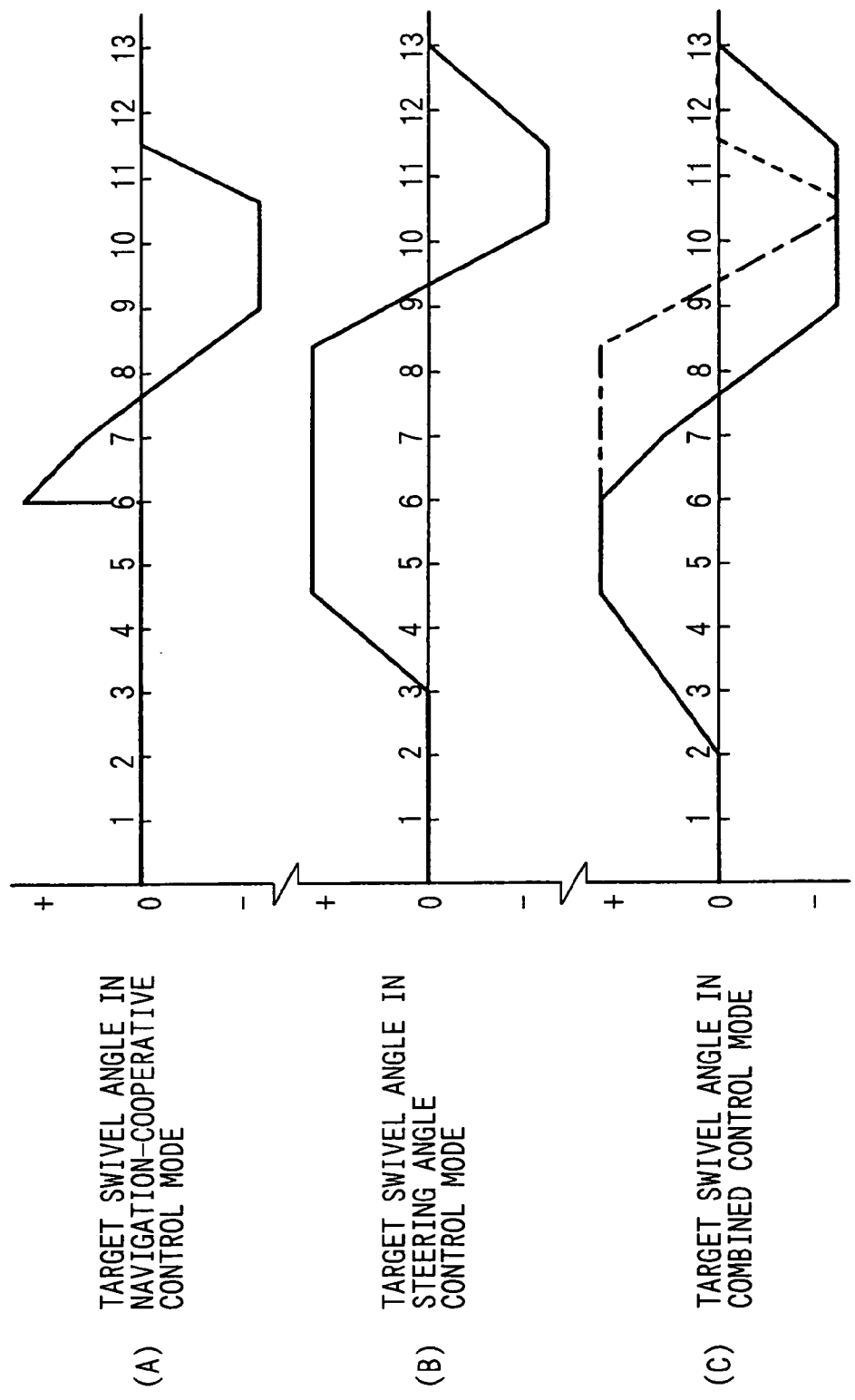

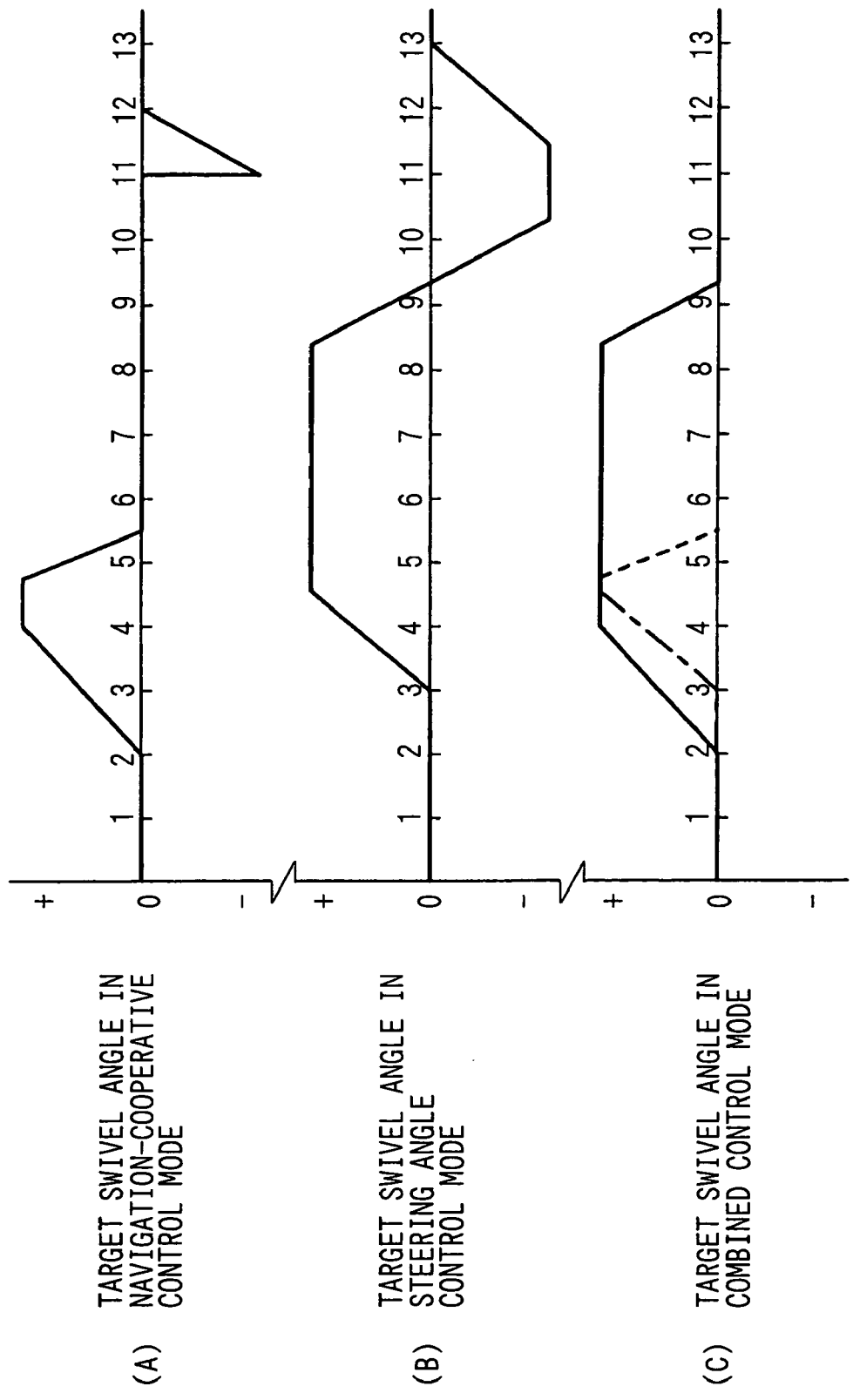

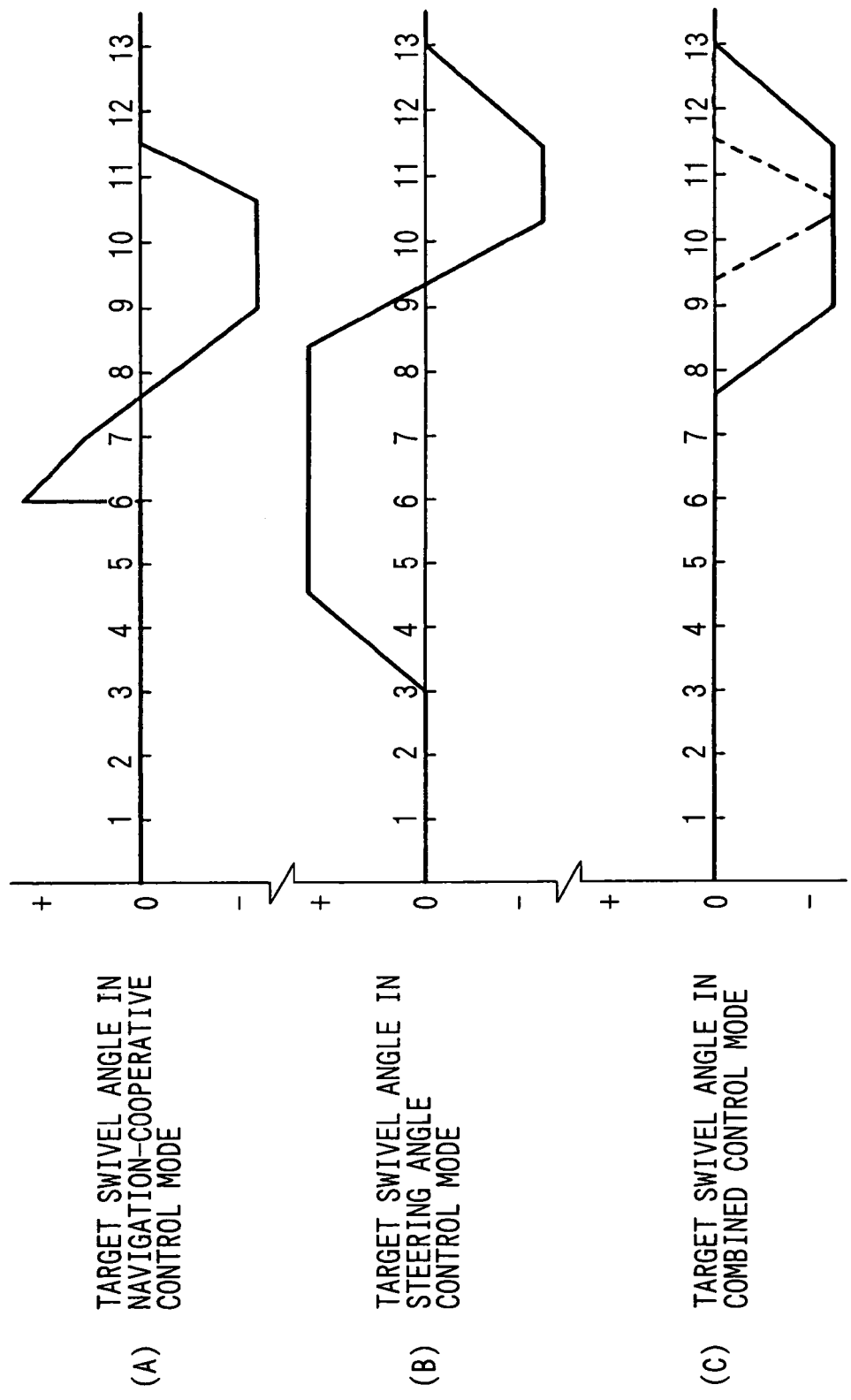

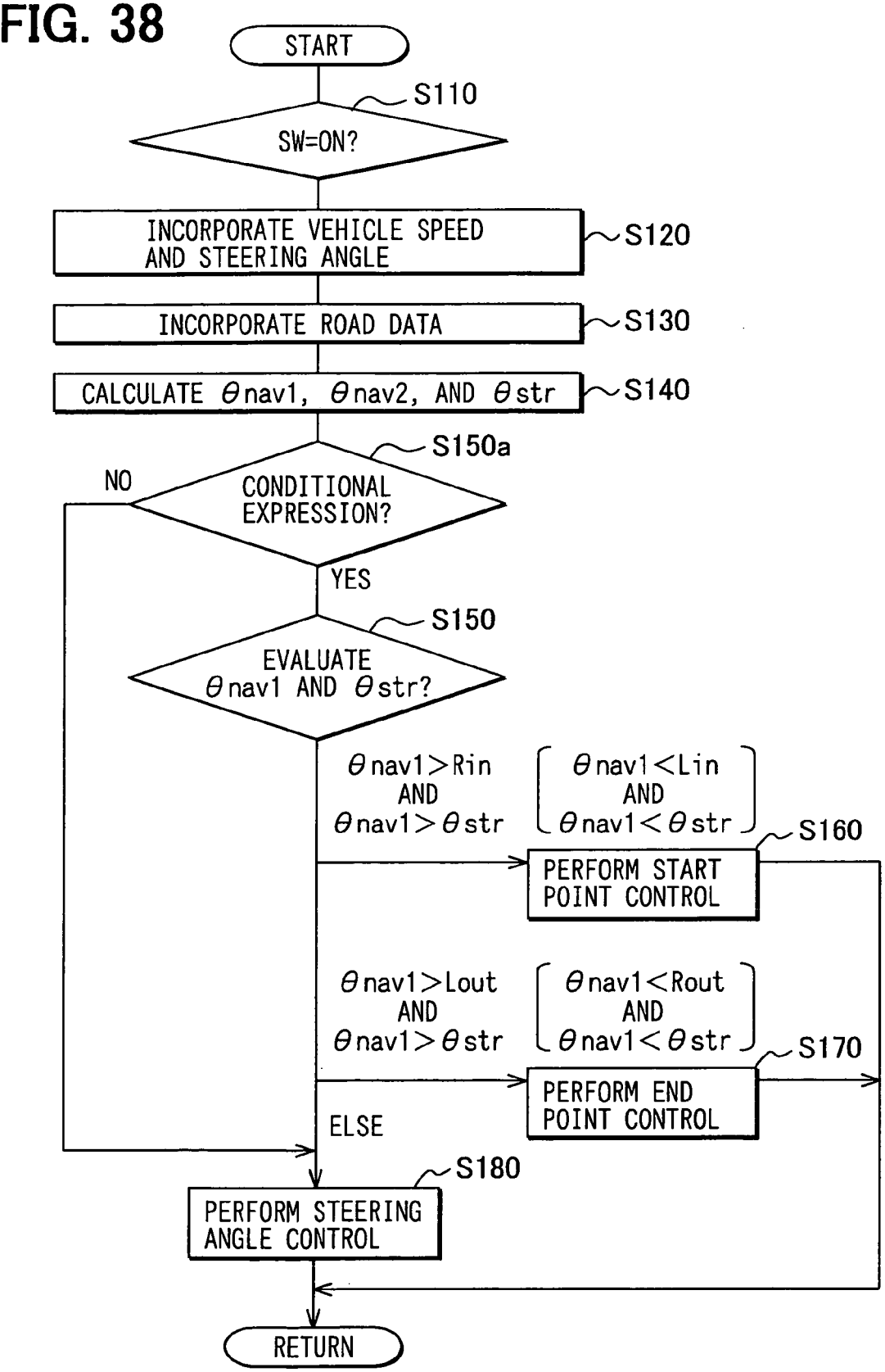

VEHICULAR HEADLAMP APPARATUS

CROSS REFERENCE TO RELATED APPLICATIONS

This application is based on and incorporates herein by reference Japanese Patent Applications No. 2004-231383 filed on Aug. 6, 2004, and No. 2005-140658 filed on May 13, 2005.

FIELD OF THE INVENTION

The present invention relates to a vehicle headlamp apparatus constructed to be capable of adjusting a swivel angle in an optical axis direction of a headlamp provided on the front of a vehicle.

BACKGROUND OF THE INVENTION

Conventionally, there has been available a vehicle headlamp apparatus for driving at night (e.g., see patent document 1). The apparatus can change a swivel angle in the optical axis direction (light distribution direction) of a headlamp at the vehicle front in response to a steering angle within an area approximately parallel to a road surface.

Generally, a driver drives a vehicle by visually checking a road forward in the traveling direction. When there is a curve in the vehicle's traveling direction, the driver feels wanting to visually check ahead of the curve before the vehicle enters the curve.

There may be a need for controlling a swivel angle according to the steering angle as mentioned above. The headlamp's light distribution direction does not follow the curve direction until the driver operates a steering system. Accordingly, the above-mentioned conventional vehicle headlamp apparatus may not sufficiently ensure the driver's visibility caused by the headlamp's light distribution.

To respond to changes in the curvature of a road shape ahead, there is proposed a vehicle headlamp apparatus based on navigation-cooperative control (e.g., see patent document 2). The apparatus is combined with a navigation system that associates position information obtained from a position detection unit such as the GPS (Global Positioning System) with map information. The apparatus is constructed to control the headlamp's swivel angles in cooperation with the navigation system. The vehicle headlamp apparatus based on navigation-cooperative control selectively enables a steering angle control mode and a navigation-cooperative control mode. The steering angle control mode controls optical axis directions for the headlamp in accordance with steering angles. This aims at concurrently providing stable control of headlamp's swivel angles during cornering and appropriate control of headlamp's swivel angles during curvature changes at entry into or exit from a corner.

There may be a case of changing between the steering angle control mode and the navigation-cooperative control mode in the above-mentioned vehicle headlamp apparatus based on navigation-cooperative control. In this case, the headlamp's swivel angle (light distribution direction) suddenly makes discontinuous changes, causing the driver to feel uncomfortably.

Patent document 1: JP-S61-211146A
Patent document 2: JP-3111153 B2 (U.S. Pat. No. 5,588, 733)

SUMMARY OF THE INVENTION

The present invention has been made in consideration of the foregoing. It is therefore an object of the present invention to provide a vehicle headlamp apparatus capable of helping prevent a headlamp's light distribution direction from being subject to sudden and discontinuous changes and capable of appropriately ensuring the driver's visibility.

A first aspect of the present invention provides a vehicle headlamp apparatus comprising:

a headlamp provided on a front of a vehicle;
a drive mechanism for horizontally moving the headlamp;
a steering angle detection unit for detecting a steering angle of the vehicle;
a position detection unit for detecting a position of the vehicle;
a speed detection unit for detecting a speed of the vehicle;
a navigation unit having a road database which stores a plurality of navigation points disposed according to road information; and
a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curved road end point to indicate an end of the curved road, a curvature radius of the curved road, and curved road direction information indicating whether the curved road is a right curved road or a left curved road and wherein the control unit is assigned a control setup distance to be used for the navigation-cooperative control;

wherein the control unit recognizes the vehicle to be traveling on a straight road and performs the steering angle control until a position detected by the position detection unit reaches an entry control start point positioned the control setup distance short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle ($\theta 1$) as a target angle for the swivel angle based on the curvature radius and the curved road direction information about the curved road and based on a speed detected by the speed detection unit;

wherein the control unit operates the drive mechanism to gradually change the swivel angle up to the target swivel angle ($\theta 1$) while a position detected by the position detection unit changes from the entry control start point to the curved road start point;

wherein the control unit reexecutes the steering angle control during or after execution of the navigation-cooperative control when a steering angle detected by the steering angle detection unit reaches the target swivel angle ($\theta 1$);

wherein the control unit recognizes the vehicle to be exiting from the curved road and starts the navigation-cooperative control at an exit from the curved road when a position detected by the position detection unit reaches an exit control start point positioned the control setup distance short of the curved road end point;

wherein, under the navigation-cooperative control, the control unit operates the drive mechanism to gradually change the swivel angle up to 0° while a position detected by the position detection unit changes from the exit control start point to the curved road end point; and wherein the control unit reexecutes the steering angle control during or after execution of the navigation-cooperative control when a steering angle detected by the steering angle detection unit reaches 0°.

The vehicle headlamp apparatus according to the present aspect is used when a vehicle travels with headlamps turned on. When the vehicle enters and exits from a curved road, the vehicle headlamp apparatus allows the control unit to perform the navigation-cooperative control. When the vehicle travels a straight road or the middle of a curved road, the vehicle headlamp apparatus allows the control unit to perform the steering angle control. The vehicle headlamp apparatus according to the present aspect allows the control unit to appropriately control light distribution directions of the headlamp independently of which of the straight road and the curved road the vehicle travels.

That is, the control unit recognizes the vehicle to be traveling on a straight road and performs the steering angle control until the vehicle's current position reaches an entry control start point positioned the control setup distance short of the curved road start point. Under the steering angle control, the control unit can appropriately control the headlamp's light distribution directions based on the vehicle's steering angle and current speed.

The control unit recognizes the vehicle to be entering a curved road and starts the navigation-cooperative control at the entry into a curved road when the vehicle's current position reaches the entry control start point. Under the navigation-cooperative control, the control unit varies the headlamp's swivel angle toward the curved road direction before the vehicle actually enters the curved road.

When the vehicle is estimated to enter a curved road, it is possible to previously orient the light distribution direction formed by the vehicle's headlamp toward the curved road's direction. When the vehicle enters the curved road, the headlamp's light distribution direction can be changed before the vehicle's driver operates a steering system toward the curved road's direction. The driver's visibility can be ensured appropriately.

Under the navigation-cooperative control at the entry into a curved road, the control unit finds the target swivel angle θ1 as a target angle for the headlamp's swivel angle. The target swivel angle θ1 is found based on the curved road's curvature radius and the curved road direction information received from the navigation unit and based on the vehicle's current speed detected by the speed detection unit.

At this time, the magnitude of the target swivel angle θ1 can be appropriately found based on the curved road's curvature radius and the vehicle's current speed. The direction of the target swivel angle θ1 can be found based on the curved road direction information (indicating whether the curved road is a right curved road winding to the right of the vehicle's traveling direction or a left curved road winding to the left of the vehicle's traveling direction).

Under the navigation-cooperative control at the entry into the curved road, the control unit functions as follows while the vehicle's current position changes from the entry control start point to the curved road start point. That is, the control unit operates the drive mechanism to gradually vary the headlamp's swivel angle until it reaches the target swivel angle θ1. This can help prevent the light distribution direction caused by the headlamp from being subject to sudden and discontinuous changes when the control unit changes the steering angle control to the navigation-cooperative control.

When the vehicle actually enters the curved road, the vehicle's driver operates the steering system. At this time, a change occurs in the vehicle's current steering angle detected by the steering angle detection unit. Consequently, there may be a case where the vehicle's current steering angle may become the target swivel angle θ1 during or after execution of the navigation-cooperative control. In this case, the control unit changes the navigation-cooperative control to the steering angle control to reexecute the curved road steering angle control.

The vehicle's driver may operate the steering system to orient the vehicle toward the curved road direction. In such case, it is possible to vary the headlamp's light distribution direction in accordance with actual directions of the vehicle. The driver's visibility can be ensured appropriately.

The exit control start point is positioned the control setup distance short of the curved road end point. When the vehicle's current position reaches the exit control start point, the control unit starts the navigation-cooperative control at the exit from the curved road, assuming that the vehicle exits from the curved road. Under the navigation-cooperative control, the control unit varies the headlamp's swivel angle toward a straight road or the like following the curved road.

The vehicle may be assumed to exit from the curved road. In such case, it is possible to previously orient the light distribution direction caused by the vehicle's headlamp toward a straight road or the like following the curved road. When the vehicle exits from the curved road, the headlamp's light distribution direction can be also previously varied before the vehicle's driver returns the steering system's operation to the original state. The driver's visibility can be ensured appropriately.

Under the navigation-cooperative control at the exit from the curved road, the control unit functions as follows while the vehicle's current position changes from the exit control start point to the curved road end point. That is, the control unit operates the drive mechanism to gradually vary the headlamp's swivel angle until it reaches 0°. This can help prevent the light distribution direction caused by the headlamp from being subject to sudden and discontinuous changes when the control unit changes the steering angle control to the navigation-cooperative control.

When the vehicle actually exits from the curved road, the vehicle's driver returns the steering system operation to the original state. At this time, a change occurs in the vehicle's current steering angle detected by the steering angle detection unit. The vehicle's current steering angle may become 0° during or after execution of the navigation-cooperative control. In such case, the control unit changes the navigation-cooperative control to the steering angle control to reperform the steering angle control.

When the vehicle's driver returns the steering system operation to the original state, the vehicle's direction may be oriented toward a straight road or the like following the curved road. In such case, it is possible to vary the light distribution direction of the headlamp in accordance with the vehicle's actual directions. The driver's visibility can be ensured appropriately.

As mentioned above, the vehicle headlamp apparatus according to the present aspect can help prevent the light distribution direction caused by the headlamp from being subject to sudden and discontinuous changes. The driver's visibility can be ensured appropriately.

A second aspect of the present invention provides a vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curvature radius of the curved road, and curved road direction information indicating whether the curved road is a right curved road or a left curved road and wherein the control unit is assigned a control setup distance to be used for the navigation-cooperative control;

wherein the control unit recognizes the vehicle to be traveling on a straight road and performs the steering angle control until a position detected by the position detection unit reaches an entry control start point positioned the control setup distance short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle ($\theta 1$) as a target angle for the swivel angle based on the curvature radius and the curved road direction information about the curved road and based on a speed detected by the speed detection unit; and wherein the control unit operates the drive mechanism to gradually change the swivel angle up to the target swivel angle ($\theta 1$) while a position detected by the position detection unit changes from the entry control start point to the curved road start point.

The vehicle headlamp apparatus according to the present aspect is used when a vehicle travels with headlamps turned on. When the vehicle is recognized to enter a curved road, the vehicle headlamp apparatus performs the navigation-cooperative control. When the vehicle is recognized to travel a straight road, the vehicle headlamp apparatus performs the steering angle control. The vehicle headlamp apparatus according to the present aspect also allows the control unit to appropriately control light distribution directions of the headlamp independently of which of the straight road and the curved road the vehicle travels.

The present aspect provides working effects of performing the navigation-cooperative control at the entry into a curved road similarly to those of performing the navigation-cooperative control at the entry into a curved road according to the first aspect.

Accordingly, the vehicle headlamp apparatus according to the present aspect can also help prevent the light distribution direction caused by the headlamp from being subject to sudden and discontinuous changes. The driver's visibility can be ensured appropriately.

A third aspect of the present invention provides a vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road end point to indicate an end of a curved road out of the plurality of navigation points, a curvature radius of the curved road, and curved road direction information indicating whether the curved road is a right curved road or a left curved road and wherein the control unit is assigned a control setup distance to be used for the navigation-cooperative control;

wherein the control unit performs the steering angle control until a position detected by the position detection unit reaches an exit control start point positioned the control setup distance short of the curved road end point;

wherein the control unit recognizes the vehicle to be exiting from the curved road and starts the navigation-cooperative control at an exit from the curved road when a position detected by the position detection unit reaches the exit control start point; and wherein, under the navigation-cooperative control, the control unit operates the drive mechanism to gradually change the swivel angle up to 0° while a position detected by the position detection unit changes from the exit control start point to the curved road end point.

The vehicle headlamp apparatus according to the present aspect is used when a vehicle travels with headlamps turned on. When the vehicle is recognized to exit from a curved road, the vehicle headlamp apparatus performs the navigation-cooperative control. When the vehicle is recognized to travel a straight road or enter a curved road, for example, the vehicle headlamp apparatus performs the steering angle control. The vehicle headlamp apparatus according to the present aspect also allows the control unit to appropriately control light distribution directions of the headlamp independently of which of the straight road and the curved road the vehicle travels.

The present aspect provides working effects of performing the navigation-cooperative control at the exit from a curved road similarly to those of performing the navigation-cooperative control at the exit from a curved road according to the first aspect.

Accordingly, the vehicle headlamp apparatus according to the present aspect can also help prevent the light distribution direction caused by the headlamp from being subject to sudden and discontinuous changes. The driver's visibility can be ensured appropriately.

A fourth aspect of the present invention provides a vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curved road end point to indicate an end of the curved road, a curvature radius of the curved road, and curved road direction information indicating whether the curved road is a right curved road or a left curved road and wherein the control unit is assigned a control setup time to be used for the navigation-cooperative control;

wherein the control unit finds an assumed entry mileage from a multiplication between a speed detected by the speed detection unit and the control setup time and recognizes the vehicle to be traveling on a straight road and performs the steering angle control until a position detected by the position detection unit reaches an entry control start point positioned the assumed entry mileage short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle (θ1) as a target angle for the swivel angle based on the curvature radius and the curved road direction information about the curved road and based on a speed detected by the speed detection unit;

wherein the control unit operates the drive mechanism to gradually change the swivel angle up to the target swivel angle θ1 while the control setup time elapses;

wherein the control unit reexecutes the steering angle control during or after execution of the navigation-cooperative control when a steering angle detected by the steering angle detection unit reaches the target swivel angle (θ1);

wherein the control unit finds an assumed exit mileage from a multiplication between a speed detected by the speed detection unit and the control setup time and recognizes the vehicle to be exiting from the curved road and starts the navigation-cooperative control at an exit from the curved road when a position detected by the position detection unit reaches an exit control start point positioned the assumed exit mileage short of the curved road end point;

wherein, under the navigation-cooperative control, the control unit operates the drive mechanism to gradually change the swivel angle up to 0° while a position detected by the position detection unit changes from the exit control start point to the curved road end point; and wherein the control unit reexecutes the steering angle control during or after execution of the navigation-cooperative control when a current steering angle detected by the steering angle detection unit reaches 0°.

Compared to the above-mentioned present aspect according to the first aspect, the vehicle headlamp apparatus according to the present aspect provides the navigation-cooperative control at the entry into a curved road to find the entry control start point using the control setup time, not using the control setup distance. While the control setup time elapses, the vehicle headlamp apparatus gradually varies the swivel angle until it reaches the target swivel angle θ.

Compared to the above-mentioned first aspect, the vehicle headlamp apparatus according to the present aspect provides the navigation-cooperative control at the exit from a curved road to find the exit control start point using the control setup time, not using the control setup distance. While the control setup time elapses, the vehicle headlamp apparatus gradually varies the swivel angle until it reaches 0°.

With respect to the other viewpoints, the embodiment is constructed similarly to the above-mentioned aspect according to the first aspect.

The present aspect also provides working effects of performing the navigation-cooperative control at the entry into a curved road similarly to those of performing the navigation-cooperative control at the entry into a curved road according to the first aspect. The present aspect also provides working effects of performing the navigation-cooperative control at the exit from a curved road similarly to those of performing the navigation-cooperative control at the exit from a curved road according to the first aspect.

Accordingly, the vehicle headlamp apparatus according to the present aspect can also help prevent the light distribution direction caused by the headlamp from being subject to sudden and discontinuous changes. The driver's visibility can be ensured appropriately.

A fifth aspect of the present invention provides a vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curvature radius of the curved road, and curved road direction information indicating whether the curved road is a right curved road or a left curved road and wherein the control unit is assigned a control setup time to be used for the navigation-cooperative control;

wherein the control unit finds an assumed mileage from a multiplication between a speed detected by the speed detection unit and the control setup time and recognizes the vehicle to be traveling on a straight road and performs the steering angle control until a position detected by the position detection unit reaches an entry control start point positioned the assumed mileage short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle (θ1) as a target angle for the swivel angle based on the curvature radius and the curved road direction information about the curved road and based on a speed detected by the speed detection unit; and wherein the control unit operates the drive mechanism to gradually change the swivel angle up to the target swivel angle (θ1) while the control setup time elapses.

When the vehicle is recognized to enter a curved road, the vehicle headlamp apparatus according to the present aspect performs the navigation-cooperative control. Compared to the above-mentioned second aspect, the vehicle headlamp apparatus according to the present aspect provides the navigation-cooperative control at the entry into a curved road to find the entry control start point using the control setup time, not using the control setup distance. While the control setup time elapses, the vehicle headlamp apparatus gradually varies the swivel angle until it reaches the target swivel angle θ.

The present aspect also provides the construction and working effects of performing the navigation-cooperative control at the entry into a curved road similarly to those of performing the navigation-cooperative control at the entry into a curved road according to the fourth aspect.

Accordingly, the vehicle headlamp apparatus according to the present aspect can also help prevent the light distribution direction caused by the headlamp from being subject to sudden and discontinuous changes. The driver's visibility can be ensured appropriately.

A sixth aspect of the present invention provides a vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road end point to indicate an end of a curved road out of the plurality of navigation points, a curvature radius of the curved road, and curved road direction information indicating whether the curved road is a right curved road or a left curved road and wherein the control unit is assigned a control setup time to be used for the navigation-cooperative control;

wherein the control unit finds an assumed mileage from a multiplication between ta speed detected by the speed detection unit and the control setup time and performs the steering angle control until a position detected by the position detection unit reaches an exit control start point positioned the assumed mileage short of the curved road end point;

wherein the control unit recognizes the vehicle to be exiting from the curved road and starts the navigation-cooperative control at an exit from the curved road when a position detected by the position detection unit reaches the exit control start point; and wherein, under the navigation-cooperative control, the control unit operates the drive mechanism to gradually change the swivel angle up to 0° while a position detected by the position detection unit changes from the exit control start point to the curved road end point.

When the vehicle is recognized to exit from a curved road, the vehicle headlamp apparatus according to the present aspect performs the navigation-cooperative control. Compared to the above-mentioned third aspect, the vehicle headlamp apparatus according to the present aspect provides the navigation-cooperative control at the exit from a curved road to find the exit control start point using the control setup time, not using the control setup distance. While the control setup time elapses, the vehicle headlamp apparatus gradually varies the swivel angle until it reaches 0°.

The present aspect also provides the construction and working effects of performing the navigation-cooperative control at the exit from a curved road similarly to those of performing the navigation-cooperative control at the exit from a curved road according to the fourth aspect.

Accordingly, the vehicle headlamp apparatus according to the present aspect can also help prevent the light distribution direction caused by the headlamp from being subject to sudden and discontinuous changes. The driver's visibility can be ensured appropriately.

According to the first to sixth aspects, the straight road is not limited to signifying a linear road. The straight road also signifies a road composed of navigation points among which the navigation unit defines no curved road start point. The curved road start point indicates the start of a curved road having a specified curvature radius or smaller. The present aspect defines a curved road having the curvature radius larger than the specified curvature radius as a straight road.

According to the first to sixth aspects, the control unit receives curved road direction information from the navigation unit. The curved road direction information provides a right curved road or a left curved road. The right curved road winds to the right of the vehicle's traveling direction. The left curved road winds to the left of the vehicle's traveling direction.

There may be a case where the control unit receives a right curved road from the navigation unit. In this case, the above-mentioned target swivel angle θ1 needs to be found under the navigation-cooperative control at entry into the curved road. The target swivel angle θ1 is found as an angle tilted right against the vehicle's traveling direction (forward direction). There may be a case where the control unit receives a left curved road from the navigation unit. In this case, the above-mentioned target swivel angle θ1 needs to be found under the navigation-cooperative control at entry into the curved road. The target swivel angle θ1 is found as an angle tilted left against the vehicle's traveling direction (forward direction).

According to the first through third aspects, the control unit is assigned a setup value for the control setup distance. The control unit can change this setup values.

According to the fourth through sixth aspects, the control unit is assigned a setup value for the control setup time. The control unit can change this setup value.

According to the first and second aspects, the control unit is additionally assigned the control setup time used for the navigation-cooperative control. Under the navigation-cooperative control at the entry into the curved road, the control unit is preferably constructed to find the target swivel angle θ1, i.e., a target angle for the swivel angle, from $θ1=\sin^{-1}(V \times T/2R)$. In this equation, R denotes the curved road's curvature radius received from the navigation unit; V denotes the vehicle's current speed detected from the speed detection unit; and T denotes the control setup time.

According to the fourth and fifth aspects, under the navigation-cooperative control at the entry into the curved road, the control unit is preferably constructed to find the target swivel angle θ1, i.e., a target angle for the swivel angle, from $θ1=\sin^{-1}(V \times T/2R)$. In this equation, R denotes the curved road's curvature radius received from the navigation unit; V denotes the vehicle's current speed detected from the speed detection unit; and T denotes the control setup time.

In these cases, the following are assumed. A virtual circle with the radius V×T is drawn around the curved road start point. A curved line is drawn with the curvature radius R from the curved road start point and crosses the virtual circle at a light distribution point. A virtual straight line having the length V×T is drawn from the curved road start point to the light distribution point. The virtual straight line forms the target swivel angle θ1 against the vehicle's advance direction (forward direction). Under the navigation-cooperative control at the entry into the curved road, the control unit finds the magnitude of the target swivel angle θ1, i.e., a target angle for the headlamp's swivel angle, using $θ1[rad]=\sin^{-1}(V \times T/2R)$. In this equation, R is the curved road's curvature radius, V the vehicle's current speed, and T the control setup time. Accordingly, the magnitude of the target swivel angle θ1 can be found more appropriately.

Further, θ1 can be also expressed as $θ1[°]=\sin^{-1}[(V \times T/2R) \times 180/\pi]$.

According to the first and second aspects, the control unit is preferably constructed as follows. Under the navigation-cooperative control at the entry into the curved road, equation $x=V \times t$ is used to find the vehicle's mileage x from the entry control start point. In this equation, t is the elapsed time from the time point when the vehicle's current position detected by the position detection unit reaches the entry control start point; and V is the vehicle's current speed detected by the speed detection unit. Further, it is assumed that L is the control setup distance; and θ1 is the target swivel angle. Under this condition, equation $Δθ1=θ1 \times x/L$ is used to find transient swivel angle Δθ1 for changing the swivel angle to the target swivel angle θ1. Until the vehicle's mileage x reaches the control setup distance L, the drive mechanism is operated to change the swivel angle so that the swivel angle at each elapsed time t successively matches the transient swivel angle Δθ1.

In this case, the control unit provides the navigation-cooperative control at the entry into the curved road by considering the vehicle's current speed V at the entry into the curved road. The control unit finds the transient swivel angle Δθ1 at each elapsed time t from the entry control start point in proportion to a distance (mileage x) assumed to be actually traveled by the vehicle. The control unit operates the drive mechanism to generate a headlamp's swivel angle at each elapsed time t, i.e., each elapsed time point from the entry control start point. The control unit successively assumes this swivel angle to be the transient swivel angle Δθ1, i.e., a target angle at each elapsed time t. This makes it possible to more smoothly change headlamp's swivel angles with reference to the target swivel angle Δθ1 at proper timings in consideration for the vehicle's current speed.

The vehicle's current speed V can be assumed to be the vehicle's current speed V at the entry control start point.

According to the first and third aspects, the control unit is preferably constructed as follows. Under the navigation-cooperative control at the exit from the curved road, equation $x=V \times t$ is used to find the vehicle's mileage x from the exit control start point. In this equation, t is the elapsed time from the time point when the vehicle's current position detected by the position detection unit reaches the exit control start point; and V is the vehicle's current speed detected by the speed detection unit. Further, it is assumed that L is the control setup distance; and return swivel angle θ2 is the vehicle's steering angle at the time point when the vehicle's current position reaches the exit control start point. Under this condition, equation $Δθ2=θ2 \times (1-x/L)$ is used to find transient swivel angle Δθ2 for changing the swivel angle from the return swivel angle θ1 to 0°. Until the vehicle's mileage x reaches the control setup distance L, the drive mechanism is operated to change the swivel angle so that the swivel angle's return amount at each elapsed time t successively matches the transient swivel angle Δθ2.

In this case, the control unit provides the navigation-cooperative control at the exit from the curved road by considering the vehicle's current speed V at the exit from the curved road. The control unit finds the transient swivel angle Δθ2 at each elapsed time t from the exit control start point in proportion to a distance (mileage x) assumed to be actually traveled by the vehicle. The drive mechanism is operated to generate a headlamp's swivel angle at each elapsed time t, i.e., each elapsed time point from the exit control start point. The control unit successively assumes this swivel angle to be the transient swivel angle Δθ2, i.e., a target angle at each elapsed time t. This makes it possible to more smoothly change headlamp's swivel angles with reference to the target swivel angle θ2 at proper timings in consideration for the vehicle's current speed.

The vehicle's current speed V can be assumed to be the vehicle's current speed V at the exit control start point.

The control unit can also find the transient swivel angles Δθ1 and Δθ2 as follows.

Under the navigation-cooperative control at the entry into the curved road, the control unit uses the speed detection unit to successively detect the vehicle's current speed V(t) at each elapsed time t from the entry control start point. The control unit uses $x=\int V(t) \times dt$ to find the vehicle's mileage x from the entry control start point. Further, the control unit can also find the transient swivel angle $\Delta\theta 1$ from $\Delta\theta 1=\theta 1\times x/L$.

In this case, the vehicle speed may change (e.g., a break operated by the vehicle's driver) while the vehicle moves from the entry control start point to the curved road start point. In such case, it is possible to find the transient swivel angle $\Delta\theta 1$ at each elapsed time t from the entry control start point in proportion to the distance x actually traveled by the vehicle. Accordingly, the headlamp's swivel angles can be changed at more proper timings under the navigation-cooperative control at the entry into the curved road.

Under the navigation-cooperative control at the exit from the curved road, the control unit uses the speed detection unit to successively detect the vehicle's current speed V(t) at each elapsed time t from the exit control start point. The control unit uses $x=\int V(t)\times dt$ to find the vehicle's mileage x from the exit control start point. In addition, the control unit can also find the transient swivel angle $\Delta\theta 2$ from $\Delta\theta 2=-\theta 2\times x/L$.

In this case, the vehicle speed may change (e.g., an accelerator depressed by the vehicle's driver) while the vehicle moves from the exit control start point to the curved road start point. In such case, it is possible to find the transient swivel angle $\Delta\theta 2$ at each elapsed time t from the exit control start point in proportion to the distance x actually traveled by the vehicle. Accordingly, the headlamp's swivel angles can be changed at more proper timings under the navigation-cooperative control at the exit from the curved road.

According to the fourth and fifth aspects, the control unit is preferably constructed as follows. Under the navigation-cooperative control at the entry into the curved road, equation $\Delta\theta 1=\theta 1\times t/T$ is used to find transient swivel angle $\Delta\theta 1$ when changing from the swivel angle to the target swivel angle $\theta 1$. In this equation, t is the elapsed time from the time point when the vehicle's current position detected by the position detection unit reaches the entry control start point; T is the control setup time; and $\theta 1$ is the target swivel angle. Until the elapsed time t reaches the control setup time T, the drive mechanism is operated to change the swivel angle so that the swivel angle at each elapsed time t successively matches the transient swivel angle $\Delta\theta 1$.

In this case, the control unit finds the transient swivel angle $\Delta\theta 1$ in proportion to each elapsed time t from the entry control start point under the navigation-cooperative control at the entry into the curved road. The control unit operates the drive mechanism to generate a headlamp's swivel angle at each elapsed time t, i.e., each elapsed time point from the entry control start point. The control unit successively assumes this swivel angle to be the transient swivel angle $\Delta\theta 1$, i.e., a target angle at each elapsed time t. This makes it possible to more smoothly change headlamp's swivel angles with reference to the target swivel angle $\theta 1$.

According to the fourth and sixth aspects, the control unit is preferably constructed as follows. Under the navigation-cooperative control at the exit from the curved road, equation $\Delta\theta 2=\theta 2\times(1-t/T)$ is used to find transient swivel angle $\Delta\theta 2$ when changing the swivel angle from the return swivel angle $\theta 2$ to $0°$. In this equation, t is the elapsed time from the time point when the vehicle's current position detected by the position detection unit reaches the exit control start point; T is the control setup time; return swivel angle $\Delta\theta 2$ is the vehicle's steering angle at the time point when the vehicle's current position reaches the exit control start point. Until the elapsed time t reaches the control setup time T, the drive mechanism is operated to change the swivel angle so that the swivel angle at each elapsed time t successively matches the transient swivel angle $\Delta\theta 2$.

In this case, the control unit finds the transient swivel angle $\Delta\theta 2$ in proportion to each elapsed time t from the entry control start point under the navigation-cooperative control at the exit from the curved road. The control unit operates the drive mechanism to generate a headlamp's swivel angle at each elapsed time t, i.e., each elapsed time point from the exit control start point. The control unit successively assumes this swivel angle to be the transient swivel angle $\Delta\theta 2$, i.e., a target angle at each elapsed time t. This makes it possible to more smoothly change headlamp's swivel angles with reference to the target swivel angle $\theta 2$.

According to the first and second aspects, the control unit is preferably constructed as follows. The control unit provides the steering angle control when the vehicle's current steering angle detected by the steering angle detection unit exceeds the transient swivel angle $\Delta\theta 1$ until the vehicle's mileage x reaches the control setup distance L.

According to the fourth and fifth aspects, the control unit is preferably constructed as follows. The control unit provides the steering angle control when the vehicle's current steering angle detected by the steering angle detection unit exceeds the transient swivel angle $\Delta\theta 1$ until the elapsed time t reaches the control setup time T.

A curved road start point provided by the navigation unit may be notified later than the actual start position of the curved road. Alternatively, the navigation unit may recognize the curved road's curvature radius to be larger than the actual curvature radius. In these cases, the above-mentioned control is effective.

There may be a case where the vehicle's current position reaches the entry control start point and the vehicle actually enters the curved road in the middle of the execution of navigation-cooperative control. At this time, the vehicle's driver operates the steering system. That is, the driver operates the steering system before the headlamp's swivel angle reaches the target swivel angle $\theta 1$. Consequently, the vehicle's steering angle changes to vary the headlamp's light distribution direction. Before the headlamp's swivel angle reaches the target swivel angle $\theta 1$, the vehicle's current steering angle detected by the steering angle detection unit exceeds the transient swivel angle $\Delta\theta 1$. At this time, the control unit changes the navigation-cooperative control to the steering angle control to provide the steering angle control. In this manner, the headlamp's light distribution direction can appropriately follow the direction of the curved road.

According to the first and third aspects, the control unit is preferably constructed as follows. The control unit provides the steering angle control when the vehicle's current steering angle detected by the steering angle detection unit becomes smaller than the transient swivel angle $\Delta\theta 2$ until the vehicle's mileage x reaches the control setup distance L.

According to the fourth and sixth aspects, the control unit is preferably constructed as follows. The control unit provides the steering angle control when the vehicle's current steering angle detected by the steering angle detection unit becomes smaller than the transient swivel angle $\Delta\theta 2$ until the elapsed time t reaches the control setup time T.

In these cases, the control is effective when a curved road end point provided by the navigation unit is notified later than the actual curved road's end position, for example.

There may be a case where the vehicle's current position reaches the exit control start point and the vehicle actually exits from the curved road in the middle of the execution of navigation-cooperative control. At this time, the vehicle's driver operates the steering system. That is, the driver operates the steering system before the headlamp's swivel angle reaches 0°. Consequently, the vehicle's steering angle changes to vary the headlamp's light distribution direction. Before the headlamp's swivel angle reaches 0°, the vehicle's current steering angle detected by the steering angle detection unit becomes smaller than the transient swivel angle $\Delta\theta2$. At this time, the control unit changes the navigation-cooperative control to the steering angle control to provide the steering angle control. In this manner, the headlamp's light distribution direction can appropriately follow the direction of a straight road and the like subsequent to the curved road.

According to the first, second, fourth, and fifth aspects, the control unit is preferably constructed as follows. Under the navigation-cooperative control at the entry into the curved road, the swivel angle reaches the target swivel angle $\theta1$. Then, the vehicle's current steering angle detected by the steering angle detection unit reaches the target swivel angle $\theta1$. Up to this point, the swivel angle remains the target swivel angle $\theta1$.

In this case, the control is effective when a curved road start point provided by the navigation unit is notified earlier than the actual curved road's start position, for example.

That is, the navigation-cooperative control at the entry into the curved road may be provided and the vehicle's current position may reach the curved road start point. The headlamp's swivel angle may reach the target swivel angle $\theta1$. Even in such case, the vehicle's driver does not operate the steering system unless the vehicle actually enters the curved road. For this reason, the control unit keeps the headlamp's swivel angle equal to the target swivel angle $\theta1$ until the driver operates the steering system.

Thereafter, the vehicle may actually enter the curved road. The driver may operate the steering system. The vehicle's current steering angle detected by the steering angle detection unit may reach the target swivel angle $\theta1$. In this case, the control unit changes the navigation-cooperative control to the steering angle control to provide the steering angle control. This makes it possible to properly control the headlamp's swivel angles.

According to the first, third, fourth, and sixth aspects, the control unit is preferably constructed as follows. Under the navigation-cooperative control at the exit from the curved road, the swivel angle reaches 0°. Then, the vehicle's current steering angle detected by the steering angle detection unit reaches 0°. Up to this point, the swivel angle remains 0°.

In this case, the control is effective when a curved road end point provided by the navigation unit is notified earlier than the actual curved road's end position, for example.

That is, the navigation-cooperative control at the exit from the curved road may be provided and the vehicle's current position may reach the curved road end point. The headlamp's swivel angle may reach 0°. Even in such case, the vehicle's driver does not return the steering system unless the vehicle actually exits from the curved road. For this reason, the control unit keeps the headlamp's swivel angle equal to 0° until the driver returns the steering system.

Thereafter, the vehicle may actually exit from the curved road. The driver may return the steering system. The vehicle's current steering angle detected by the steering angle detection unit may reach 0°. In this case, the control unit changes the navigation-cooperative control to the steering angle control to provide the steering angle control. This makes it possible to properly control the headlamp's swivel angles.

According to the first, second, fourth, and fifth aspects, the control unit is preferably constructed as follows. Under the navigation-cooperative control at the entry into the curved road, the swivel angle reaches the target swivel angle $\theta1$. Then, the vehicle's current steering angle detected by the steering angle detection unit may not reach the target swivel angle $\theta1$ even when a specified time elapses or the vehicle travels a specified distance. In such case, it is determined that the curved road is incorrectly recognized. The steering angle control is provided.

In this case, the control is effective when the navigation unit incorrectly recognizes a curved road start point or when the curved road's curvature radius provided by the navigation unit is recognized smaller than the actual curvature radius, for example.

As mentioned above, the headlamp's swivel angle reaches the target swivel angle $\theta1$ under the navigation-cooperative control at the entry into the curved road. Then, the vehicle's current steering angle detected by the steering angle detection unit reaches the target swivel angle $\theta1$. Up to this point, the control unit keeps the headlamp's swivel angle to be equal to the target swivel angle $\theta1$. After the headlamp's swivel angle reaches the target swivel angle $\theta1$, the vehicle's current steering angle does not reach the target swivel angle $\theta1$ even when a specified time elapses or the vehicle travels a specified distance. In such case, it is assumed that the navigation unit incorrectly recognizes the curved road or the magnitude of the curvature radius. The control unit determines that the curved road is incorrectly recognized. The control unit changes the navigation-cooperative control to the steering angle control to provide the steering angle control. In this manner, it is possible to appropriately control the headlamp's swivel angle so as to align to the actual vehicle direction.

According to the first, third, fourth, and sixth aspects, the control unit is preferably constructed as follows. Under the navigation-cooperative control at the exit from the curved road, the swivel angle reaches 0°. Then, the vehicle's current steering angle detected by the steering angle detection unit may not reach 0° even when a specified time elapses or the vehicle travels a specified distance. In such case, it is determined that the curved road is incorrectly recognized. The steering angle control is provided.

In this case, the control is effective when the navigation unit incorrectly recognizes a curved road end point or when the curved road's curvature radius provided by the navigation unit is recognized larger than the actual curvature radius, for example.

As mentioned above, the headlamp's swivel angle reaches 0° under the navigation-cooperative control at the exit from the curved road. Then, the vehicle's current steering angle detected by the steering angle detection unit reaches 0°. Up to this point, the control unit keeps the headlamp's swivel angle to be equal to 0°. After the headlamp's swivel angle reaches 0°, the vehicle's current steering angle does not reach 0° even when a specified time elapses or the vehicle travels a specified distance. In such case, it is assumed that the navigation unit incorrectly recognizes the curved road or the magnitude of the curvature radius. The control unit determines that the curved road is incorrectly recognized. The control unit changes the navigation-cooperative control to the steering angle control to provide the steering angle control. In this manner, it is possible to appropriately control the headlamp's swivel angle so as to align to the actual vehicle direction.

According to the first through sixth aspects, the following construction is preferable. A pair of the headlamps is provided left and right at the front of a vehicle. The control unit simultaneously provides the steering angle control and the navigation-cooperative control for the pair of left and right headlamps.

In this case, the control unit can simultaneously and appropriately control swivel angles of the pair of left and right headlamps provided at the front of a vehicle.

According to the first, second, fourth, and fifth aspects, the following construction is preferable. There is provided a pair of the headlamps left and right at the front of a vehicle. The control unit provides the navigation-cooperative control at the entry into a curved road for a right headlamp of the pair of left and right headlamps on the curved road that is a right curved road winding right of the vehicle. The control unit provides the navigation-cooperative control at the entry into a curved road for a left headlamp of the pair of left and right headlamps on the curved road that is a left curved road winding left of the vehicle.

When the vehicle enters a curved road that is a right curved road, the control unit provides the right headlamp with the navigation-cooperative control and the left headlamp with the steering angle control. When the vehicle enters a curved road that is a left curved road, the control unit provides the left headlamp with the navigation-cooperative control and the right headlamp with the steering angle control.

In this manner, the navigation-cooperative control is performed only for one of the pair of headlamps. It is possible to widen the light distribution range provided by the pair of headlamps when the vehicle enters a curved road. When the vehicle enters a curved road, the driver's visibility can be ensured appropriately. The navigation unit may provide incorrect information about the curved road start point, the curved road's curvature radius, and the like. Even in such case, the driver's visibility can be ensured appropriately.

According to the first, third, fourth, and sixth aspects, the following construction is preferable. There is provided a pair of the headlamps left and right at the front of a vehicle. The control unit provides the navigation-cooperative control at the exit from a curved road for a left headlamp of the pair of left and right headlamps on the curved road that is a right curved road winding right of the vehicle The control unit provides the navigation-cooperative control at the exit from a curved road for a right headlamp of the pair of left and right headlamps on the curved road that is a left curved road winding left of the vehicle.

When the vehicle exits from a curved road that is a right curved road, the control unit provides the left headlamp with the navigation-cooperative control and the right headlamp with the steering angle control. When the vehicle exits from a curved road that is a left curved road, the control unit provides the right headlamp with the navigation-cooperative control and the left headlamp with the steering angle control.

In this manner, the navigation-cooperative control is performed only for one of the pair of headlamps. It is possible to widen the light distribution range provided by the pair of headlamps when the vehicle enters a curved road. When the vehicle enters a curved road, the driver's visibility can be ensured appropriately. The navigation unit may provide incorrect information about the curved road start point, the curved road's curvature radius, and the like. Even in such case, the driver's visibility can be ensured appropriately.

According to the first, second, fourth, and fifth aspects, the following construction is preferable. While repeatedly providing the steering angle control and the navigation-cooperative control, the control unit determines under navigation-cooperative control at the entry into any of the curved roads whether or not condition $V \times T \leq A$ is satisfied. In this condition, A is a radiation distance of the headlamp, V the vehicle's current speed detected by the speed detection unit, and T the control setup time. When the condition is not satisfied, the control unit does not perform the navigation-cooperative control and continues execution of the steering angle control.

In this case, the control unit finds the target swivel angle $\theta 1$ using $\theta 1 = \sin^{-1}(V \times T / 2R)$ under the navigation-cooperative control at the entry into any of the curved roads. The control unit does not perform the navigation-cooperative control when it is determined that the light radiated from the headlamp does not reach the curved road.

As mentioned above, the target swivel angle $\theta 1$ is found as follows. A virtual circle with the radius $V \times T$ is drawn around the curved road start point. A curved line is drawn with the curvature radius R from the curved road start point and crosses the virtual circle at a light distribution point. A virtual straight line having the length $V \times T$ is drawn from the curved road start point to the light distribution point. The virtual straight line forms the target swivel angle $\theta 1$ against the vehicle's advance direction (forward direction).

The above-mentioned virtual straight line has the length of $V1 \times T$ expressed by a multiplication between the vehicle's current speed V1 and the control setup time T. When the distance $V1 \times T$ is longer than the headlamp's radiation distance A, the light radiated from the headlamp is assumed not to reach the curved road.

In this case, the control unit does not perform the navigation-cooperative control. This can help prevent a situation where the light from the headlamp is not radiated to the curved road.

The headlamp's radiation distance A may be selectable between two modes, i.e., low beam (nearer) and high beam (further). In this case, value A used for the condition $V1 \times T \leq A$ can be independently used as a value for the low beam or the high beam.

According to the first, second, fourth, and fifth aspects, the following construction is preferable. While repeatedly providing the steering angle control and the navigation-cooperative control, the control unit may perform the navigation-cooperative control at the entry into any of the curved roads. In this case, the control unit does not perform the navigation-cooperative control and continues execution of the steering angle control when the curved road starts from the curved road start point corresponding to a junction or an intersection.

When the curved road corresponds to a junction or an intersection, the control unit cannot determine toward which direction the vehicle's driver operates the steering system. It is difficult to find the target swivel angle under the navigation-cooperative control at the entry into the curved road. In such case, the control unit continues to perform the steering angle control without performing the navigation-cooperative control at the entry into the curved road. In this manner, it is possible to stably control the headlamp's swivel angle.

According to the first, third, fourth, and sixth aspects, the following construction is preferable. While repeatedly providing the steering angle control and the navigation-cooperative control, the control unit may perform the navigation-cooperative control at the exit from any of the curved roads. In this case, the control unit does not perform the navigation-cooperative control and continues execution of the steering angle control when the curved road ends with the curved road end point corresponding to a junction or an intersection.

When the curved road corresponds to a junction or an intersection, the control unit cannot determine toward which direction the vehicle's driver operates the steering system. It is difficult to find the target swivel angle under the navigation-cooperative control at the exit from the curved road. In such case, the control unit continues to perform the steering angle control without performing the navigation-cooperative control at the exit from the curved road. In this manner, it is possible to stably control the headlamp's swivel angle.

The above-mentioned vehicle headlamp apparatus may be constructed as follows.

A seventh aspect of the present invention provides a vehicle headlamp apparatus capable of adjusting a swivel angle within an area approximately parallel to a road surface in the optical axis direction of a pair of left and right headlamps provided on the front of a vehicle. The vehicle headlamp apparatus is composed of:

a road data output unit for including a position detection sensor to detect a vehicle position and map database to store electronic map information and referencing the map database based on the vehicle position to output road data representing a road structure forming a vehicle's route;

a right swivel control unit for adjusting the swivel angle for a right headlamp of the pair of headlamps;

a left swivel control unit for adjusting the swivel angle for a left headlamp of the pair of headlamps; and a steering angle detection unit for detecting a steering system's steering angle, wherein each of the swivel control units selectively performs a navigation-cooperative control mode and a steering angle control mode, of which the navigation-cooperative control mode calculates a navigation-estimated traveling direction as a vehicle traveling direction estimated based on the road data and controls the swivel angle based on the navigation-estimated traveling direction, and the steering angle control mode calculates a steering-angle-estimated traveling direction as a vehicle traveling direction estimated based on the steering angle and controls the swivel angle based on the steering-angle-estimated traveling direction;

wherein, under start point control to perform the navigation-cooperative control mode within a first transit time for the vehicle to enter a curved road, each of the swivel control units calculates a first final swivel angle as the navigation-estimated traveling direction at an estimated vehicle position after the first transit time, incorporates a first transient swivel angle as the swivel angle at the beginning of the start point control, and simply changes the swivel angle from the first transient swivel angle to the first final swivel angle within in first transit time; and wherein, under end point control to perform the navigation-cooperative control mode within a second transit time for the vehicle to exit from a curved road, each of the swivel control units incorporates a second transient swivel angle as the swivel angle at the beginning of the end point control and simply changes the swivel angle from the second transient swivel angle to a second final swivel angle as a predefined initial swivel angle.

Each of the swivel control units in the vehicle headlamp apparatus according to the seventh aspect selectively enables the navigation-cooperative control mode and the steering angle control mode. The navigation-cooperative control mode controls the swivel angle based on the road data. The steering angle control mode controls the swivel angle based on the steering angle.

The start point control performs the navigation-cooperative control mode within the first transit time. Under the start point control, each of the swivel control units simply varies the swivel angle from the first transient swivel angle to the first final swivel angle within the first transit time. The end point control performs the navigation-cooperative control mode within the second transit time. Under the end point control, each of the swivel control units simply varies the swivel angle from the second transient swivel angle to the initial swivel angle as the second final swivel angle within the second transit time. The initial swivel angle may be set to zero, for example. When the initial swivel angle is set to zero, it is possible to control various road shapes after exit from the curved road.

When making a change between the steering angle control mode and the navigation-cooperative control mode, the vehicle headlamp apparatus does not merely change from a swivel angle in the steering angle control mode to a swivel angle in the navigation-cooperative control mode. The vehicle headlamp apparatus smoothly changes each transient swivel angle to each final swivel angle while each of the swivel control units simply varies the swivel angles by consuming each transit time. Simply varying the swivel angles signifies varying the swivel angles by simply increasing or decreasing them in a wide sense. For example, there are chronologically succeeding swivel angles, i.e., an earlier swivel angle θ1 and a later swivel angle θ2. Here, simply varying the swivel angles signifies varying the swivel angles so as to satisfy the relationship $\theta1 \leq \theta2$ (simple increase) or $\theta1 \geq \theta2$ (simple decrease).

Accordingly, the vehicle headlamp apparatus according to the seventh aspect causes little possibility of a rapid change in the swivel angles even when the steering angle control mode changes to the navigation-cooperative control mode. For this reason, a driver hardly feels unnaturalness in a change of the swivel angle, i.e., the headlamp's optical axis direction.

As mentioned above, the vehicle headlamp apparatus according to the seventh aspect excels in hardly causing the driver to feel unnaturalness in the control.

Further, the above-mentioned vehicle headlamp apparatus may be constructed as follows.

A eighth aspect of the present invention provides a vehicle headlamp apparatus capable of adjusting a swivel angle within an area approximately parallel to a road surface in the optical axis direction of a pair of left and right headlamps provided on the front of a vehicle. The vehicle headlamp apparatus is composed of:

a road data output unit for including a position detection sensor to detect a vehicle position and map database to store electronic map information and referencing the map database based on the vehicle position to output road data representing a road structure forming a vehicle's route;

a right swivel control unit for adjusting the swivel angle for a right headlamp of the pair of headlamps;

a left swivel control unit for adjusting the swivel angle for a left headlamp of the pair of headlamps; and a steering angle detection unit for detecting a steering system's steering angle, wherein each of the swivel control units selectively performs a navigation-cooperative control mode and a steering angle control mode, of which the navigation-cooperative control mode controls the swivel angle based on the road data and the steering angle control mode controls the swivel angle based on the steering angle; and wherein each of the swivel control units calculates a navigation-estimated traveling direction as a vehicle traveling direction estimated based on the road data and does not perform the navigation-cooperative control mode when a variation of the navigation-estimated traveling direction within a unit time is greater than or equal to a threshold value.

Each of the swivel control units of the vehicle headlamp apparatus according to the eighth aspect selectively performs the navigation-cooperative control mode and the steering angle control mode. The navigation-cooperative control mode controls the swivel angle based on the road data. The steering angle control mode controls the swivel angle based on the steering angle.

Each of the swivel control units calculates the navigation-estimated traveling direction as a vehicle traveling direction estimated based on the road data. Each of the swivel control units does not perform the navigation-cooperative control mode when a variation of the navigation-estimated traveling direction within a unit time is greater than or equal to a threshold value.

There may be some cases of increasing a variation of the navigation-estimated traveling direction within the unit time. For example, the vehicle may reach a junction or an intersection. Alternatively, the road data output unit may generate a large error in the road data. In such cases, performing the navigation-cooperative control mode may highly possibly adjust the swivel angle to a direction not intended by the driver. The vehicle headlamp apparatus cancels the navigation-cooperative control mode when a large variation is detected in the navigation-estimated traveling direction within the unit time (the variation exceeds the threshold value) as mentioned above. Accordingly, the vehicle headlamp apparatus allows the driver to hardly feel unnaturalness in the control over the headlamp's optical axis direction, i.e., the swivel angle.

As mentioned above, the vehicle headlamp apparatus according to the eighth aspect excels in hardly causing the driver to feel unnaturalness in the control.

It is possible to construct embodiments of the vehicle headlamp apparatus according to the seventh and eighth aspects as follows.

The position detection sensor according to the seventh or eighth aspect may be exemplified by a GPS sensor to use radio signals transmitted from an artificial satellite for positioning, a yaw-rate sensor such as a gas rate sensor, a self navigation sensor based on the self navigation system using a gyro and the like for positioning, a hybrid sensor, i.e., a combination of these, for highly precisely detecting positions, and the like.

The headlamp may be a vehicle's headlight or an auxiliary lamp that is provided independently of the vehicle's headlight.

In the seventh aspect, it is preferable to construct each of the swivel control units so as to change at least one of the first and second transit times in accordance with the curvature of a curved road the vehicle enters of exits from.

When the start point control specifies the first transit time in accordance with the curvature of a curved road the vehicle enters, it is possible to provide a working effect of further approximating the human sensitivity. When the first transit time is shortened for a smaller curvature radius of the curved road, for example, there is especially provided a working effect of quickly operating the optical axis.

When the end point control specifies the second transit time in accordance with the curvature of a curved road the vehicle exits from, it is possible to provide the working effect of further approximating the human sensitivity. When the second transit time is shortened for a smaller curvature radius of the curved road, for example, there is especially provided a working effect of quickly operating the optical axis toward the exit from the corner.

It is preferable to construct each of the swivel control units so as to electrically connect with adjustment unit that is constructed to be operated from the outside. It is also preferable to construct each of the swivel control units so as to be capable of changing at least one of the first and second transit times within the range of one to five seconds using the adjustment unit.

In this case, operating the adjustment unit can conform control characteristics of the vehicle headlamp apparatus to driver's preferences. Accordingly, this case can further restrain the unnaturalness felt by the driver.

According to the eighth aspect, the position detection sensor has a positioning function based on the global positioning system using GPS signals. Each of the swivel control units is preferably constructed to incorporate the acquisition count of GPS signals used by the position detection sensor for positioning and not to perform the navigation-cooperative control mode when the acquisition count is smaller than a threshold value.

The global positioning system tends to increase the positioning accuracy corresponding to an increased acquisition count of the GPS signals and decrease the positioning accuracy corresponding to a decreased acquisition count thereof. Therefore, a threshold value can be specified for the acquisition count of the GPS signals. When the acquisition count is smaller than the threshold value, the navigation-cooperative control mode can be canceled. This makes it possible to help prevent malfunction in the navigation-cooperative control mode.

The following construction is preferable. The position detection sensor has a positioning function based on the self navigation system. The positioning function based on the self navigation is used to detect a vehicle position. The positioning function based on the global positioning system is used to detect a vehicle position. When a distance between these vehicle positions exceeds a threshold value, the position detection sensor does not perform the navigation-cooperative control mode.

There may be a large distance between the vehicle position resulting from the self navigation and the vehicle position resulting from the global positioning system. In such case, there is possibility of insufficiently ensure the positioning accuracy for vehicle positions. To solve this problem, a threshold value is provided for a distance between the vehicle position resulting from the self navigation and the vehicle position resulting from the global positioning system. When the distance is greater than or equal to the threshold value, canceling the navigation-cooperative control mode can help prevent malfunction in this mode.

Further, the following construction is preferable. The road data output unit outputs the road data and an evaluation value representing the road data's position accuracy. Each of the swivel control units does not perform the navigation-cooperative control mode when the evaluation value is smaller than the threshold value.

When the evaluation value is small, the road data output unit may output insufficiently accurate road data. When the evaluation value is smaller than the threshold value, canceling the navigation-cooperative control mode can help prevent malfunction under the navigation-cooperative control.

Furthermore, as yet another aspect of the present invention, a headlamp apparatus in a vehicle is provided with the following:

a drive mechanism for horizontally moving a headlamp of the vehicle;

a navigation unit for providing curved road information including, with respect to a curved road, (i) at least one of a curved road start point and a curved road end point, (ii) a curvature radius, and (iii) curved road direction information; and a control unit for switching between steering angle control and navigation-cooperative control, wherein a control setup distance is set for the navigation-cooperative control, wherein in the steering angle control, a swivel angle formed between a forward direction of the vehicle and a radiation direction of the headlamp is controlled by operating the drive mechanism based on a steering angle of the vehicle and a speed of the vehicle and wherein in the navigation-cooperative control, the swivel angle is controlled by operating the drive mechanism using the navigation unit, wherein the control unit executes at least one of a curve entry process and a curve exit process, wherein in the curve entry process, until the vehicle reaches an entry control start point positioned the control setup distance short of the curved road start point, the steering control is caused to take place, and when and after the vehicle reaches the entry control start point, the navigation-cooperative control at an entry into a curved road is caused to take place so that the drive mechanism gradually changes the swivel angle up to a target swivel angle ($\theta 1$) until the vehicle reaches the curved road start point, wherein the target swivel angle is computed based on the curvature radius, the curved road direction information, and a speed of the vehicle, and wherein in the curve exit process, until the vehicle reaches an exit control start point positioned the control setup distance short of the curved road end point, the steering angle control is caused to take place, and when and after the vehicle reached the exit control start point, the navigation-cooperative control at an exit from a curved road is caused to take place so that the drive mechanism gradually changes the swivel angle to 0°.

In addition, in the above structure of the headlamp apparatus, the control setup distance for the navigation-cooperative control may be computed from a multiplication between a speed of the vehicle and a predetermined control setup time.

BRIEF DESCRIPTION OF THE DRAWINGS

The above and other objects, features, and advantages of the present invention will become more apparent from the following detailed description made with reference to the accompanying drawings. In the drawings:

FIG. 35 presents graphs showing a swivel angle under navigation-cooperative control (A), a swivel angle under steering angle control (B), and a control swivel angle under one-side control (C) for the left headlamp at the S-shaped curve according to embodiment 6;

FIG. 36 presents graphs showing a swivel angle under navigation-cooperative control (A), a swivel angle under steering angle control (B), and a control swivel angle under two-side control (C) for the right headlamp at the S-shaped curve according to embodiment 6;

FIG. 37 presents graphs showing a swivel angle under navigation-cooperative control (A), a swivel angle under steering angle control (B), and a control swivel angle under two-side control (C) for the left headlamp at the S-shaped curve according to embodiment 6; and FIG. 38 is a flowchart showing a control procedure for headlamp's swivel angles according to embodiment 7.

DETAILED DESCRIPTION OF THE PREFERRED EMBODIMENTS

Embodiments of the present invention will be described in further detail with reference to the accompanying drawings.

Embodiment 1

Figure 1:
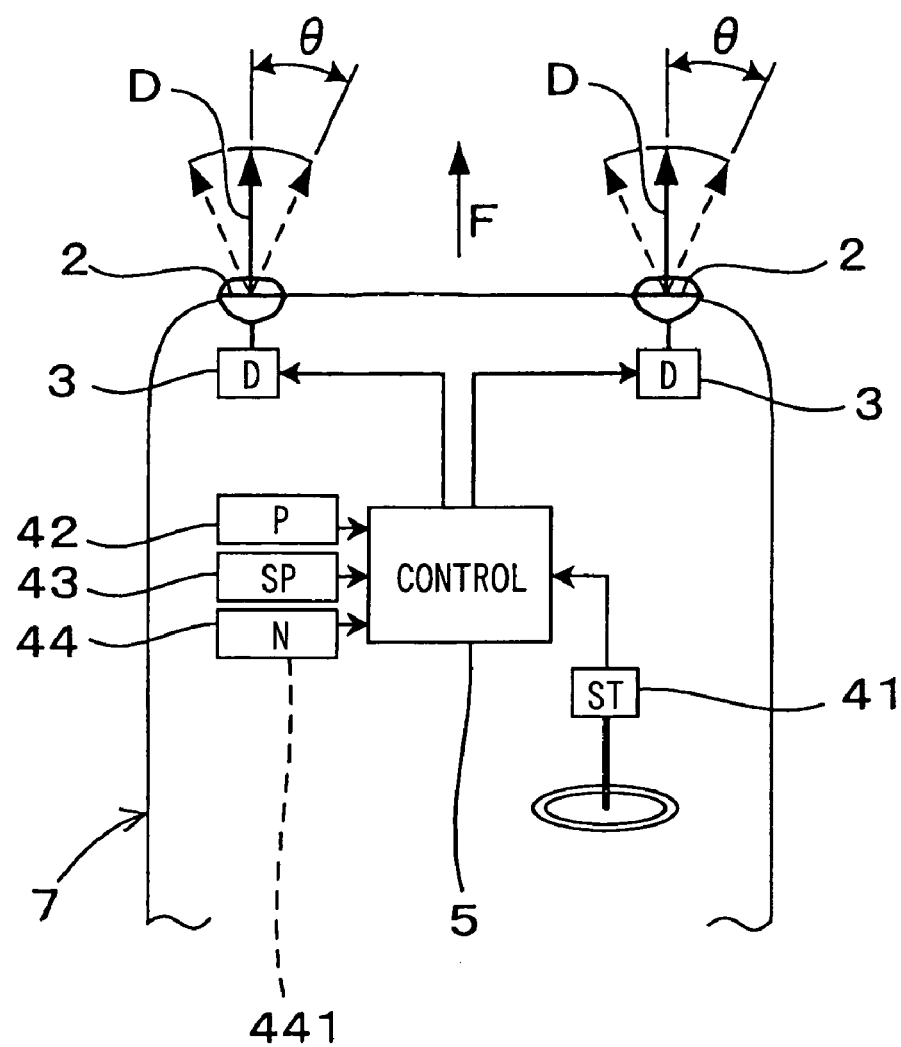
FIG. 1 is an explanatory diagram showing the system configuration of a vehicle headlamp apparatus according to embodiment 1.
Figure 2:
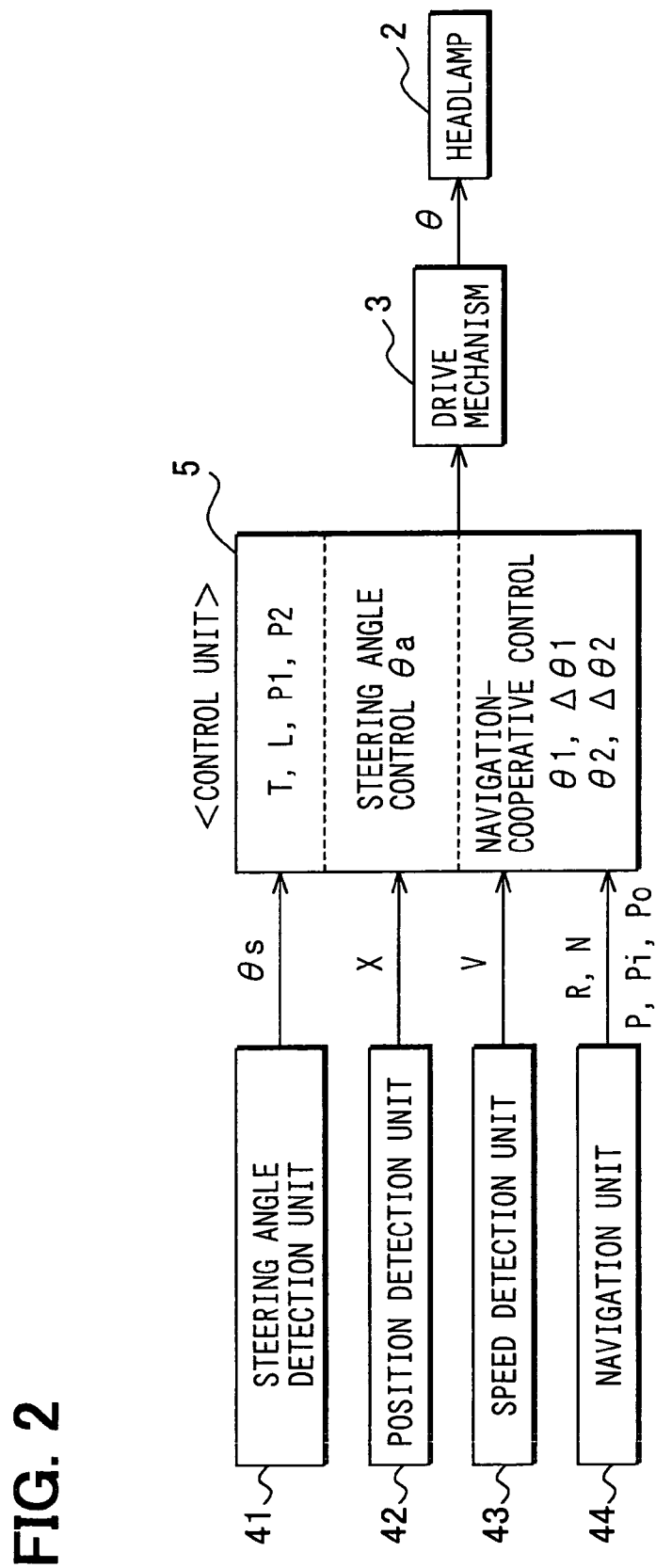
FIG. 2 is a block diagram showing the system configuration of the vehicle headlamp apparatus according to embodiment 1.

As shown in FIGS. 1 and 2, a vehicle headlamp apparatus 1 according to the embodiment has: a headlamp 2 as a pair of a right lamp and a left lamp provided at the front of a vehicle 7; a drive mechanism 3 to horizontally move the headlamp 2; a steering angle detection unit 41 to successively detect steering angle θs for the vehicle 7; a position detection unit 42 to successively detect position X of the vehicle 7; a speed detection unit 43 to successively detect speed V of the vehicle 7; a navigation unit 44; and a control unit 5. In this embodiment 1, the headlamp 2 provided at the front of a vehicle 7 means a pair of a right lamp and a left lamp.

The navigation unit 44 includes a road database 441 that stores a plurality of navigation points P (nodes along a road, as will be applicable to the following description) arranged according to road information.

Figure 8:
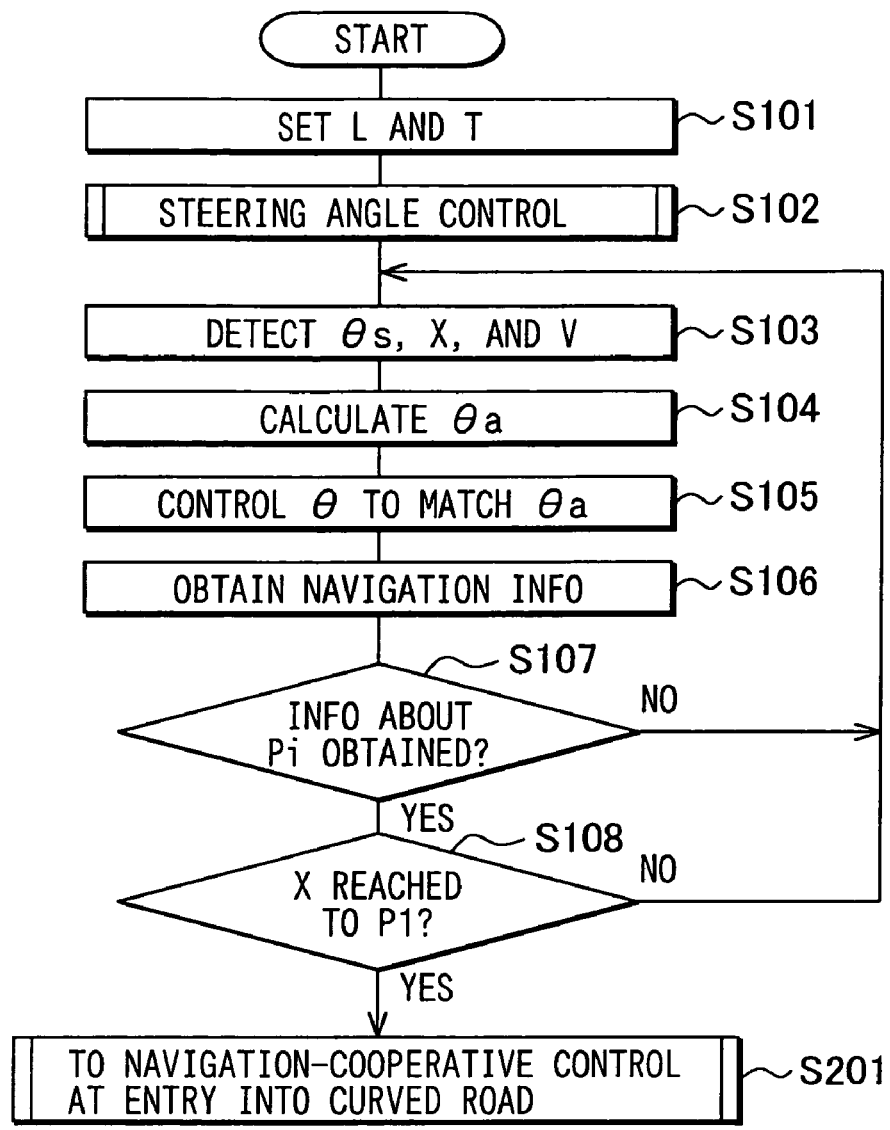
FIG. 8 is a flowchart showing the steering angle control according to embodiment 1.
Figure 9:
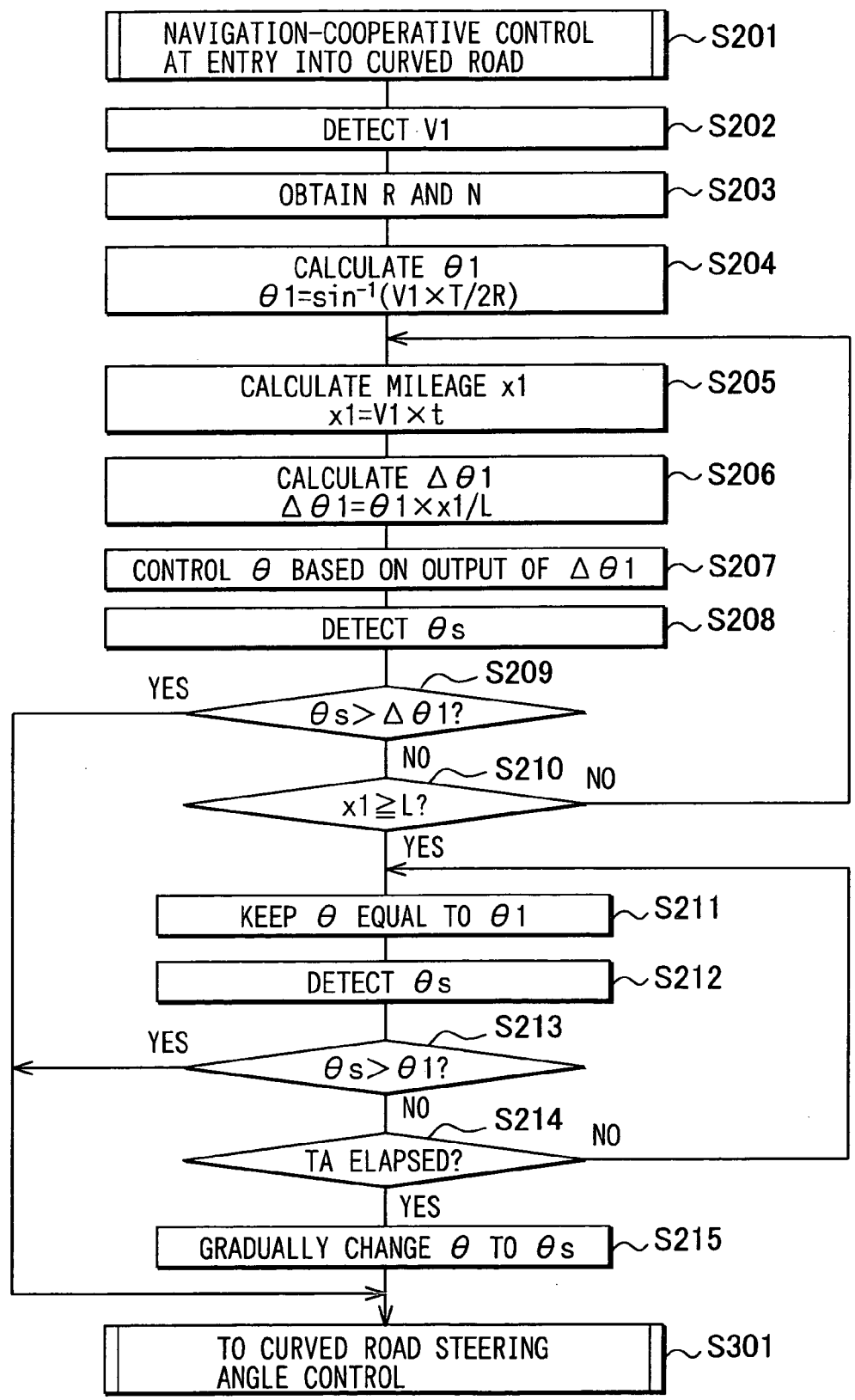
FIG. 9 is a flowchart showing navigation-cooperative control at the entry into the curved road according to embodiment 1.
Figure 10:
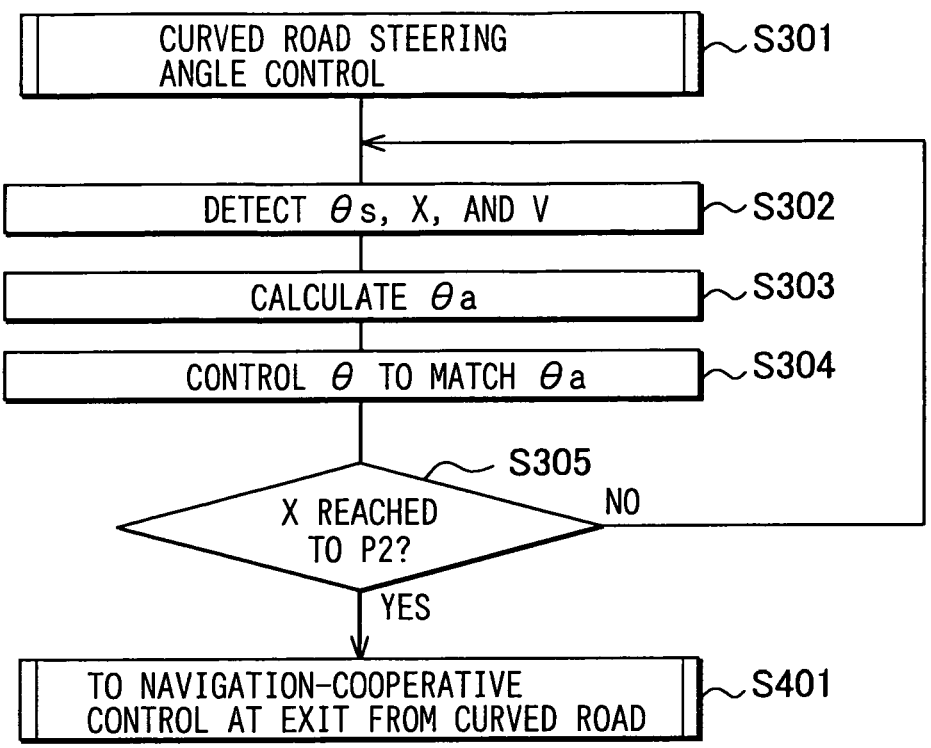
FIG. 10 is a flowchart showing curved road steering angle control according to embodiment 1.
Figure 11:
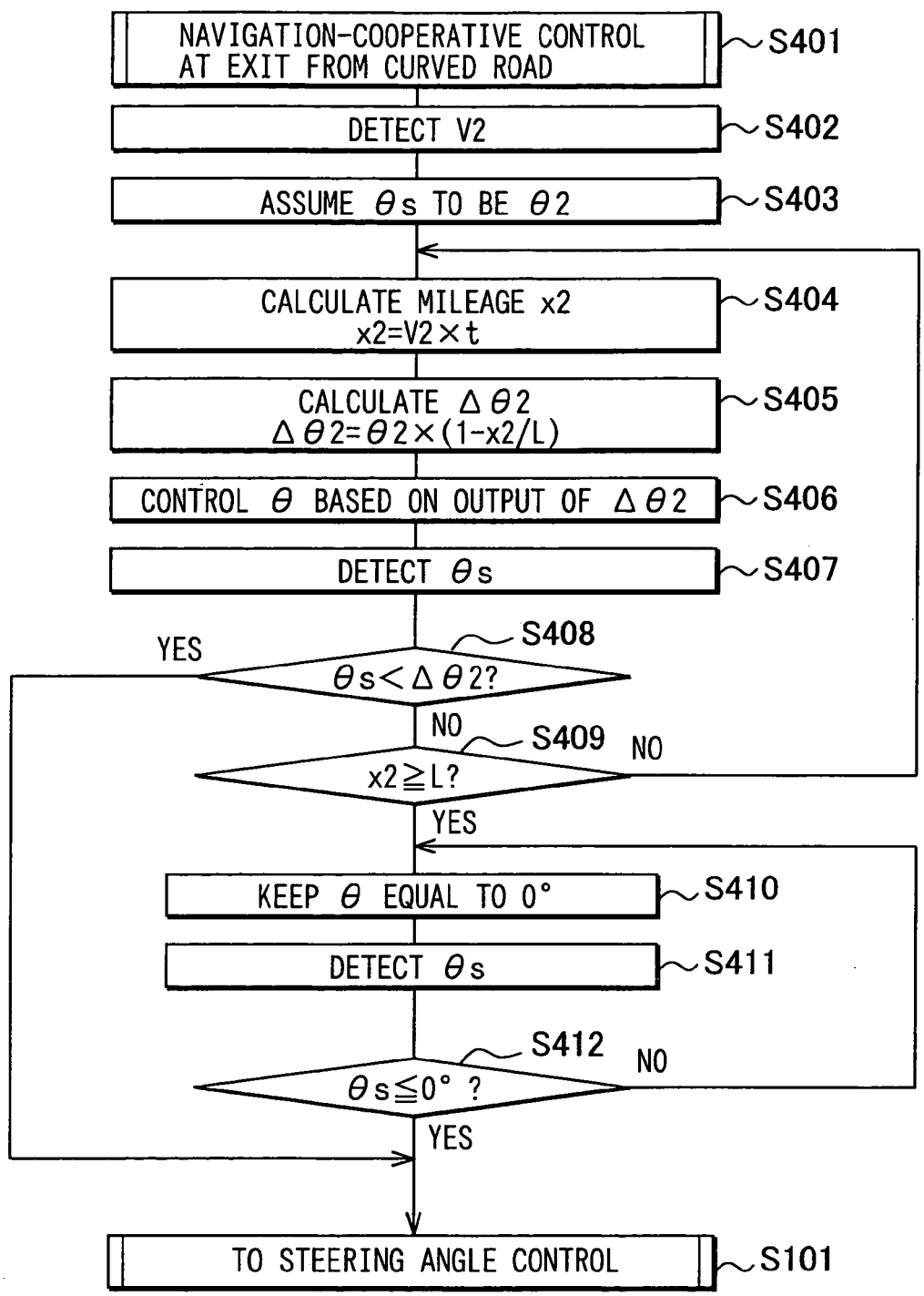
FIG. 11 is a flowchart showing navigation-cooperative control at the exit from the curved road according to embodiment 1.

The control unit 5 is constructed to selectively provide steering angle control and navigation-cooperative control to be described later. Under steering angle control, as shown in FIGS. 8 and 10, the control unit 5 successively operates the drive mechanism 3 based on the steering angle θs and the speed V of the vehicle 7. The steering angle detection unit successively detects the steering angle θs. The speed detection unit 43 successively detects the speed V. The control unit 5 controls swivel angle θ, i.e., an angle formed between forward direction F of the vehicle 7 and radiation direction (optical axis direction) D of the headlamp 2. Under navigation-cooperative control, as shown in FIGS. 9 and 11, the control unit 5 uses the navigation unit 44 to successively operate the drive mechanism 3 and control the swivel angle θ.

Figure 3:
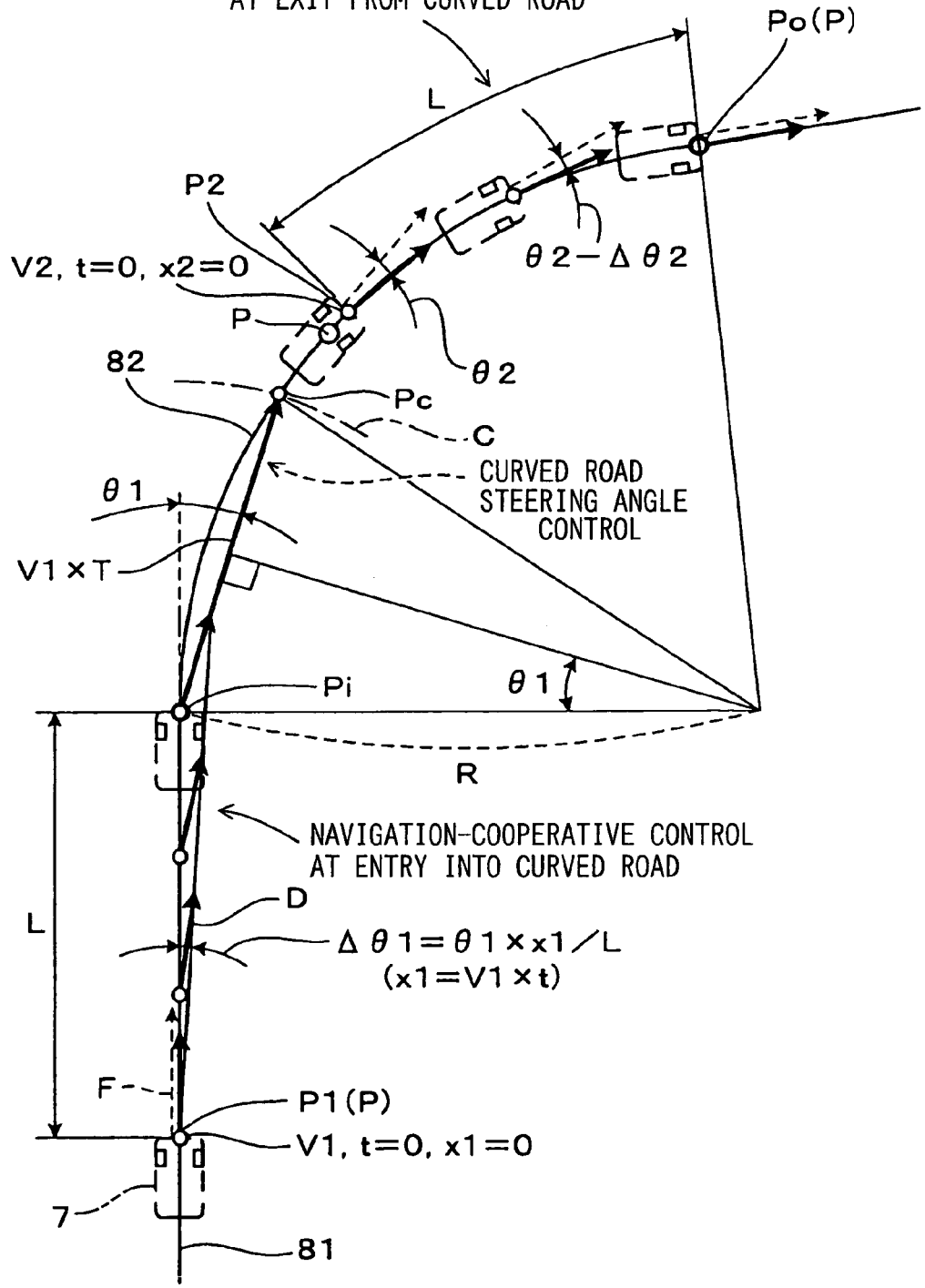
FIG. 3 is an explanatory diagram showing control provided by a control unit according to embodiment 1.

As shown in FIGS. 2 and 3, the control unit 5 is constructed to receive curved road start point Pi, curved road end point Po, curvature radius R of a curved road 82, and curved road direction information N from the navigation unit 44. The curved road start point Pi indicates the beginning of the curved road 82 out of the plurality of navigation points P. The curved road end point Po indicates the end of the curved road 82 out of the plurality of navigation points P. The curved road direction information N indicates whether the curved road 82 is a right curved road or a left curved road. The control unit 5 is assigned with control setup distance L and control setup time T used for the navigation-cooperative control.

Figure 4:
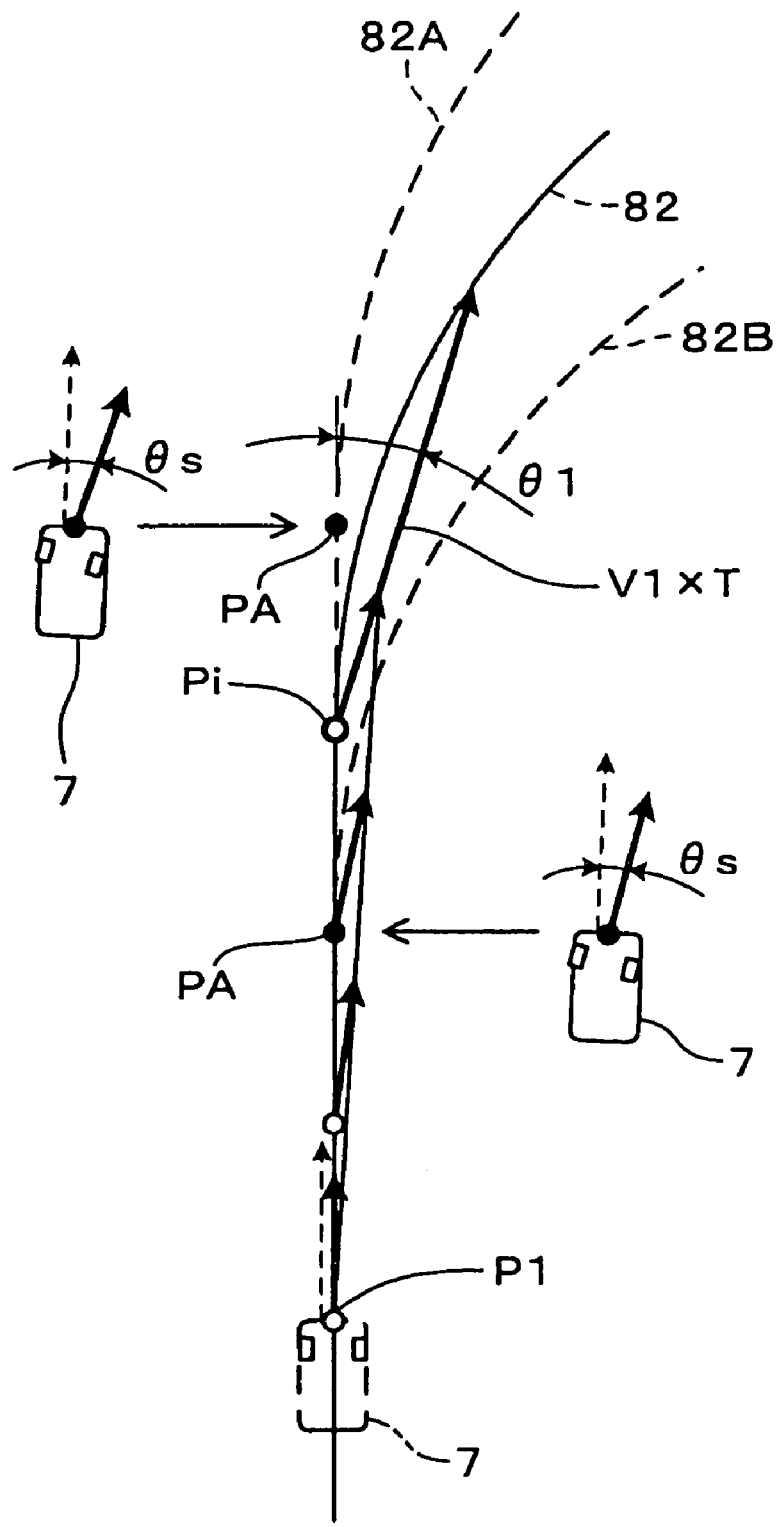
FIG. 4 is an explanatory diagram showing control provided by a control unit according to embodiment 1.

FIGS. 3 and 4 show how the vehicle headlamp apparatus 1 according to the embodiment is constructed. First, the vehicle 7 travels by turning on the headlamp 2 at night, for example. Here, the control unit 5 provides the navigation-cooperative control when the vehicle 7 enters or exits from the curved road 82. The control unit 5 provides the steering angle control when the vehicle 7 travels a straight road 81 or travels in the middle of the curved road 82. Based on the control unit 5, the vehicle headlamp apparatus 1 according to the embodiment can appropriately control light distribution directions of the headlamp 2 independently of whether the vehicle travels the straight road 81 or the curved road 82.

Specifically, as shown in FIG. 8, the control unit 5 according to the embodiment is constructed to provide the steering angle control, assuming that the vehicle 7 travels the straight road 81 until the current position of the vehicle 7 reaches an entry control start point P1. The position detection unit 42 detects the current position of the vehicle 7. The entry control start point P1 is positioned a control setup distance L short of a curved road start point Pi received from the navigation unit 44.

The control unit 5 is constructed as follows when current position X of the vehicle 7 reaches the entry control start point P1. In this case, the control unit 5 starts the navigation-cooperative control at entry into the curved road, assuming that the vehicle 7 enters the curved road 82.

FIG. 9 shows how the control unit 5 is constructed under the navigation-cooperative control at the entry into the curved road. The control unit 5 receives curvature radius R and curved road direction information N for the curved road 82 from the navigation unit 44. The speed detection unit 43 detects a current speed V of the vehicle 7. The control unit 5 finds a target swivel angle θ1 as a target angle for swivel angle θ based on the curvature radius R, the curved road direction information N, and the current speed V. The current position X of the vehicle 7 changes from the entry control start point P1 to the curved road start point Pi. During this transition, the control unit 5 operates the drive mechanism 3 to gradually change the swivel angle θ of the headlamp 2 until the swivel angle θ reaches the target swivel angle θ1.

FIG. 10 shows how the control unit 5 is constructed during or after execution of the navigation-cooperative control at the entry into the curved road. Namely, the steering angle detection unit 41 detects a current steering angle θs of the vehicle 7. When the current steering angle θs reaches the target swivel angle θ1, the control unit 5 provides steering angle control (referred to as curved road steering angle control in this example) as shown in FIG. 10.

Here, the control unit 5 is constructed as follows. The position detection unit 42 detects the current position X of the vehicle 7. The current position X may reach the exit control start point P2 that falls short of the curved road end point Po received from the navigation unit 44 for the control setup distance L. In this case, the control unit 5 assumes that the vehicle 7 exits from the curved road 82, and starts the navigation-cooperative control at the exit from the curved road.

FIG. 11 shows how the control unit 5 is constructed under the navigation-cooperative control at the exit from the curved road. The current position X of the vehicle 7 may change from the exit control start point P2 to the curved road end point Po. During this transition, the control unit 5 operates the drive mechanism 3 to gradually vary the swivel angle θ until it reaches 0° (initial swivel angle).

The control unit 5 is constructed as follows during or after execution of the navigation-cooperative control at the exit from the curved road. The steering angle detection unit 41 detects the current steering angle θs of the vehicle 7. When the current steering angle θs becomes 0°, the control unit 5 reperforms the steering angle control.

The following describes the vehicle headlamp apparatus 1 according to the embodiment with reference to FIGS. 1 through 11.

As shown in FIG. 1, a pair of the headlamps 2 is provided left and right at the front of the vehicle 7. The control unit 5 according to the embodiment is constructed to simultaneously provide the steering angle control and the navigation-cooperative control for the pair of left and right headlamps 2.

The drive mechanism 3 according to the embodiment is constructed to include a motor, a conversion mechanism, and the like. The motor can generate forward and backward rotation outputs. The conversion mechanism converts a rotative force generated by the motor into a force to horizontally move the headlamp 2.

The steering angle detection unit 41 according to the embodiment has a steering angle sensor to detect a steering amount H of a steering wheel of the vehicle 7. The steering angle detection unit 41 is constructed to detect a steering angle θs of the vehicle 7 based on the steering amount H detected by the steering angle sensor.

The steering angle θs of the vehicle 7 is found by the following equation, for example.

That is, the steering angle θs [°] is found by equation θs=H/S, where H is the steering amount [°] and S is the gear ratio for steering.

When providing the steering angle control, the control unit 5 can use the following equation to find a target swivel angle θa, i.e., a target angle to control the swivel angle θ of the headlamp 2.

That is, the target swivel angle θa is found from $\theta a = \theta s \times (1 + K \times V^2)/R$. In this equation, θs is the vehicle's steering angle, V the speed of the vehicle detected by the speed detection unit 43, R the curvature radius of the curved road 82, and K the stability factor (a value indicating the vehicle's driving stability). The control unit 5 can provide the steering angle control so that the swivel angle θ of the headlamp 2 reaches the target swivel angle θa.

The position detection unit 42 according to the embodiment is composed of a position sensor that uses an artificial satellite to detect a position X of the vehicle 7 on the ground. The speed detection unit 43 according to the embodiment is composed of a speed sensor to detect speed V of the vehicle 7. The navigation unit 44 according to the embodiment can be composed of a so-called navigation system to be described later. The control unit 5 according to the embodiment can be composed of a computer program in a control device mounted on the vehicle 7.

The control unit 5 is constructed as follows. At a specified sampling time, the steering angle detection unit 41 detects the steering angle θs of the vehicle 7. The position detection unit 42 detects the position X of the vehicle 7. The speed detection unit 43 detects the speed V of the vehicle 7. The navigation unit 44 detects the navigation information.

The navigation unit 44 is constructed as follows. The position detection unit 42 detects the position X of the vehicle 7. The navigation unit 44 verifies the position X against the road database 441 that stores a plurality of navigation points P. The navigation unit 44 determines in which place the vehicle 7 travels the road and what shape is attributed to the road the vehicle 7 is to travel at a given point later on.

The navigation unit 44 according to the embodiment is constructed to transmit the navigation information to the control unit 5. The navigation information includes a plurality of navigation points P along the road the vehicle 7 travels and the road curvature (or curvature radius R) obtained from the navigation points P. More specifically, the navigation information contains curved road start point Pi, curved road end point Po, curvature radius R and curved road direction information N of the curved road 82, and the like.

The control unit 5 according to the embodiment can configure and change setting values of the control setup distance L and the control setup time T. Setting values of the control setup distance L and the control setup time T can be predefined based on speed limits on various types of roads (ordinary roads, highways, and the like).

FIGS. 3 and 4 schematically show how the vehicle 7 travels the straight road 81 and the curved road 82 based on the road database 441 in the navigation unit 44.

The diagrams show that the control unit 5 provides the steering angle control when the vehicle 7 travels the straight road 81 and reaches the entry control start point P1. The drawings show that the control unit 5 provides the navigation-cooperative control at the entry into the curved road while vehicle 7 travels from the entry control start point P1 to the curved road start point Pi. The drawings show that the control unit 5 provides the curved road steering angle control when the vehicle 7 enters the curved road 82 and reaches the exit control start point P2. The drawings show that the control unit 5 provides the navigation-cooperative control at the exit from the curved road while the vehicle 7 travels from the exit control start point P2 to the curved road end point Po.

In FIG. 3, a straight virtual line 81 represents the straight road 81, a route the vehicle 7 travels. The virtual line 81 is formed by straight combining a plurality of navigation points P (nodes) that are arranged according to the road information as the straight road 81. A curved virtual line 82 represents the curved road 82, a route the vehicle 7 travels. The virtual line 82 is formed by curvedly combining a plurality of navigation points P (nodes) that are arranged according to the road information as the curved road 82.

As shown in FIG. 3, a curvature radius R of the curved virtual line 82 represents a curvature radius R of the curved road 82 provided by the navigation unit 44. An entry to the curved road 82 is provided with the curved road start point Pi indicating the beginning of the curved road 82. An exit from the curved road 82 is provided with the curved road end point Po indicating the end of the curved road 82.

The entry control start point P1 on the straight virtual line 81 representing the straight road 81 is for the control setup distance L far from the curved road start point Pi to the direction against the vehicle's traveling direction. The exit control start point P2 on the curved virtual line 82 representing the curved road 82 is for the control setup distance L far from the curved road end point Po to the direction against the vehicle's traveling direction.

(Navigation-Cooperative Control at the Entry into the Curved Road)

FIG. 3 shows how the control unit 5 according to the embodiment is constructed under the navigation-cooperative control at the entry into the curved road. The control unit 5 uses equation $\theta 1=\sin^{-1}(V1 \times T/2R) \times 180/\pi$ to find the target swivel angle $\theta 1$, i.e., a target angle of the swivel angle $\theta$ for the headlamp 2. In this equation, R [m] is the curvature radius R of the curved road 82 received from the navigation unit 44, V1 [m/s] the current speed of the vehicle 7 detected by the speed detection unit 43 at the entry control start point P1, and T [s] is the control setup time.

It can be understood that the equation for the target swivel angle $\theta 1$ is found by drawing the diagram in FIG. 3 as follows.

To find the target swivel angle $\theta 1$ in FIG. 3, a virtual circle C is drawn with the radius of V1×T around the curved road start point Pi. The curved virtual line 82 represents the curved road 82 having the curvature radius R. The virtual circle C crosses the virtual line 82 at a light distribution point Pc. A virtual straight line is drawn from the curved road start point Pi to the light distribution point Pc with the length of V1×T. The virtual straight line length is equivalent to a virtual distance assumed for the light radiated from the headlamp 2 under the navigation-cooperative control at the entry into the curved road. The direction of the virtual straight line having the length of V1×T is equivalent to a target direction to orient the optical axis of the light radiated from the headlamp 2 under the navigation-cooperative control at the entry into the curved road.

The virtual straight line having the length of V1×T forms an angle against the forward direction (straight direction) F of the vehicle 7. This angle is to be found as the target swivel angle $\theta 1$. The drawing shows that the magnitude of the target swivel angle $\theta 1$ is found by the equation $\theta 1=\sin^{-1}(V1 \times T/2R) \times 180/\pi$.

In FIG. 3, there has been described the case where the curved road 82 is a right curved road. The same applies when the curved road 82 is a left curved road.

As shown in FIG. 3, the control unit 5 according to the embodiment gradually changes the swivel angle $\theta$ of the headlamp 2 to the target swivel angle $\theta 1$ under the navigation-cooperative control at the entry into the curved road. For this purpose, the control unit 5 finds the following transient swivel angle $\Delta\theta 1[°]$. The control unit 5 provides control so that the swivel angle of the headlamp 2 successively reaches the transient swivel angle $\Delta\theta 1$.

That is, the control unit 5 uses the following to find the transient swivel angle $\Delta\theta 1$ under the navigation-cooperative control at the entry into the curved road: the elapsed time t [s] counted from a time point when the current position X of the vehicle 7 detected by the position detection unit 42 reaches the entry control start point P1; the current speed V1 [m/s] of the vehicle 7 detected by the speed detection unit 43 at the entry control start point P1; the control setup distance L [m]; and the target swivel angle $\theta 1$ [°].

After the current position X of the vehicle 7 reaches the entry control start point P1, the equation $x1=V1 \times t$ is used to find a distance x1 [m] assumed to be actually traveled by the vehicle 7 from the entry control start point P1. The transient swivel angle $\Delta\theta 1$ is found by using the equation $\Delta\theta 1=\theta 1 \times x1/L$. The transient swivel angle $\Delta\theta 1$ is an angle at each transient point during a change from the swivel angle $\theta$ of the headlamp 2 at the entry control start point P1 to the target swivel angle $\theta 1$ at the curved road start point Pi.

A plurality of the distances x1 and the transient swivel angles $\Delta\theta 1$ are found at the sampling points so that the control unit 5 can transmit operational instructions for x1 and $\Delta\theta 1$ values to the drive mechanism 3.

Figure 5:
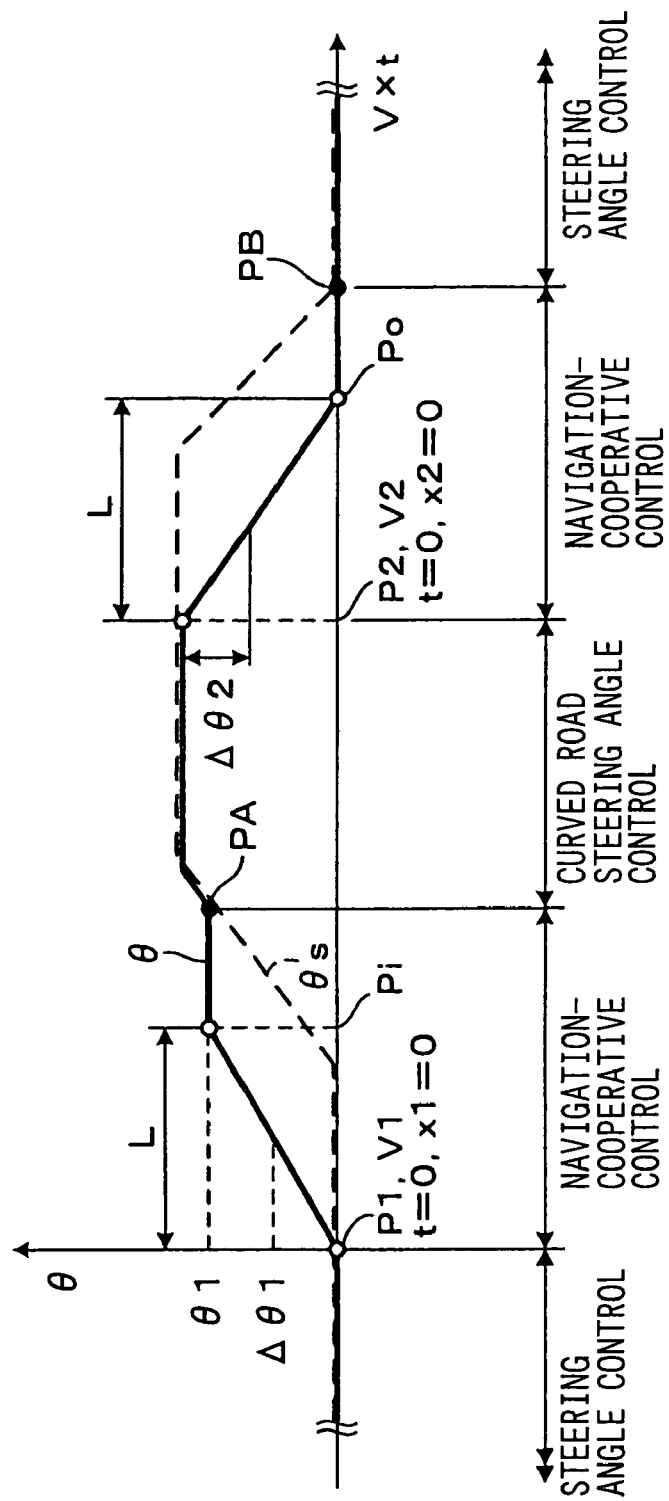
FIG. 5 is a graph showing changes in the swivel angle and the vehicle steering angle based on control pattern 1 according to embodiment 1.

As shown in FIG. 5, the control unit 5 is constructed as follows. First, each swivel angle $\theta$ is measured at each elapsed time t (each transient point) from the entry control start point P1. Here, until the mileage x1 of the vehicle 7 reaches the control setup distance L, the control unit 5 operates the drive mechanism 3 to vary the swivel angle $\theta$ so as to successively match the transient swivel angle $\Delta\theta 1$ at each elapsed time t.

The headlamp 2 may not cause the swivel angle $\theta$ to be 0° at the entry control start point P1. In this case, the transient swivel angle $\Delta\theta 1$ can be found from the equation $\Delta\theta 1=\theta 0+\theta 1 \times x1/L$ using swivel angle $\theta 0$ at the beginning of controlling the headlamp 2 at the entry control start point P1.

As mentioned above, the control unit 5 according to the embodiment is constructed as follows during or after execution of the navigation-cooperative control at the entry into the curved road. The steering angle detection unit 41 detects the current steering angle $\theta s$ of the vehicle 7. When the steering angle $\theta s$ reaches the target swivel angle $\theta 1$, the control unit 5 provides the curved road steering angle control.

Specifically, the control unit 5 provides one of the following three control patterns as navigation-cooperative control methods and steering angle control methods. These control patterns depend on how the current steering angle $\theta s$ of the vehicle 7 changes during execution of the navigation-cooperative control at the entry into the curved road.

Figure 6:
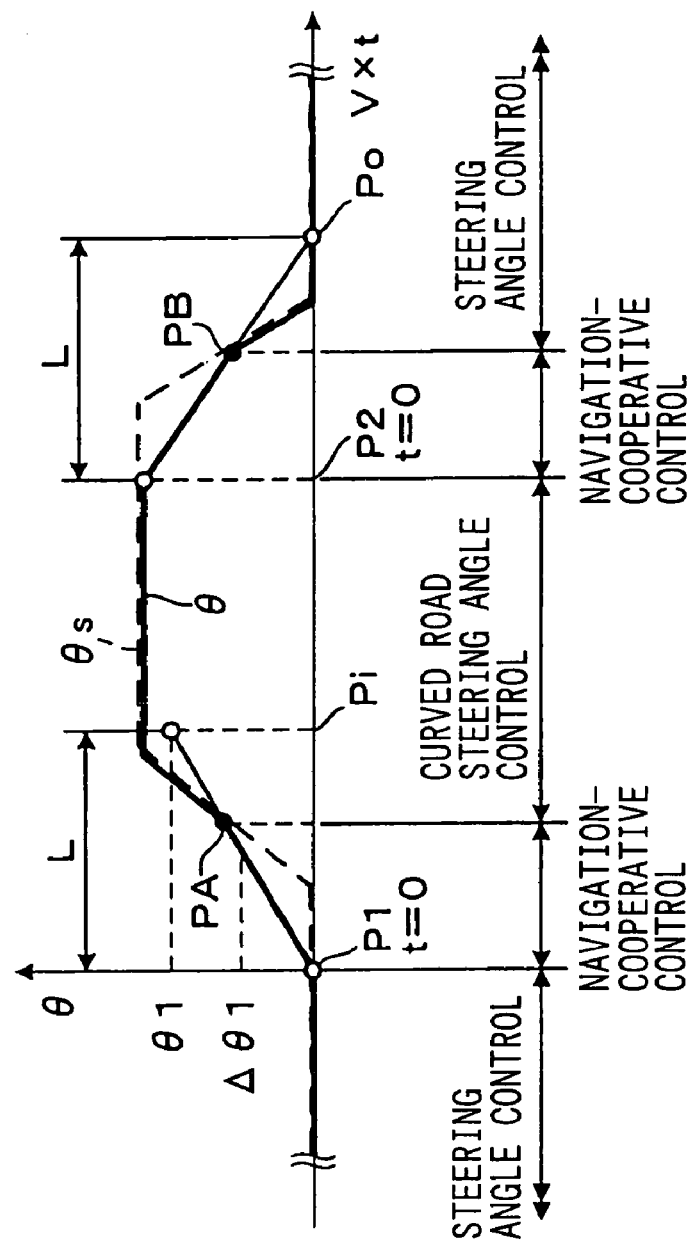
FIG. 6 is a graph showing changes in the swivel angle and the vehicle steering angle based on control pattern 2 according to embodiment 1.
Figure 7:
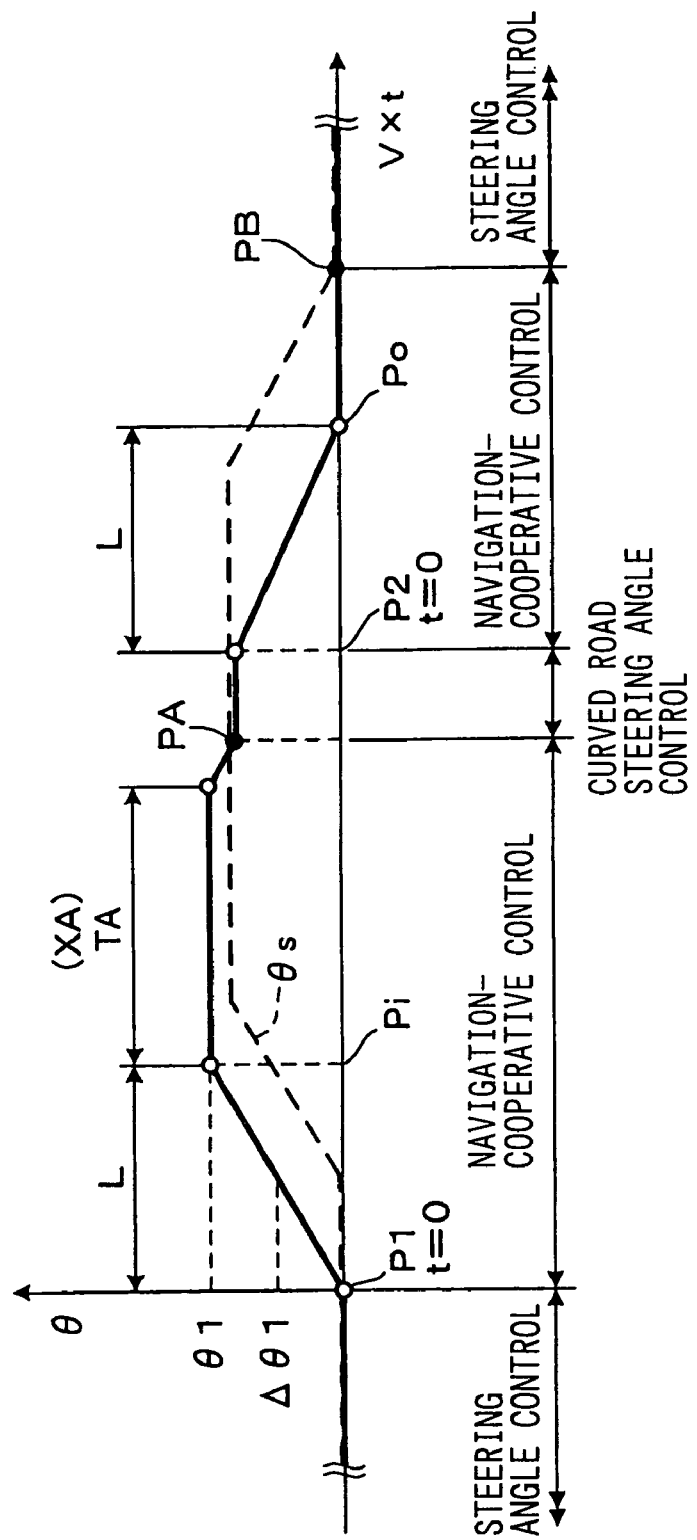
FIG. 7 is a graph showing changes in the swivel angle and the vehicle steering angle based on control pattern 3 according to embodiment 1.

In FIGS. 5 through 7, a thick line represents a change in the swivel angle $\theta$ of the headlamp 2. A broken line represents a change in the steering angle $\theta s$ detected by the steering angle detection unit 41.

FIG. 5 shows a first control pattern (control pattern 1) as follows. The control unit 5 provides the navigation-cooperative control at the entry into the curved road. After the swivel angle $\theta$ of the headlamp 2 reaches the target swivel angle $\theta 1$, a given time period elapses (before specified time TA passes or the vehicle 7 travels specified distance XA). Then, the current steering angle $\theta s$ of the vehicle 7 detected by the steering angle detection unit 41 reaches the target swivel angle $\theta 1$.

In this case, the control unit 5 is constructed as follows. After the swivel angle $\theta$ of the headlamp 2 reaches the target swivel angle $\theta 1$, the current steering angle $\theta s$ of the vehicle 7 may reach the target swivel angle $\theta 1$. Until this time point, the control unit 5 keeps the swivel angle $\theta$ of the headlamp 2 equal to the target swivel angle $\theta 1$. When the swivel angle $\theta$ of the headlamp 2 reaches the target swivel angle $\theta 1$, the control unit 5 changes the navigation-cooperative control to the curved road steering angle control. In this manner, the curved road steering angle control is provided.

As shown in FIG. 4, this control pattern 1 is performed when the curved road start point Pi provided by the navigation unit 44 is instructed earlier than the start position of the curved road 82A on the actual road. In FIG. 4, a solid line represents the curved road 82 provided by the navigation unit 44. A broken line represents the curved road 82A on the actual road in this case.

That is, the navigation-cooperative control at the entry into the curved road takes place. When the current position X of the vehicle 7 may reach the curved road start point Pi, the swivel angle θ of the headlamp 2 may thereby reach the target swivel angle θ1. Even in such case, a driver of the vehicle 7 does not operate the steering system since the vehicle 7 does not actually enter the curved road 82A. In consideration for this, the control unit 5 keeps the swivel angle θ of the headlamp 2 equal to the target swivel angle θ1 until the driver operates the steering system.

Thereafter, the vehicle 7 actually enters the curved road 82A. The driver operates the steering system. The current steering angle θs of the vehicle 7 detected by the steering angle detection unit 41 reaches the target swivel angle θ1 (indicated by PA in FIGS. 4 and 5). In this case, the control unit 5 changes the navigation-cooperative control to the curved road steering angle control. Consequently, the curved road steering angle control is provided.

Depending on cases, when the swivel angle θ of the headlamp 2 may reach the target swivel angle θ1, the current steering angle θs of the vehicle 7 may reach θ1. In this case, the curved road steering angle control may be provided immediately.

FIG. 6 shows a second control pattern (control pattern 2). The steering angle detection unit 41 detects the current steering angle θs of the vehicle 7. While the navigation-cooperative control at the entry into the curved road is being provided, the current steering angle θs exceeds the transient swivel angle Δθ1.

In this case, the control unit 5 is constructed as follows until the mileage x1 of the vehicle 7 reaches the control setup distance L. When the current steering angle θs of the vehicle 7 exceeds the transient swivel angle Δθ1, the control unit 5 changes the navigation-cooperative control to the curved road steering angle control. In this manner, the curved road steering angle control is provided to re-start.

As shown in FIG. 4, this control pattern 2 is performed when the curved road start point Pi provided by the navigation unit 44 is instructed later than the start position of the curved road 82B on the actual road. Alternatively, pattern 2 is performed when the navigation unit 44 provides the larger curvature radius R of the curved road 82 than the actual curvature radius. In FIG. 4, as explained above, the solid line represents the curved road 82 provided by the navigation unit 44. The broken line represents the curved road 82B on the actual road in this case.

That is, the current position X of the vehicle 7 may reach the entry control start point P1. While the navigation-cooperative control is subsequently provided, the vehicle 7 may actually enter the curved road 82B. At this time, the driver may thereby operate the steering system before the swivel angle θ of the headlamp 2 reaches the target swivel angle θ1. As a result, the steering angle θs of the vehicle 7 varies to thereby change the light distribution direction of the headlamp 2. Namely, before the swivel angle θ of the headlamp 2 reaches the target swivel angle θ1, the current steering angle θs of the vehicle 7 detected by the steering angle detection unit 41 exceeds the transient swivel angle Δθ1. At this point (PA in FIGS. 4 and 6), the control unit 5 changes the navigation-cooperative control to the steering angle control. In this manner, the steering angle control is provided to re-start.

FIG. 7 shows a third control pattern (control pattern 3). The control unit 5 provides the navigation-cooperative control at the entry into the curved road. The swivel angle θ of the headlamp 2 thereafter reaches the target swivel angle θ1. Furthermore, the specified time TA elapses (the vehicle 7 travels the specified distance XA). Even under such condition, the current steering angle θs of the vehicle 7 detected by the steering angle detection unit 41 does not reach the target swivel angle θ1.

In this case, the control unit 5 is constructed as follows after the swivel angle θ of the headlamp 2 reaches the target swivel angle θ1. The control unit 5 keeps the swivel angle θ of the headlamp 2 equal to the target swivel angle θ1 until the specified time TA elapses (the vehicle 7 travels the specified distance XA). After the specified time TA elapses (the vehicle 7 travels the specified distance XA), the control unit 5 changes the navigation-cooperative control to the curved road steering angle control. In this manner, the curved road steering angle control is provided to re-start. Further, in this case, the control unit 5 recognizes that the navigation unit 44 unsuccessfully recognized the curved road 82.

This control pattern 3 is performed when the navigation unit 44 incorrectly recognizes the curved road start point Pi. Alternatively, control pattern 3 is performed when the navigation unit 44 recognizes the curvature radius R of the curved road 82 to be smaller than the actual curvature radius.

For example, the control unit 5 starts keeping the swivel angle θ of the headlamp 2 equal to the target swivel angle θ1. After a specified time (after a specified distance traveled by the vehicle 7), the current steering angle θs of the vehicle 7 may not reach the target swivel angle θ1. This may be because the navigation unit 44 incorrectly recognize the curved road 82 or the magnitude of the curvature radius R. At this time (PA in FIG. 7), the control unit 5 determines that the curved road 82 is incorrectly recognized. The control unit 5 thereby changes the navigation-cooperative control to the curved road steering angle control.

(Navigation-Cooperative Control at the Exit from the Curved Road)

As shown in FIG. 3, the control unit 5 according to the embodiment gradually changes the swivel angle θ of the headlamp 2 to 0° under the navigation-cooperative control at the exit from the curved road. For this purpose, the control unit 5 finds the following transient swivel angle Δθ2[°] and provides control so that the swivel angle θ of the headlamp 2 successively reaches the transient swivel angle Δθ2.

The control unit 5 uses the following to find the transient swivel angle Δθ2 under the navigation-cooperative control at the exit from the curved road: the elapsed time t [s] counted from a time point when the current position X of the vehicle 7 detected by the position detection unit 42 reaches the exit control start point P2; the current speed V2 [m/s] of the vehicle 7 detected by the speed detection unit 43 at the exit control start point P2; the control setup distance L [m]; and the return swivel angle θ2 [°] as the steering angle θs of the vehicle 7 at a time point when the current position X of the vehicle 7 reaches the exit control start point P2.

After the current position X of the vehicle 7 reaches the exit control start point P2, the equation x2=V2×t is used to find a distance x2 [m] assumed to be actually traveled by the vehicle from the exit control start point P2. The transient swivel angle Δθ2 is found by using the equation Δθ2=θ2×(1−x2/L). The transient swivel angle Δθ2 is an angle at each transient point during a change from the swivel angle θ of the headlamp 2 at the exit control start point P2 to 0° (initial swivel angle) at the curved road end point Po.

As shown in FIG. 5, the control unit 5 is constructed as follows. A return amount of each swivel angle θ is defined at each elapsed time t (each transient point) from the exit control start point P2. Until the mileage x2 of the vehicle 7 reaches the control setup distance L, the control unit 5 operates the drive mechanism 3 to vary the swivel angle θ so that the return amount successively matches the transient swivel angle $\Delta\theta 2$ at each elapsed time t.

As mentioned above, the control unit 5 according to the embodiment is constructed as follows during or after execution of the navigation-cooperative control at the exit from the curved road. The steering angle detection unit 41 detects the current steering angle $\theta s$ of the vehicle 7. When the steering angle $\theta s$ reaches 0°, the control unit 5 reperforms the curved road steering angle control.

Specifically, the control unit 5 provides one of the following two control patterns as navigation-cooperative control methods and steering angle control methods. These control patterns depend on how the current steering angle $\theta s$ of the vehicle 7 changes during execution of the navigation-cooperative control at the exit from the curved road.

As shown in FIGS. 5 and 7, a first control pattern (control pattern 1) applies to the following case. The navigation-cooperative control at the exit from the curved road is performed. After the swivel angle $\theta$ of the headlamp 2 thereby reaches 0° and, furthermore, a given time elapses, the current steering angle $\theta s$ of the vehicle 7 detected by the steering angle detection unit 41 reaches 0°.

In this case, the control unit 5 is constructed as follows. After the swivel angle $\theta$ of the headlamp 2 reaches 0°, the current steering angle $\theta s$ of the vehicle 7 may reach 0°. Until this time point, the control unit 5 keeps the swivel angle $\theta$ of the headlamp 2 equal to 0°. After the swivel angle $\theta$ of the headlamp 2 reaches 0°, the control unit 5 changes the navigation-cooperative control to the steering angle control. In this manner, the steering angle control is provided to re-start.

This control pattern 1 is performed when the curved road end point Po provided by the navigation unit 44 is instructed earlier than the end position of the curved road on the actual road.

That is, the navigation-cooperative control at the exit from the curved road takes place. When the current position X of the vehicle 7 may reach the curved road end point Po, the swivel angle $\theta$ of the headlamp 2 may thereby reach 0°. Even in such case, a driver of the vehicle 7 does not return the steering system to the original state because the vehicle 7 does not actually exit from the curved road. In consideration for this, the control unit 5 keeps the swivel angle $\theta$ of the headlamp 2 equal to 0° until the driver returns the steering system to the original state.

Thereafter, the vehicle 7 actually exits from the curved road. The driver returns the steering system to the original state. The current steering angle $\theta s$ of the vehicle 7 detected by the steering angle detection unit 41 reaches 0° (indicated by PB in FIGS. 5 and 7). In this case, the control unit 5 changes the navigation-cooperative control to the steering angle control. Consequently, the steering angle control is provided.

FIG. 6 shows a second control pattern (control pattern 2). The steering angle detection unit 41 detects the current steering angle $\theta s$ of the vehicle 7. While the navigation-cooperative control at the exit from the curved road is being provided, the current steering angle $\theta s$ becomes smaller than the transient swivel angle $\Delta\theta 2$.

In this case, the control unit 5 is constructed as follows until the mileage x2 of the vehicle 7 reaches the control setup distance L. When the current steering angle $\theta s$ of the vehicle 7 becomes smaller than the transient swivel angle $\Delta\theta 2$, the control unit 5 changes the navigation-cooperative control to the steering angle control. In this manner, the steering angle control is provided to re-start.

This control pattern 2 is performed when the curved road end point Po provided by the navigation unit 44 is instructed later than the end position of the curved road on the actual road.

That is, the current position X of the vehicle 7 may reach the exit control start point P2. While the navigation-cooperative control is subsequently provided, the vehicle 7 may actually exit from the curved road. At this time, the driver may thereby operate the steering system before the swivel angle $\theta$ of the headlamp 2 reaches 0°. As a result, the steering angle $\theta s$ of the vehicle 7 varies to thereby change the light distribution direction of the headlamp 2. Namely, before the swivel angle $\theta$ of the headlamp 2 reaches 0°, the current steering angle $\theta s$ of the vehicle 7 detected by the steering angle detection unit 41 becomes smaller than the transient swivel angle $\Delta\theta 2$. At this point (PB in FIG. 6), the control unit 5 changes the navigation-cooperative control to the steering angle control. In this manner, the steering angle control is provided to re-start.

Although not shown in the drawings, there may be a third control pattern under the navigation-cooperative control at the exit from the curved road like control pattern 3 for the above-mentioned navigation-cooperative control at the entry into the curved road. The control unit 5 may be constructed as follows. When the swivel angle $\theta$ of the headlamp 2 reaches 0°, the control unit 5 keeps the swivel angle $\theta$ of the headlamp 2 equal to 0° until a specified time elapses (the vehicle 7 travels a specified distance). When the specified time elapses (the vehicle 7 travels the specified distance), the control unit 5 changes the navigation-cooperative control to the steering angle control to provide the steering angle control.

The curved road 82 may be S-shaped (i.e., a right curved road is immediately followed by a left curved road, or a left curved road is immediately followed by a right curved road). In this case, it is possible to provide the navigation-cooperative control at the exit from the curved road, and then immediately provide the next navigation-cooperative control at the entry into the curved road.

(Control Order)

With reference to flowcharts in FIGS. 8 through 11, the following describes a method of controlling the vehicle headlamp apparatus 1 according to the embodiment using the above-mentioned control unit 5.

As shown in FIG. 8, the driver of the vehicle 7 first uses the control unit 5 to set the control setup distance L and the control setup time T (Step S101).

(Steering Angle Control)

The control unit 5 starts the steering angle control (S102). The steering angle detection unit 41 detects the steering angle $\theta s$ of the vehicle 7. The position detection unit 42 detects the position X of the vehicle 7. The speed detection unit 43 detects the speed V of the vehicle 7 (S103). Based on the steering angle $\theta s$ and the speed V of the vehicle 7, the control unit 5 finds the target swivel angle $\theta a$ as a target angle for the swivel angle $\theta$ of the headlamp 2 (S104).

The control unit 5 operates the drive mechanism 3 to change the swivel angle $\theta$ of the headlamp 2 to the target swivel angle $\theta a$ (S105). In this manner, the control unit 5 repeats Steps S103 through S105 to provide the steering angle control and control the swivel angle $\theta$ of the headlamp 2.

The control unit 5 then obtains navigation information from the navigation unit 44 (S106). The navigation information includes the presence or absence of the curved road start point Pi, the curved road end point Po, and the like.

The control unit 5 confirms whether or not to obtain information about the presence of the curved road start point Pi from the navigation unit 44 (S107). When obtaining the information about the presence of the curved road start point Pi, the control unit 5 determines whether or not the current position X of the vehicle 7 reaches the entry control start point P1 (S108). When the current position X of the vehicle 7 reaches the entry control start point P1, the control unit 5 provides the navigation-cooperative control at the entry into the curved road instead of the steering angle control (S201). When the current position X of the vehicle 7 does not reach the entry control start point P1, the control unit 5 repeats the steering angle control (S102 through S108).

(Navigation-Cooperative Control at the Entry into the Curved Road)

As shown in FIG. 9, the control unit 5 starts the navigation-cooperative control at the entry into the curved road (S201). The control unit 5 uses the speed detection unit 43 to detect a current speed V1 of the vehicle 7 when the current position X of the vehicle 7 reaches the entry control start point P1 (S202). From the navigation unit 44, the control unit 5 obtains a curvature radius R and curved road direction information N of the curved road 82 where the curved road start point Pi is detected (S203).

The control unit 5 finds the target swivel angle θ1 from equation θ1=sin$^{-1}$(V1×T/2R)×180/π using data such as the current speed V1 of the vehicle 7, the control setup time T, and the curvature radius R of the curved road 82 (S204). Further, the control unit 5 counts the elapsed time t from a time point when the current position X of the vehicle 7 reaches the entry control start point P1.

The control unit 5 finds a mileage x1 assumed to be actually traveled by the vehicle 7 from the entry control start point P1 from equation x1=V1×t using the elapsed time t and the current speed V1 of the vehicle 7 (S205).

The control unit 5 finds a transient swivel angle Δθ1 from equation Δθ1=θ1×x1/L using the mileage x1, the control setup distance L, and the target swivel angle θ1 (S206). The transient swivel angle Δθ1 is measured at each transient point when the swivel angle θ of the headlamp 2 is gradually varied up to the target swivel angle θ1.

The control unit 5 operates the drive mechanism 3 so that the swivel angle θ of the headlamp 2 at the current sampling point becomes the transient swivel angle Δθ1 at the current sampling point (S207). In this manner, the control unit 5 repeats Steps S205 through S207 to provide the navigation-cooperative control at the entry into the curved road and control the swivel angle θ of the headlamp 2.

The control unit 5 then uses the steering angle detection unit 41 to detect the current steering angle θs of the vehicle 7 (S208). The control unit 5 determines whether or not the current steering angle θs becomes larger than the transient swivel angle Δθ1 at the current sampling point (S209). When the current steering angle θs becomes larger than the transient swivel angle Δθ1 at the current sampling point, the control unit 5 provides the curved road steering angle control instead of the navigation-cooperative control at the entry into the curved road (S301). In this case, the vehicle actually enters the curved road. The driver of the vehicle 7 operates the steering system. It is assumed that the current steering angle θs increases. It is possible to fast and smoothly change the control.

When the current steering angle θs is smaller than or equal to the transient swivel angle Δθ1 at the current sampling point, the control unit 5 determines whether or not the mileage x1 of the vehicle 7 becomes larger than or equal to the control setup distance L (S210). When the mileage x1 of the vehicle 7 does not reach the control setup distance L, the control unit 5 repeats Steps S205 through S210 until the mileage x1 of the vehicle 7 reaches the control setup distance L.

When the mileage x1 of the vehicle 7 becomes larger than or equal to the control setup distance L, the swivel angle θ of the headlamp 2 reaches the target swivel angle θ1. The steering angle detection unit 41 detects the current steering angle θs of the vehicle 7. The control unit 5 keeps the swivel angle θ of the headlamp 2 equal to the target swivel angle θ1 (S211) until the steering angle θs exceeds the target swivel angle θ1 (S213).

The control unit 5 then uses the steering angle detection unit 41 to re-detect the current steering angle θs of the vehicle 7 (S212). The control unit determines whether or not the current steering angle θs becomes larger than the target swivel angle θ1 (S213).

The steering angle detection unit 41 detects the current steering angle θs of the vehicle 7. The current steering angle θs may exceed the target swivel angle θ1 (S213). In this case, the control unit 5 provides the curved road steering angle control instead of the navigation-cooperative control at the entry into the curved road (S301). At this time, as a result, it is assumed as follows: Since the vehicle 7 actually enters the curved road, the driver of the vehicle 7 operates the steering system. The current steering angle θs thereby increases. This makes it possible to fast and smoothly change the control.

The control unit 5 counts the elapsed time t from a time point when the swivel angle θ of the headlamp 2 reaches the target swivel angle θ1. The control unit 5 determines whether or not the elapsed time t reaches the specified preset time TA (S214). The control unit 5 repeats Steps S211 through S214 until the elapsed time t reaches the specified preset time TA to keep the swivel angle θ of the headlamp 2 equal to the target swivel angle θ1.

The elapsed time t may exceed the specified preset time TA (S214). In this case, the control unit 5 gradually varies the swivel angle θ of the headlamp 2 so as to reach the current steering angle θs detected by the steering angle detection unit 41 (S215). The control unit 5 provides the curved road steering angle control instead of the navigation-cooperative control at the entry into the curved road (S301). At this time, there is no increase in the current steering angle θs against expectation. It is assumed that the navigation unit 44 incorrectly recognizes the curved road 82 or the magnitude of the curvature radius R. It is possible to fast and smoothly change the control.

In this manner, the control unit 5 provides the navigation-cooperative control at the entry into the curved road to control the swivel angle θ of the headlamp 2.

(Curved Road Steering Angle Control)

As shown in FIG. 10, the control unit 5 then starts the curved road steering angle control (S301). The steering angle detection unit 41 detects the current steering angle θs of the vehicle 7. The position detection unit 42 detects the position X of the vehicle 7. The speed detection unit 43 detects the speed V of the vehicle 7 (S302). Based on the current steering angle θs and the speed V of the vehicle 7, the control unit 5 finds the target swivel angle θa as the target angle for the swivel angle θ of the headlamp 2 (S303).

The control unit 5 operates the drive mechanism 3 to change the swivel angle θ of the headlamp 2 to the target swivel angle θa (S304). In this manner, the control unit 5 repeats Steps S302 through S304 to provide the steering angle control to control the swivel angle θ of the headlamp 2.

The control unit 5 determines whether or not the current position X of the vehicle 7 detected by the position detection unit 42 reaches the exit control start point P2 (S305). When the current position X of the vehicle 7 reaches the exit control start point P2, the control unit 5 provides the navigation-cooperative control at the exit from the curved road instead of the curved road steering angle control (S401).

When the current position X of the vehicle 7 does not reach the exit control start point P2, the control unit 5 repeats the steering angle control (S302 through S305).

(Navigation-Cooperative Control at the Exit from the Curved Road)

As shown in FIG. 11, the control unit 5 starts the navigation-cooperative control at the exit from the curved road (S401). The speed detection unit 43 detects the current speed V2 of the vehicle 7 when the current position X of the vehicle 7 reaches the exit control start point P2 (S402).

When the current position X of the vehicle 7 reaches the exit control start point P2, the steering angle detection unit 41 detects the current steering angle θs of the vehicle 7. The control unit 5 assumes the current steering angle θs to be the return swivel angle θ2 (S403). Further, the control unit 5 counts the elapsed time t from a time point when the current position X of the vehicle 7 reaches the exit control start point P2.

The control unit 5 finds a mileage x2 assumed to be actually traveled by the vehicle 7 from the exit control start point P2 from equation x2=V2×t using the elapsed time t and the current speed V2 of the vehicle 7 (S404).

The control unit 5 finds a transient swivel angle Δθ2 from equation Δθ2=θ2×(1−x2/L) using the mileage x2, the control setup distance L, and the return swivel angle θ2 (S405). The transient swivel angle Δθ2 is measured at each transient point when the swivel angle θ of the headlamp 2 is gradually varied to 0°.

The control unit 5 operates the drive mechanism 3 so that the swivel angle θ of the headlamp 2 at the current sampling point becomes the transient swivel angle Δθ2 at the current sampling point (S406). In this manner, the control unit 5 repeats Steps S404 through S406 to provide the navigation-cooperative control at the exit from the curved road to control the swivel angle θ of the headlamp 2.

The control unit 5 then uses the steering angle detection unit 41 to detect the current steering angle θs of the vehicle 7 (S407). The control unit 5 determines whether or not the current steering angle θs becomes smaller than the transient swivel angle Δθ2 at the current sampling point (S408). When the current steering angle θs becomes smaller than the transient swivel angle Δθ2 at the current sampling point, the control unit 5 provides the steering angle control instead of the navigation-cooperative control (S101). In this case, it is assumed as follows: Because the vehicle actually exits from the curved road, the driver of the vehicle 7 operates the steering system. The current steering angle θs thereby decreases. This makes it possible to fast and smoothly change the control.

When the current steering angle θs is larger the transient swivel angle Δθ2 at the current sampling point, the control unit 5 determines whether or not the mileage x2 of the vehicle 7 becomes larger than or equal to the control setup distance L (S409). When the mileage x2 of the vehicle 7 does not reach the control setup distance L, the control unit 5 repeats Steps S404 through S409 until the mileage x2 of the vehicle 7 reaches the control setup distance L.

When the mileage x2 of the vehicle 7 becomes larger than or equal to the control setup distance L, it is assumed that the swivel angle θ of the headlamp 2 reaches 0°. The steering angle detection unit 41 detects the current steering angle θs of the vehicle 7. The control unit 5 keeps the swivel angle θ of the headlamp 2 equal to 0° (S410) until the steering angle θs becomes 0° (S412).

The control unit 5 then uses the steering angle detection unit 41 to re-detect the current steering angle θs of the vehicle 7 (S411). The control unit determines whether or not the current steering angle θs becomes smaller than or equal to 0° (S412).

The steering angle detection unit 41 detects the current steering angle θs of the vehicle 7. The current steering angle θs may become smaller than or equal to 0° (S412). In this case, the control unit 5 provides the steering angle control instead of the navigation-cooperative control (S101). At this time, as a result, it is assumed as follows: Because the vehicle actually exits from the curved road, the driver of the vehicle 7 returns the steering system to the original state. The current steering angle θs thereby becomes 0°. This makes it possible to fast and smoothly change the control.

In this manner, the control unit 5 performs the navigation-cooperative control at the exit from the curved road to control the swivel angle θ of the headlamp 2, and then performs the steering angle control.

Thereafter, the control unit 5 can repeatedly perform the navigation-cooperative control at the entry into the curved road, the curved road steering angle control, and the navigation-cooperative control at the exit from the curved road each time the navigation unit 44 recognizes the curved road 82.

The following describes working effects of the vehicle headlamp apparatus 1 according to the embodiment.

As mentioned above, the entry control start point P1 is positioned the control setup distance L short of the curved road start point Pi. Until the current position X of the vehicle 7 reaches the entry control start point P1, the control unit 5 performs the steering angle control assuming that the vehicle travels the straight road. Under the steering angle control, the control unit 5 can appropriately control light distribution directions of the headlamp 2 based on the steering angle θs and the current speed V of the vehicle 7.

When the current position. X of the vehicle 7 reaches the entry control start point P1, the control unit 5 starts the navigation-cooperative control at the entry into the curved road, assuming that the vehicle is to enter the curved road 82. Under the navigation-cooperative control, the control unit 5 varies the swivel angle θ of the headlamp 2 toward the curved road 82 before the vehicle actually enters the curved road 82.

When the vehicle 7 is assumed to enter the curved road 82, it is possible to previously orient the light distribution direction formed by the headlamp 2 of the vehicle 7 toward the curved road 82. Therefore, in a case where the vehicle 7 enters the curved road 82, it is possible to previously vary the light distribution direction of the headlamp 2 before the driver of the vehicle 7 operates the steering system toward the direction of the curved road 82. The driver's visibility can be ensured appropriately.

The target swivel angle θ1 is a target angle for the swivel angle θ of the headlamp 2. Under the navigation-cooperative control at the entry into the curved road, the control unit 5 finds the target swivel angle θ1 based on the curvature radius R and the curved road direction information N about the curved road 82 and the current speed V1 of the vehicle 7. The curvature radius R and the curved road direction information N are received from the navigation unit 44. The speed detection unit 43 detects the current speed V1.

In this case, the magnitude of the target swivel angle θ1 can be appropriately found based on the curvature radius R of the curved road 82 and the current speed V1 of the vehicle 7. Further, the direction of the target swivel angle θ1 can be found based on the curved road direction information N (indicating whether the curved road 82 is a right curved road winding to the right of the vehicle's traveling direction or a left curved road winding to the left of the vehicle's traveling direction).

Under the navigation-cooperative control at the entry into the curved road, the control unit 5 functions as follows while the current position X of the vehicle 7 changes from the entry control start point P1 to the curved road start point Pi. That is, the control unit 5 operates the drive mechanism 3 to gradually vary the swivel angle θ of the headlamp 2 until the swivel angle θ reaches the target swivel angle θ1. This can help prevent the light distribution direction caused by the headlamp 2 from being subject to sudden and discontinuous changes when the control unit 5 changes the steering angle control to the navigation-cooperative control.

When the vehicle 7 actually enters the curved road, the driver of the vehicle 7 operates the steering system. At this time, a change occurs in the current steering angle θs of the vehicle 7 detected by the steering angle detection unit 41. Consequently, the current steering angle θs of the vehicle 7 may become the target swivel angle θ1 during or after execution of the navigation-cooperative control. In this case, the control unit 5 changes the navigation-cooperative control to the curved road steering angle control to perform the curved road steering angle control.

Thus, when the driver of the vehicle 7 may actually operate the steering system to orient the vehicle 7 toward the curved road direction, it is possible to vary the light distribution direction of the headlamp 2 in accordance with actual directions of the vehicle 7. The driver's visibility can be thereby ensured appropriately.

The exit control start point P2 is positioned the control setup distance L short of the curved road end point Po. When the current position X of the vehicle 7 reaches the exit control start point P2, the control unit 5 starts the navigation-cooperative control at the exit from the curved road, assuming that the vehicle 7 is to exit from the curved road 82. Under the navigation-cooperative control, the control unit 5 varies the swivel angle θ of the headlamp 2 toward a straight road or the like following the curved road 82 before the vehicle actually exits from the curved road 82.

When the vehicle 7 may be assumed to exit from the curved road 82, it is possible to previously orient the light distribution direction caused by the headlamp 2 of the vehicle 7 toward a straight road or the like following the curved road 82. Therefore, in a case where the vehicle 7 exits from the curved road 82, the light distribution direction of the headlamp 2 can be also previously varied before the driver of the vehicle 7 returns the steering system's operation to the original state. The driver's visibility can be ensured appropriately.

Under the navigation-cooperative control at the exit from the curved road, the control unit 5 functions as follows while the current position X of the vehicle 7 changes from the exit control start point P2 to the curved road end point Po. That is, the control unit 5 operates the drive mechanism 3 to gradually vary the swivel angle θ of the headlamp 2 until the swivel angle θ reaches 0°. This can help prevent the light distribution direction caused by the headlamp 2 from being subject to sudden and discontinuous changes when the control unit 5 changes the curved road steering angle control to the navigation-cooperative control.

When the vehicle 7 actually exits from the curved road, the driver of the vehicle 7 returns the steering system operation to the original state. At this time, a change occurs in the current steering angle θs of the vehicle 7 detected by the steering angle detection unit 41. The current steering angle θs of the vehicle 7 may become 0° during or after execution of the navigation-cooperative control. In such case, the control unit 5 changes the navigation-cooperative control to the steering angle control to reperform the steering angle control.

When the driver of the vehicle 7 returns the steering system operation to the original state, the direction of the vehicle 7 may be oriented toward a straight road or the like following the curved road 82. In such case, it is possible to vary the light distribution direction of the headlamp 2 in accordance with actual directions of the vehicle 7. The driver's visibility can be ensured appropriately.

As mentioned above, the vehicle headlamp apparatus 1 according to the embodiment can help prevent the light distribution direction caused by the headlamp 2 from being subject to sudden and discontinuous changes. The driver's visibility can be ensured appropriately.

According to embodiment 1, the control unit 5 provides the steering angle control, the navigation-cooperative control at the entry into the curved road, the curved road steering angle control, and the navigation-cooperative control at the exit from the curved road in order. Further, the control unit 5 may provide the steering angle control, the navigation-cooperative control at the entry into the curved road, and the steering angle control in order and may omit the navigation-cooperative control at the exit from the curved road. Furthermore, the control unit 5 may provide the steering angle control, the navigation-cooperative control at the exit from the curved road, and the steering angle control in order and may omit the navigation-cooperative control at the entry into the curved road.

Embodiment 2

As shown in FIGS. 12 through 16, the vehicle headlamp apparatus 1 according to the embodiment only uses the control setup time T to provide the navigation-cooperative control at the entry into the curved road and the navigation-cooperative control at the exit from the curved road.

Compared to the above-mentioned embodiment 1, the control unit 5 according to embodiment 2 provides the navigation-cooperative control at the entry into the curved road to find the entry control start point P1 using the control setup time T, not using the control setup distance L. While the control setup time T elapses, the control unit 5 gradually varies the swivel angle θ until it reaches the target swivel angle θ1.

Compared to the above-mentioned embodiment 1, the control unit 5 according to embodiment 2 provides the navigation-cooperative control at the exit from the curved road to find the exit control start point P2 using the control setup time T, not using the control setup distance L. While the control setup time T elapses, the control unit 5 gradually varies the swivel angle θ until it reaches 0°.

Figure 12:
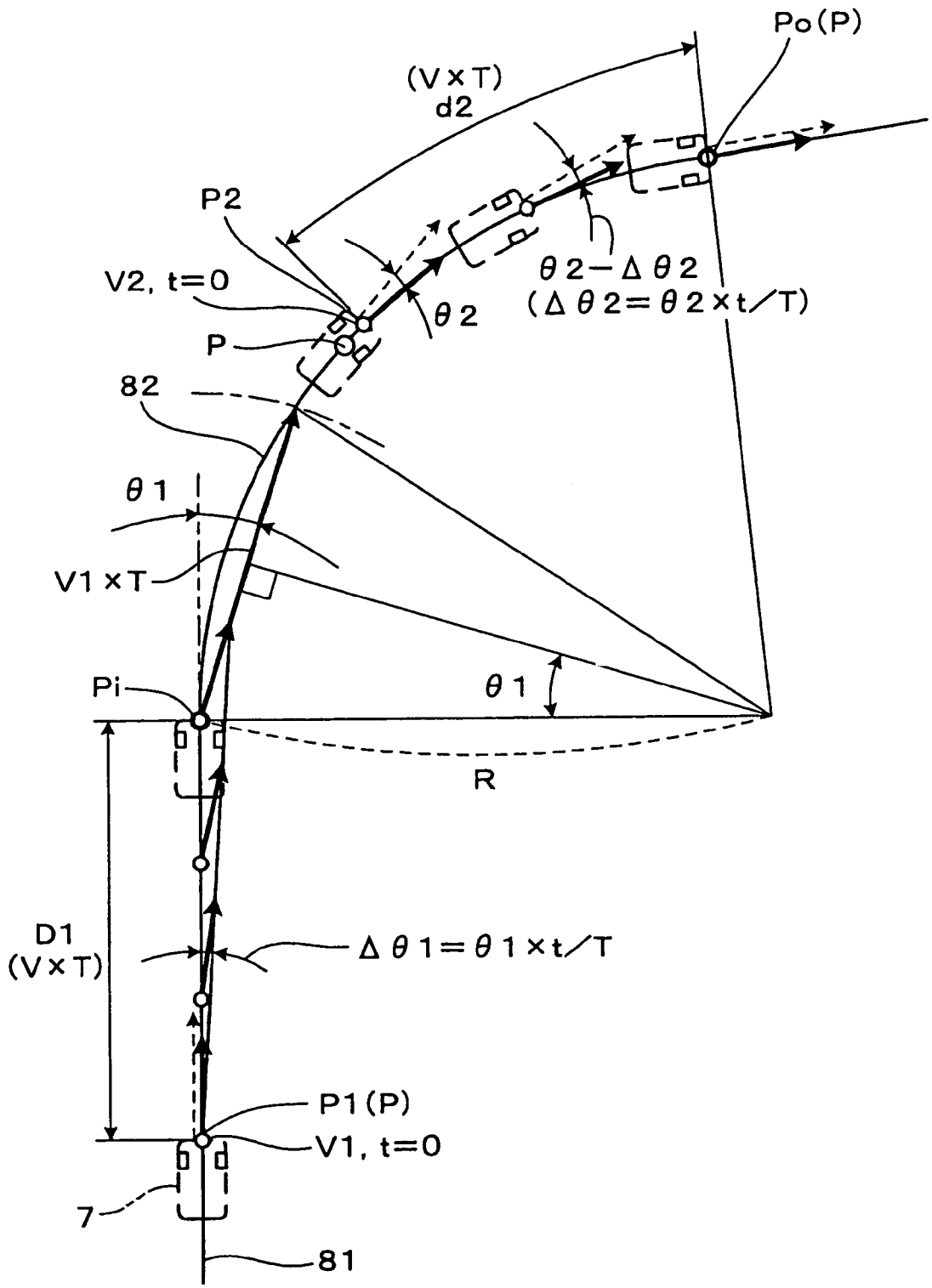
FIG. 12 is an explanatory diagram showing control provided by control unit according to embodiment 2.

More specifically, as shown in FIG. 12, the control unit 5 according to the embodiment finds the following transient swivel angle θ1 [°] so as to gradually vary the swivel angle θ of the headlamp 2 up to the target swivel angle θ1 under the navigation-cooperative control at the entry into the curved road. The control unit 5 provides control so that the swivel angle θ of the headlamp 2 successively reaches the transient swivel angle Δθ1.

That is, the control unit 5 finds the transient swivel angle $\Delta\theta 1$ under the navigation-cooperative control at the entry into the curved road using the elapsed time t [s], the control setup time T [s], and the target swivel angle $\theta 1$ [°]. The elapsed time t is counted from a time point when the current position X of the vehicle 7 detected by the position detection unit 42 reaches the entry control start point P1.

The control unit 5 finds the transient swivel angle $\Delta\theta 1$ from equation $\Delta\theta 1 = \theta 1 \times t/T$. The transient swivel angle $\Delta\theta 1$ is found as an angle at each transient point when the swivel angle $\theta$ of the headlamp 2 at the entry control start point P1 is changed to the target swivel angle $\theta 1$ at the curved road start point Pi.

A plurality of the transient swivel angles $\Delta\theta 1$ are found at the sampling points so that the control unit 5 can transmit operational instructions for $\Delta\theta 1$ values to the drive mechanism 3.

The control unit 5 is constructed as follows. First, each swivel angle $\theta$ is measured at each elapsed time t (each transient point) from the entry control start point P1. Here, until the elapsed time t reaches the control setup time T, the control unit 5 operates the drive mechanism 3 to vary the swivel angle $\theta$ so as to successively match the transient swivel angle $\Delta\theta 1$ at each elapsed time t.

The headlamp 2 may not cause the swivel angle $\theta$ to be 0° at the entry control start point P1. In this case, the target swivel angle $\Delta\theta 1$ can be found from the equation $\Delta\theta 1 = \theta 0 + \theta 1 \times t/T$ using a swivel angle $\theta 0$ at the beginning of controlling the headlamp 2 at the entry control start point P1.

As shown in FIG. 12, the control unit 5 according to the embodiment finds the following transient swivel angle $\Delta\theta 2$ [°] so as to gradually vary the swivel angle $\theta$ of the headlamp 2 up to 0° under the navigation-cooperative control at the exit from the curved road. The control unit 5 provides control so that the swivel angle $\theta$ of the headlamp 2 successively reaches the transient swivel angle $\Delta\theta 2$.

That is, the control unit 5 finds the transient swivel angle $\Delta\theta 2$ under the navigation-cooperative control at the exit from the curved road using the elapsed time t [s], the control setup time T [s], and the return swivel angle $\theta 2$ μl. The elapsed time t is counted from a time point when the current position X of the vehicle 7 detected by the position detection unit 42 reaches the exit control start point P2. The return swivel angle $\theta 2$ is the steering angle $\theta s$ of the vehicle 7 at a time point when the current position X of the vehicle 7 reaches the exit control start point P2.

The transient swivel angle $\Delta\theta 2$ is found by using the equation $\Delta\theta 2 = \theta 2 \times (1-t/T)$. The transient swivel angle $\Delta\theta 2$ is an angle at each transient point during a change from the swivel angle $\theta$ of the headlamp 2 at the exit control start point P2 to 0° (initial swivel angle) at the curved road end point Po.

The control unit 5 is constructed as follows. First, each swivel angle $\theta$ is measured at each elapsed time t (each transient point) from the exit control start point P2. Here, until the elapsed time t reaches the control setup time T, the control unit 5 operates the drive mechanism 3 to vary the swivel angle $\theta$ so that the return amount of each swivel angle $\theta$ successively matches the transient swivel angle $\Delta\theta 2$ at each elapsed time t.

Referring now to flowcharts in FIGS. 13 through 16, the following describes a method of controlling the vehicle headlamp apparatus 1 according to the embodiment using the control unit 5.

Figure 13:
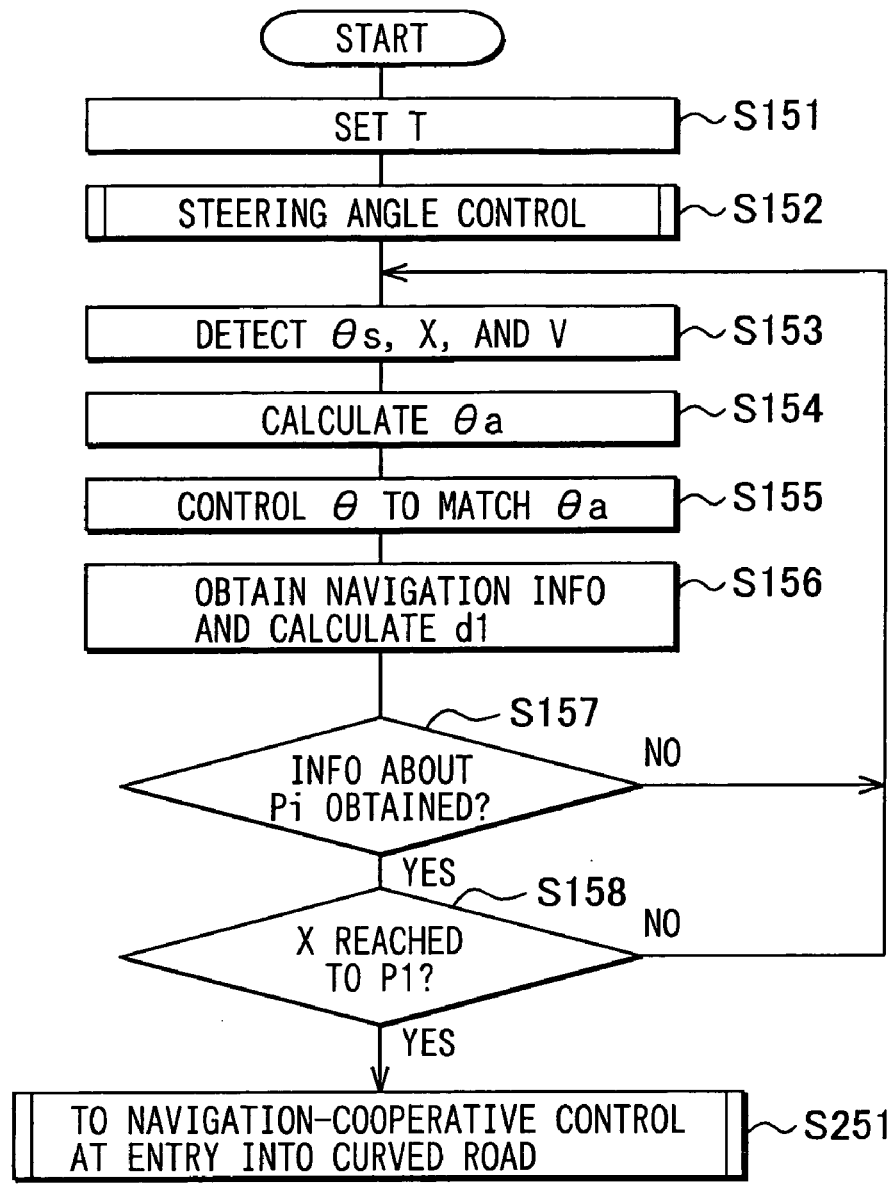
FIG. 13 is a flowchart showing steering angle control according to embodiment 2.

As shown in FIG. 13, the embodiment provides the steering angle control by performing Steps S151 through S158 like Steps S101 through S108 for the above-mentioned embodiment 1. At S151, the driver of the vehicle 7 specifies only the control setup time T in the control unit 5.

At S156, the control unit 5 may obtain the information indicating availability of the curved road start point Pi from the navigation unit 44. In this case, the control unit 5 finds an assumed entry mileage d1 from a multiplication between the current speed V of the vehicle 7 and the control setup time T. The speed detection unit 43 detects the current speed V. The control unit 5 assumes that the entry control start point P1 is positioned the assumed entry mileage d1 short of the curved road start point Pi. It is sufficient to calculate the assumed entry mileage d1 at S156 only once in a loop.

At S158, the current position X of the vehicle 7 may reach the entry control start point P1. In this case, the control unit 5 performs the navigation-cooperative control at the entry into the curved road instead of the steering angle control (S251).

Figure 14:
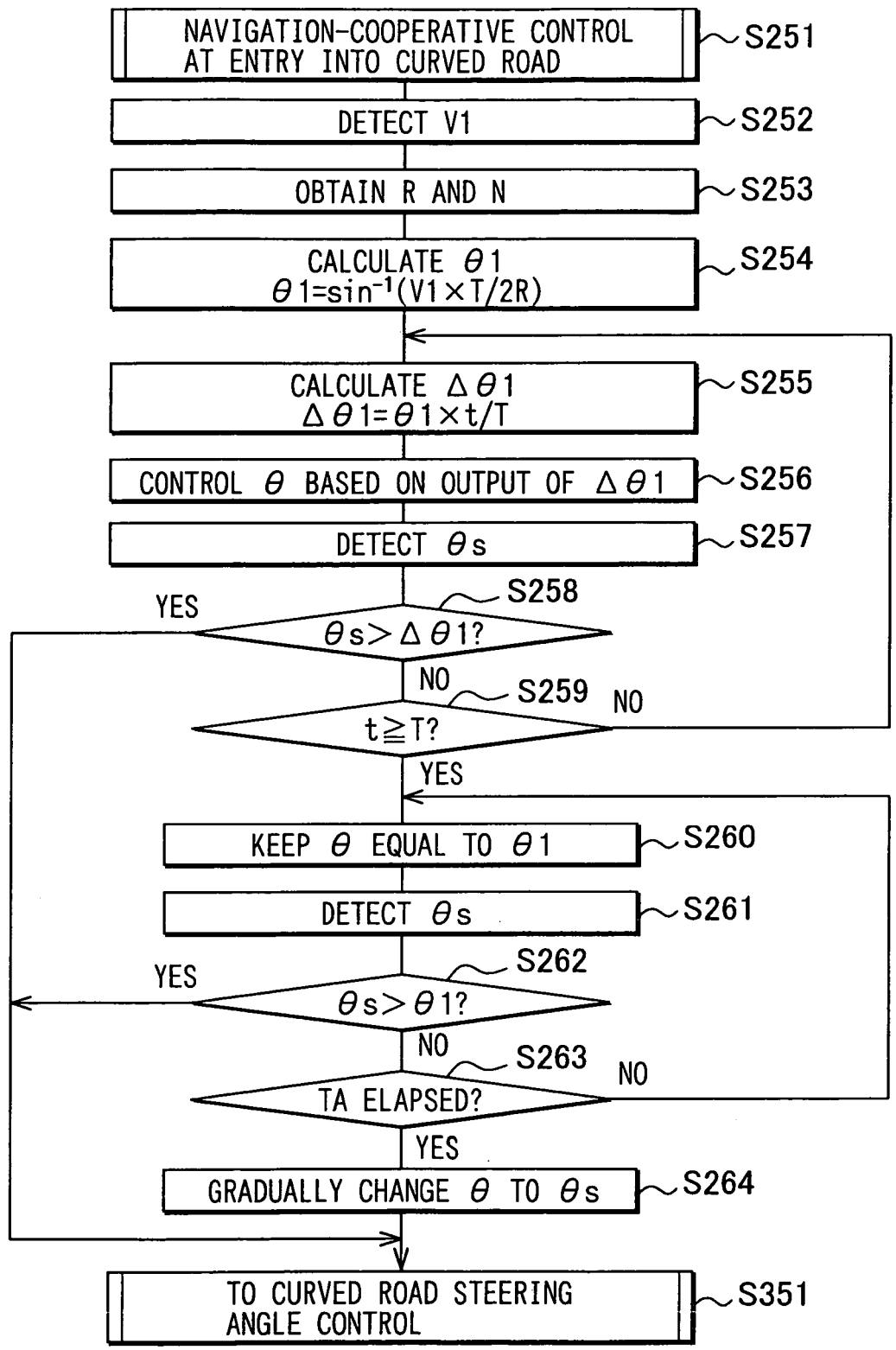
FIG. 14 is a flowchart showing navigation-cooperative control at the entry into the curved road according to embodiment 2.

As shown in FIG. 14, the control unit 5 finds the target swivel angle $\theta 1$ by performing Steps S251 through S254 like Steps S251 through S254 for the above-mentioned embodiment 1.

The control unit 5 then finds the transient swivel angle $\Delta\theta 1$ from equation $\Delta\theta 1 = \theta 1 \times t/T$ using the above-mentioned control setup time T and the target swivel angle $\theta 1$ (S255). The transient swivel angle $\Delta\theta 1$ is measured at each elapsed time (each transient point) t when the swivel angle $\theta$ of the headlamp 2 is gradually changed to the target swivel angle $\theta 1$.

The control unit 5 then performs Steps S256 through S258 like Steps S207 through S209 for the above-mentioned embodiment 1.

At S259, the control unit 5 determines whether or not the elapsed time t becomes larger than or equal to the control setup time T. The control unit 5 repeats S255 through S259 until the elapsed time t becomes larger than or equal to the control setup time T.

Thereafter, the control unit 5 performs Steps S260 through S264 like Steps S211 through S215 for the above-mentioned embodiment 1 to provide the navigation-cooperative control at the entry into the curved road.

Figure 15:
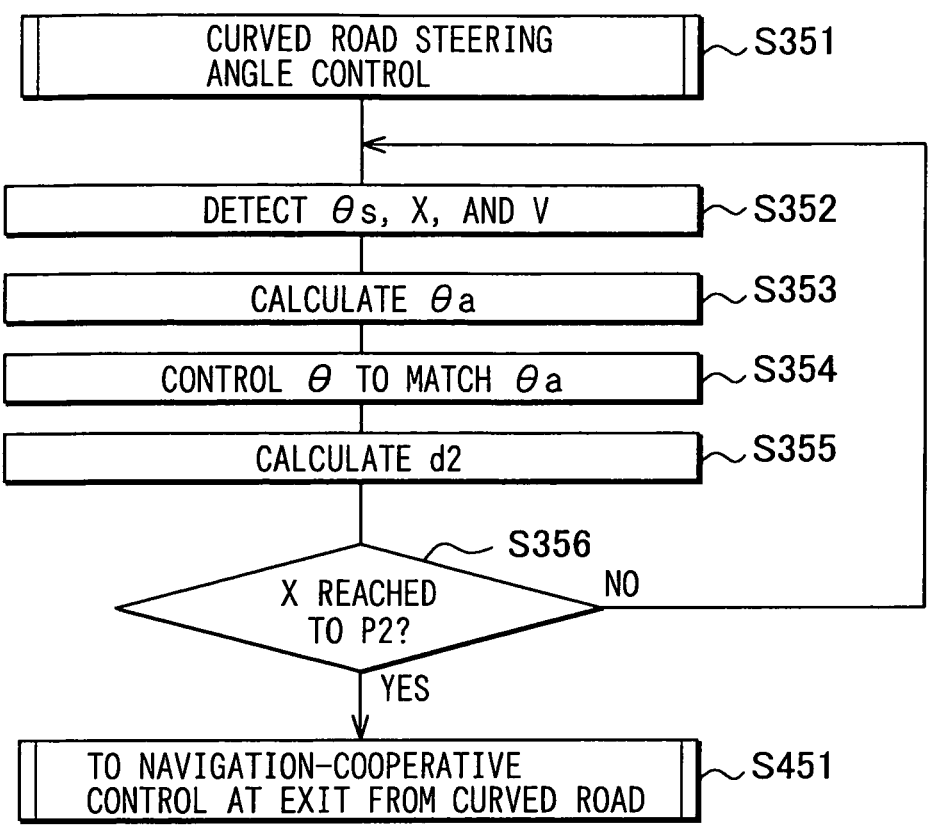
FIG. 15 is a flowchart showing curved road steering angle control according to embodiment 2.

The current steering angle $\theta s$ of the vehicle 7 detected by the steering angle detection unit 41 may reach the target swivel angle $\theta 1$. In this case, as shown in FIG. 15, the control unit 5 performs the curved road steering angle control instead of the navigation-cooperative control at the entry into the curved road (S351).

The control unit 5 performs Steps S352 through S354 like Steps S302 through S304 for the above-mentioned embodiment 1.

At S355, the current steering angle $\theta s$ of the vehicle 7 reaches the target swivel angle $\theta 1$. In this case, the control unit 5 finds an assumed exit mileage d2 from a multiplication between the current speed V of the vehicle 7 and the control setup time T. The speed detection unit 43 detects the current speed V. The control unit 5 assumes that the exit control start point P2 is positioned the assumed exit mileage d2 short of the curved road end point Po. It is sufficient to calculate the assumed exit mileage d2 at S355 only once in a loop.

At S356, the current position X of the vehicle 7 may reach the exit control start point P2. In this case, the control unit 5 performs the navigation-cooperative control at the exit from the curved road instead of the curved road steering angle control (S451).

Figure 16:
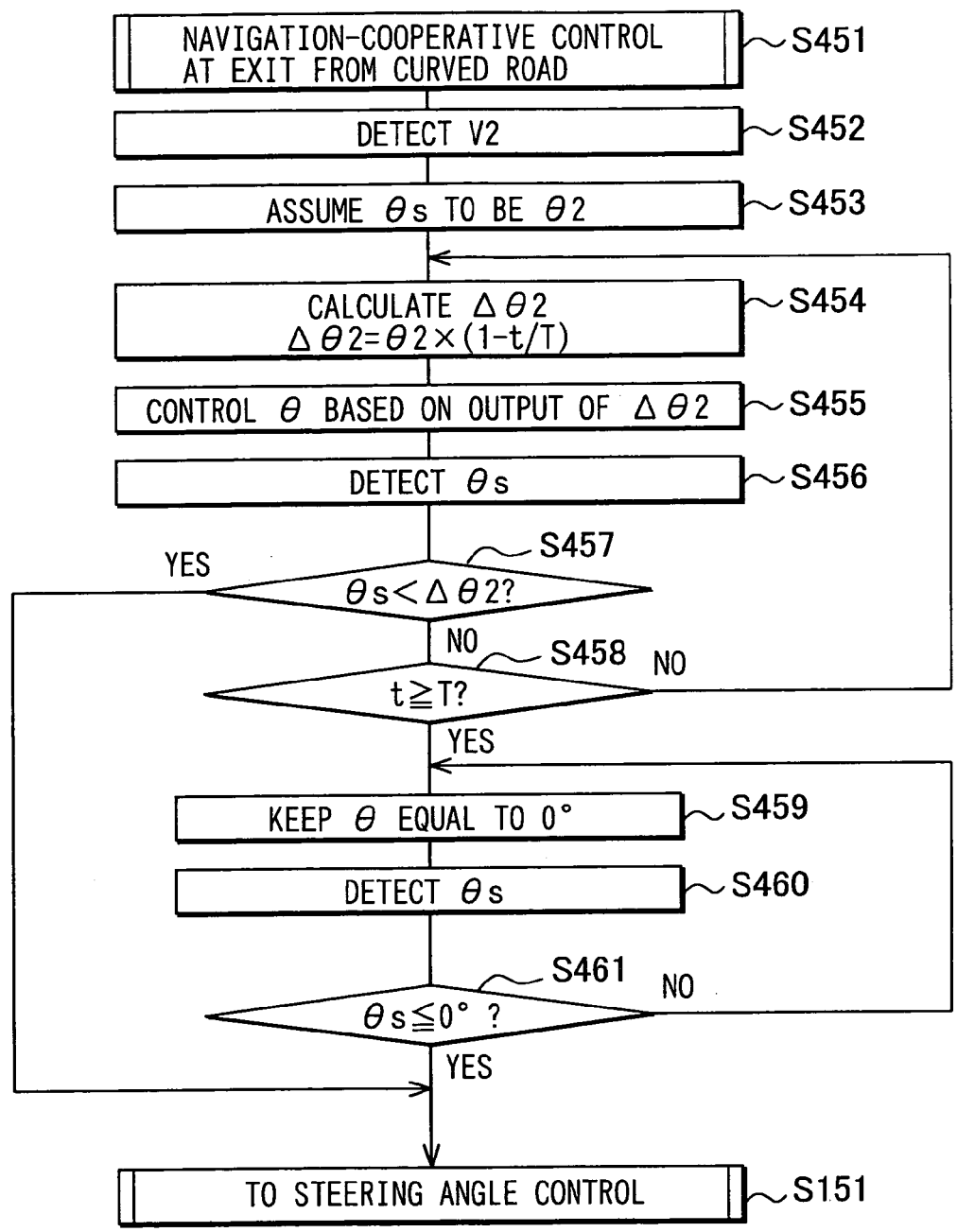
FIG. 16 is a flowchart showing navigation-cooperative control at the exit from the curved road according to embodiment 2.

As shown in FIG. 16, the control unit 5 finds the return swivel angle θ2 by performing Steps S451 through S453 like Steps S401 through S403 for the above-mentioned embodiment 1.

The control unit 5 then finds the transient swivel angle Δθ2 from equation Δθ2=θ2×(1−t/T) using the above-mentioned control setup time T and the return swivel angle θ2 (S454). The transient swivel angle Δθ2 is measured at each elapsed time (each transient point) t when the swivel angle θ of the headlamp 2 is gradually changed to 0°.

The control unit 5 then performs Steps S455 through S457 like Steps S406 through S408 for the above-mentioned embodiment 1.

At S458, the control unit 5 determines whether or not the elapsed time t becomes larger than or equal to the control setup time T. The control unit 5 repeats S454 through S458 until the elapsed time t becomes larger than or equal to the control setup time T.

Thereafter, the control unit 5 performs Steps S459 through S461 like Steps S410 through S412 for the above-mentioned embodiment 1 to provide the navigation-cooperative control at the exit from the curved road.

Thereafter, the control unit 5 can repeatedly perform the navigation-cooperative control at the entry into the curved road, the curved road steering angle control, and the navigation-cooperative control at the exit from the curved road each time the navigation unit 44 recognizes the curved road 82.

The embodiment also provides working effects of the navigation-cooperative control at the entry into the curved road similarly to those of the navigation-cooperative control at the entry into the curved road according to the above-mentioned embodiment 1. The embodiment provides working effects of the navigation-cooperative control at the exit from the curved road similarly to those of the navigation-cooperative control at the exit from the curved road according to the above-mentioned embodiment 1.

Accordingly, the vehicle headlamp apparatus 1 according to the embodiment can also help prevent the light distribution direction caused by the headlamp 2 from being subject to sudden and discontinuous changes. The driver's visibility can be ensured appropriately.

With respect to the other viewpoints, the embodiment is constructed similarly to the above-mentioned embodiment 1 and can provide the working effects similar to those of embodiment 1.

Embodiment 3

This embodiment is constructed so as to independently control swivel angles θ of a pair of left and right headlamps 2.

Figure 17:
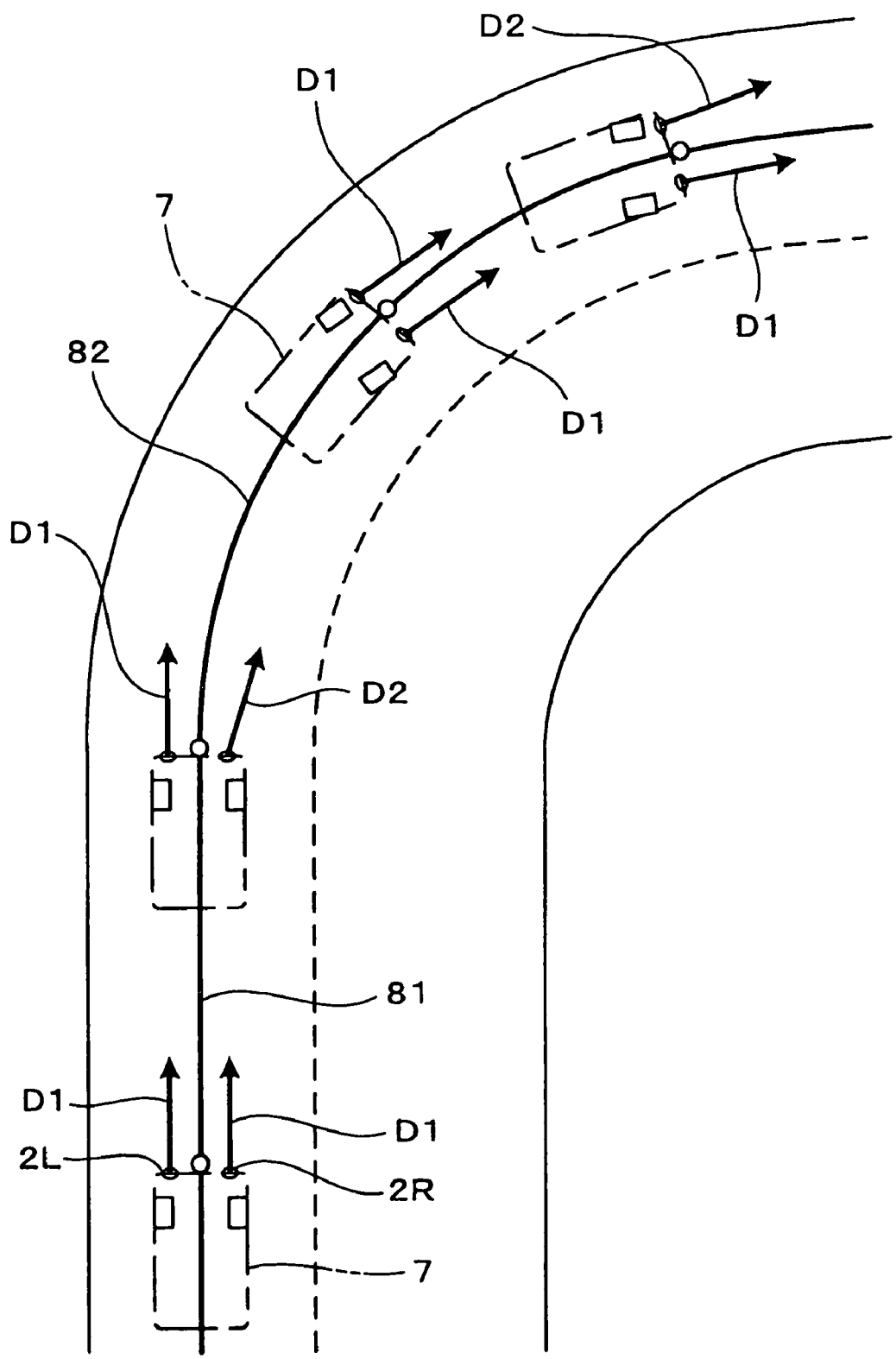
FIG. 17 is an explanatory diagram showing control provided by a control unit according to embodiment 3.

As shown in FIG. 17, the control unit 5 according to the embodiment is constructed as follows. When the curved road 82 is a right curved road winding to the right of the traveling direction of the vehicle 7, the control unit 5 provides a right headlamp 2R of the pair of left and right headlamps 2 with the navigation-cooperative control at the entry into the curved road. When the curved road 82 is a left curved road winding to the left of the traveling direction of the vehicle 7, the control unit 5 provides a left headlamp 2L of the pair of left and right headlamps 2 with the navigation-cooperative control at the entry into the curved road. When the curved road 82 is a right curved road, the control unit 5 provides the left headlamp 2L of the pair of left and right headlamps 2 with the navigation-cooperative control at the exit from the curved road. When the curved road 82 is a left curved road, the control unit 5 provides the right headlamp 2R of the pair of left and right headlamps 2 with the navigation-cooperative control at the exit from the curved road.

In FIG. 17, reference numeral D1 represents a headlamp's radiation direction under steering angle control; and reference numeral D2 represents a headlamp's radiation direction under navigation-cooperative control.

As shown in FIG. 17, when the vehicle 7 enters the curved road 82, the curved road 82 may be a right curved road. In this case, the control unit 5 provides the right headlamp 2R with the navigation-cooperative control. The control unit 5 provides the left headlamp 2L with the steering angle control. When the vehicle 7 enters the curved road 82, the curved road 82 may be a left curved road. In this case, the control unit 5 provides the left headlamp 2L with the navigation-cooperative control. The control unit 5 provides the right headlamp 2R with the steering angle control.

In this manner, the navigation-cooperative control is performed for only one of the pair of headlamps 2. This makes it possible to widen a light distribution range provided by the pair of headlamps 2 when the vehicle 7 enters the curved road 82. The driver's visibility can be appropriately ensured when the vehicle 7 enters the curved road 82.

When the vehicle 7 enters the curved road 82 that is a left curved road, the control unit 5 can similarly provide control as mentioned above.

The construction of the embodiment is applicable to control over any of the above-mentioned embodiments 1 and 2.

With respect to the other viewpoints, the embodiment is constructed similarly to the above-mentioned embodiment 1 and can provide the working effects similar to those of embodiment 1.

Embodiment 4

This embodiment continues to perform the steering angle control without performing any of instances of the navigation-cooperative control when the control unit 5 repeatedly perform the steering angle control and the navigation-cooperative control.

Figure 18:
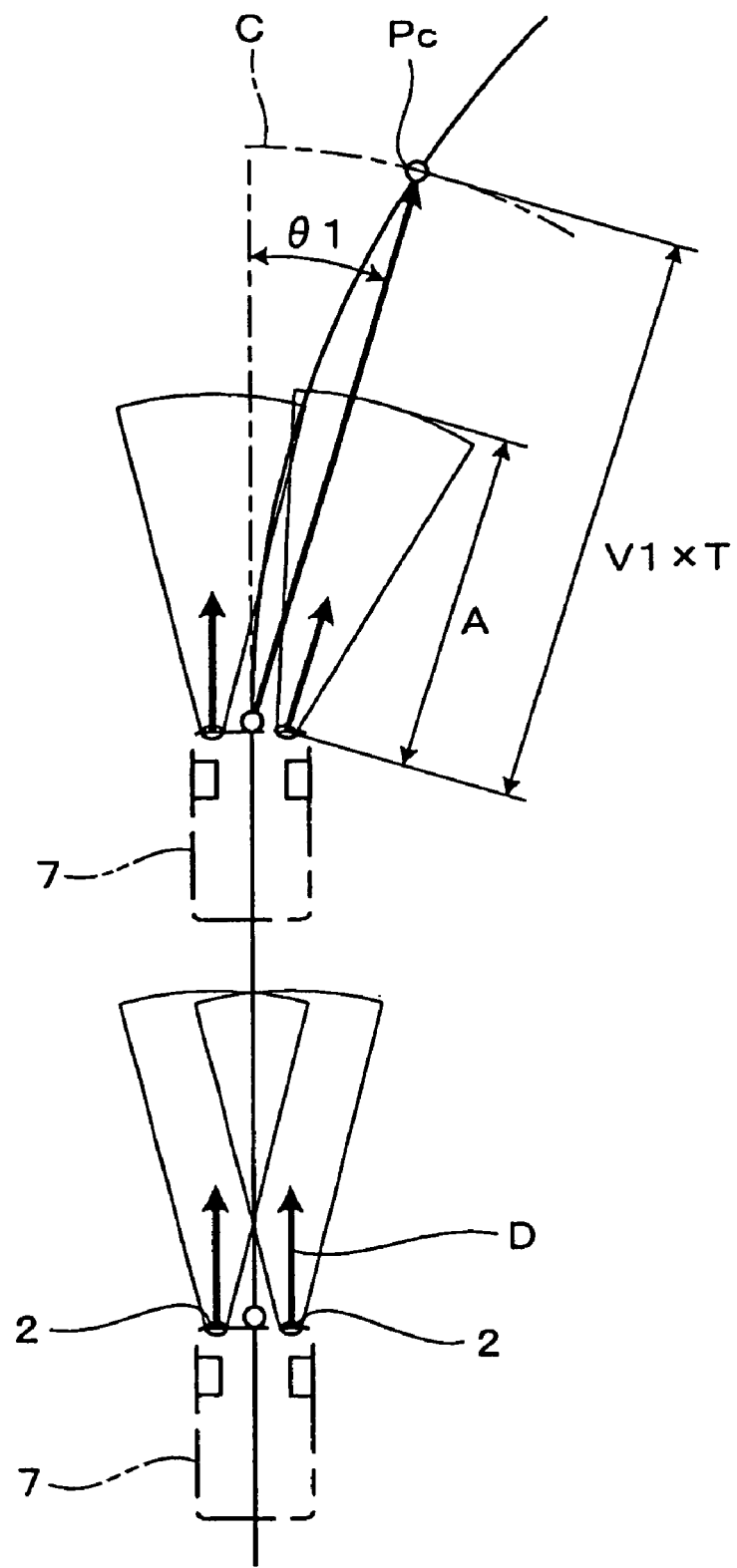
FIG. 18 is an explanatory diagram showing control provided by a control unit according to embodiment 4.

FIG. 18 shows how the control unit according to the embodiment is constructed. Under the navigation-cooperative control at the entry into the left or right curved road, the control unit determines whether or not the condition of V1×T≦A is satisfied. In this condition, A is the radiation distance of the headlamp 2, V1 the current speed of the vehicle 7, and T the control setup time. The speed detection unit 43 detects the current speed V1 when the current position X of the vehicle 7 reaches the entry control start point P1. When this condition is not satisfied, the control unit 5 does not perform the navigation-cooperative control and continues to perform the steering angle control.

The control unit 5 according to the embodiment finds the target swivel angle θ1 from the equation θ1=sin$^{-1}$(V1×T/2R) under the navigation-cooperative control at the entry into the left or right curved road. In this case, the control unit 5 performs no navigation-cooperative control when the light radiated from the headlamp 2 is assumed not to reach the curved road 82.

As described in the above-mentioned embodiment 1, the target swivel angle θ1 is found as follows. A virtual circle C with the radius V×T is drawn around the curved road start point Pi. A curved line is drawn with the curvature radius R from the curved road start point Pi and crosses the virtual circle C at the light distribution point Pc. A virtual straight line having the length V×T is drawn from the curved road start point Pi to the light distribution point Pc. The virtual straight line forms the target swivel angle θ1 against the advance direction (forward direction) of the vehicle 7.

As shown in FIG. 18, the above-mentioned virtual straight line has the length of V1×T expressed by a multiplication between the current speed V1 of the vehicle 7 and the control setup time T. When the distance V1×T is longer than the radiation distance A of the headlamp 2, the radiated light from the headlamp 2 is assumed not to reach the curved road 82. In this case, the control unit 5 does not perform the navigation-cooperative control. This can help prevent a situation where the light from the headlamp 2 is not radiated to the curved road 82.

The radiation distance A of the headlamp 2 may be selectable between two modes, i.e., low beam (nearer) and high beam (further). In this case, value A used for the condition V1×T≦A can be independently used as a value for the low beam or the high beam.

The construction of the embodiment is applicable to control over any of the above-mentioned embodiments 1 and 2.

With respect to the other viewpoints, the embodiment is constructed similarly to the above-mentioned embodiment 1 and can provide the working effects similar to those of embodiment 1.

Embodiment 5

This embodiment also continues to perform the steering angle control without performing any of instances of the navigation-cooperative control when the control unit 5 repeatedly perform the steering angle control and the navigation-cooperative control.

Under the navigation-cooperative control at the entry into the left or right curved road, the curved road 82 starting from the curved road start point Pi may correspond to a junction or an intersection. In this case, the control unit 5 according to the embodiment is constructed not to perform the navigation-cooperative control and continue to perform the steering angle control. Under the navigation-cooperative control at the exit from the left and right curved road, the curved road 82 ending with the curved road end point Po may correspond to a junction or an intersection. In this case, the control unit 5 according to the embodiment is constructed not to perform the navigation-cooperative control and continue to perform the steering angle control.

When the curved road 82 corresponds to a junction or an intersection, the control unit 5 cannot determine toward which direction the driver of the vehicle 7 operates the steering system. It is difficult to find the target swivel angle θ1 under the navigation-cooperative control at the entry into the curved road and the navigation-cooperative control at the exit from the curved road. In such case, the control unit 5 continues to perform the steering angle control without performing the navigation-cooperative control at the entry into the curved road nor the navigation-cooperative control at the exit from the curved road. In this manner, it is possible to stably control the swivel angle θ of the headlamp 2.

The construction of the embodiment is also applicable to control over any of the above-mentioned embodiments 1 and 2.

With respect to the other viewpoints, the embodiment is constructed similarly to the above-mentioned embodiment 1 and can provide the working effects similar to those of embodiment 1.

Embodiment 6

The vehicle headlamp apparatus 1 according to the embodiment will be described with reference to FIGS. 19 through 37.

The following embodiments 6 and 7 use reference symbols (numerals) for components, step numbers for flowcharts, and the like provided independently of those used for the above-mentioned embodiments 1 through 5.

Figure 19:
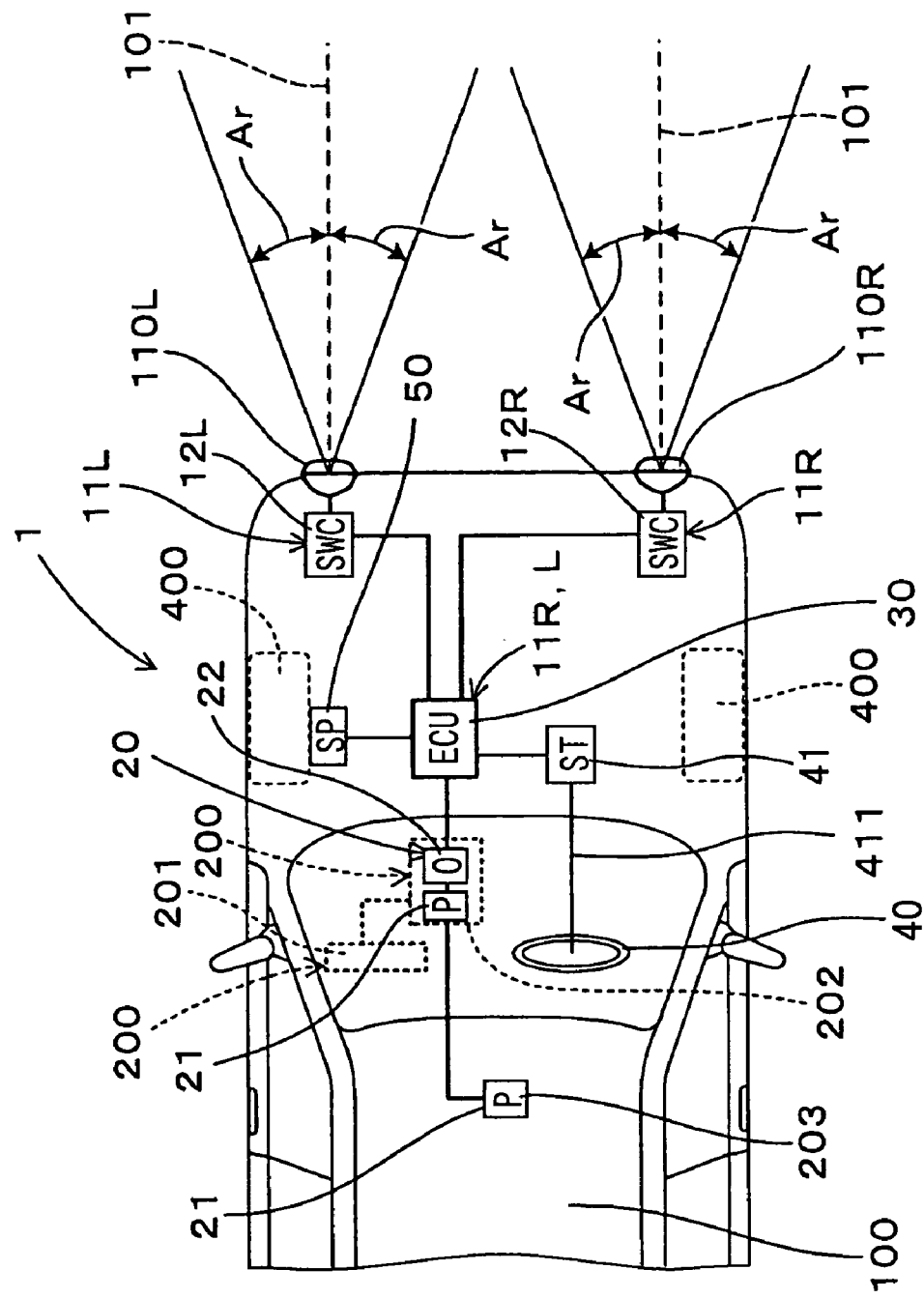
FIG. 19 is an explanatory diagram showing the system configuration of the vehicle headlamp apparatus according to embodiment 6.

FIG. 19 shows how the vehicle headlamp apparatus 1 according to the embodiment is constructed. The front of a vehicle 100 is provided with a pair of left and right headlamps 110. The headlamp 110 forms a swivel angle in the optical axis direction. The swivel angle is adjustable in a plane approximately parallel to a road surface.

The vehicle headlamp apparatus 1 has a position detection sensor 21, a road data output unit 20, a right swivel control unit 11R, a left swivel control unit 11L, and a steering angle detection unit 41. The position detection sensor 21 detects vehicle's positions. The road data output unit 20 contains a map database 22 that stores electronic map information. Based on the vehicle position, the road data output unit 20 references the map database 22 and outputs road data representing the structure of a road that forms the vehicle's course. The right swivel control unit 11R adjusts swivel angles of the right headlamp 110R. The left swivel control unit 11L adjusts swivel angles of the left headlamp 110L. The steering angle detection unit 41 detects a steering angle of the vehicle based on a steering amount of a steering wheel 40.

The swivel control units 11R and 11L calculate a navigation-estimated traveling direction, i.e., a vehicle's traveling direction estimated on the basis of the road data. The swivel control units 11R and 11L selectively provide a navigation-cooperative control mode and a steering angle control mode. The navigation-cooperative control mode controls swivel angles based on the navigation-estimated traveling direction. The steering angle control mode calculates a steering-angle-estimated traveling direction, i.e., the vehicle's traveling direction estimated on the basis of a steering angle. The steering angle control mode controls swivel angles based on the steering-angle-estimated traveling direction.

The swivel control units 11R and 11L provide start point control to perform the navigation-cooperative control mode within a first transit time when the vehicle 100 enters a curved road. Under the start point control, the swivel control units 11R and 11L calculate a first final swivel angle that forms the navigation-estimated traveling direction at an estimated vehicle position after the first transit time. In addition, the swivel control units 11R and 11L incorporate a first transient swivel angle, i.e., a swivel angle when the start point control starts. During the first transit time, the swivel control units 11R and 11L simply change the swivel angle from the first transient swivel angle to the first final swivel angle.

Further, the swivel control units 11R and 11L provide end point control to perform the navigation-cooperative control mode within a second transit time when the vehicle 100 exits from a curved road. Under the end point control, the swivel control units 11R and 11L incorporate a second transient swivel angle, i.e., a swivel angle when the end point control starts. During the second transit time, the swivel control units 11R and 11L simply change the swivel angle from the second transient swivel angle to a second final swivel angle.

The second final swivel angle is a preset initial swivel angle (zero degrees with reference to a vehicle axis 101 according to the embodiment).

The details will be described in detail below.

The vehicle headlamp apparatus 1 according to the embodiment has a steering angle sensor (depending on cases, hereafter referred to as a steering angle sensor 41) as the steering angle detection unit 41. Further, as shown in FIG. 19, the vehicle headlamp apparatus 1 also has a vehicle speed sensor 50 that detects running speeds of the vehicle 100. The swivel control units 11R and 11L include a light distribution control ECU 30 that incorporates output signals from the steering angle sensor 41 and the vehicle speed sensor 50. According to the embodiment, the right swivel control unit 11R and the left swivel control unit 11L share the one light distribution control ECU 30.

As shown in FIG. 19, the vehicle headlamp apparatus 1 uses some functions of a navigation system 200 and the like as the road data output unit 20. The navigation system 200 is composed of a GPS antenna 203, a navigation ECU 202, and a display 201. The GPS antenna 203 receives GPS radio waves transmitted from an artificial satellite. The navigation ECU 202 provides route guidance and the like. The display 201 displays maps.

The navigation system 200 provides a positioning function to supply signals from the GPS antenna 203, a gyro sensor 204 (see FIG. 20), and the vehicle speed sensor 50 and calculate a vehicle's absolute position. The vehicle headlamp apparatus 1 according to the embodiment uses this positioning function as the above-mentioned position detection sensor 21. A hard disk apparatus 206 (see FIG. 20) stores electronic map information for the navigation system 200. The vehicle headlamp apparatus 1 uses this hard disk apparatus 206 as the above-mentioned map database 22.

Figure 20:
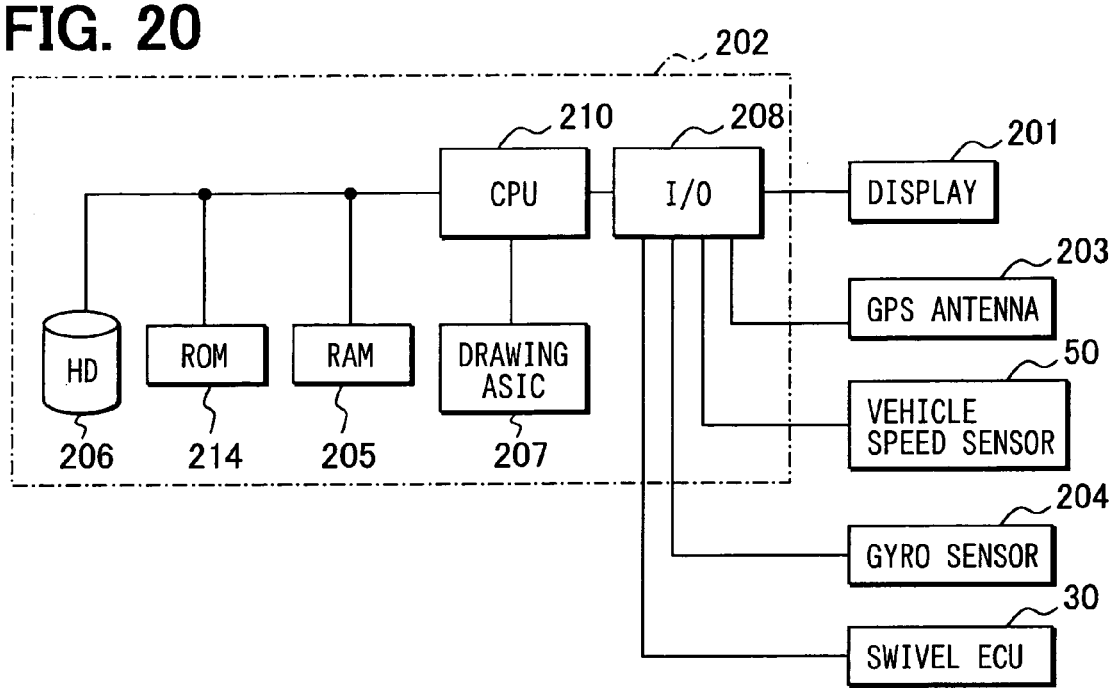
FIG. 20 is a block diagram showing the hardware configuration of a navigation ECU according to embodiment 6.

The navigation system 200 will be outlined below. The navigation system 200 includes the navigation ECU 202 as a main component. As shown in FIG. 20, the navigation ECU 202 has a CPU 210, an I/O circuit 208, ROM 214, RAM 205, and the hard disk apparatus 206 as the map database 22 (FIG. 19).

The navigation ECU 202 uses the I/O circuit 208 to be supplied with output signals from the GPS antenna 203, the vehicle speed sensor 50, and the gyro sensor 204. In addition, the navigation ECU outputs control signals to the display 201 and the light distribution control ECU 30.

A positioning portion (not shown) functions as the position detection sensor 21 in the navigation ECU 202. The positioning portion calculates vehicle positions according to the self navigation based on output signals from the vehicle speed sensor 50 and the gyro sensor 204. In addition, the positioning portion accurately calculates vehicle positions according to correction based on the known map matching and correction based on vehicle positions detected by a GPS receiver (not shown).

Based on the vehicle position detected by the positioning portion, the navigation ECU 202 references the electronic map information stored in the hard disk apparatus 206. Further, based on the referenced electronic map information, the navigation ECU 202 renders a map image using a drawing ASIC 207. The display 201 can display the map image output from the navigation ECU 202.

Figure 21:
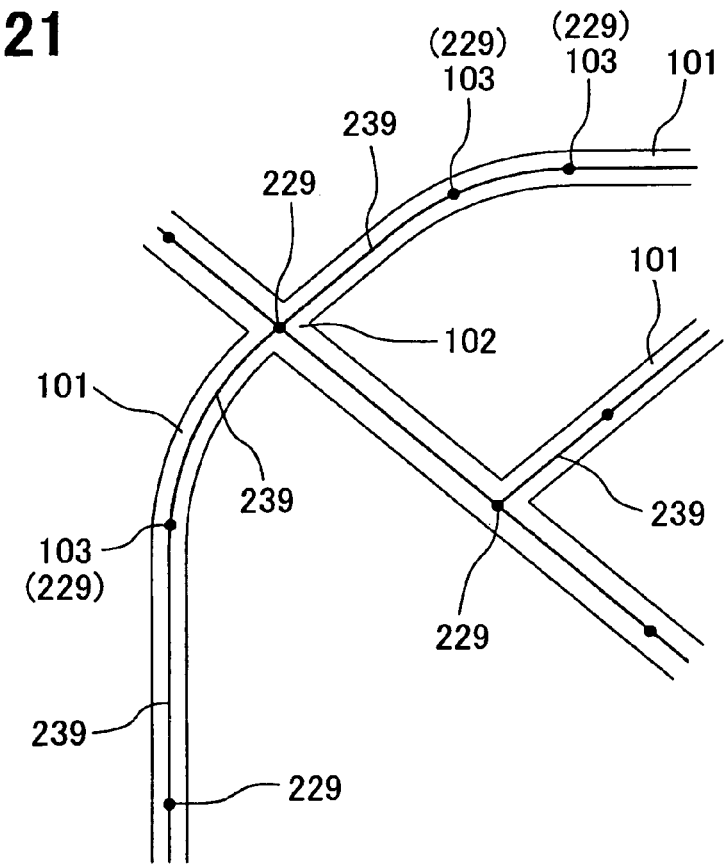
FIG. 21 is an explanatory diagram showing electronic map information based on the vector technique.

The electronic map information stored in the hard disk apparatus 206 contains information about the road structure such as road attributes including junctions, straight roads, and the like. As shown in FIG. 21, this information is represented based on the vector technique using a plurality of nodes 229 (joints) as transient points on the road 101 and an arc 239 (curved line) indicative of adjacent relationship between nodes.

The nodes 229 are disposed to at least transition points such as a road curvature's inflection point 103 and an intersection 102 out of the transient points on the road 101. Disposition intervals between the nodes 229 depend on road shapes and road types. The disposition intervals are configured to be coarse for straight roads and to be fine for curved roads. The disposition intervals are configured to be finer for arterial roads and major national roads than for ordinary roads.

Figure 22:
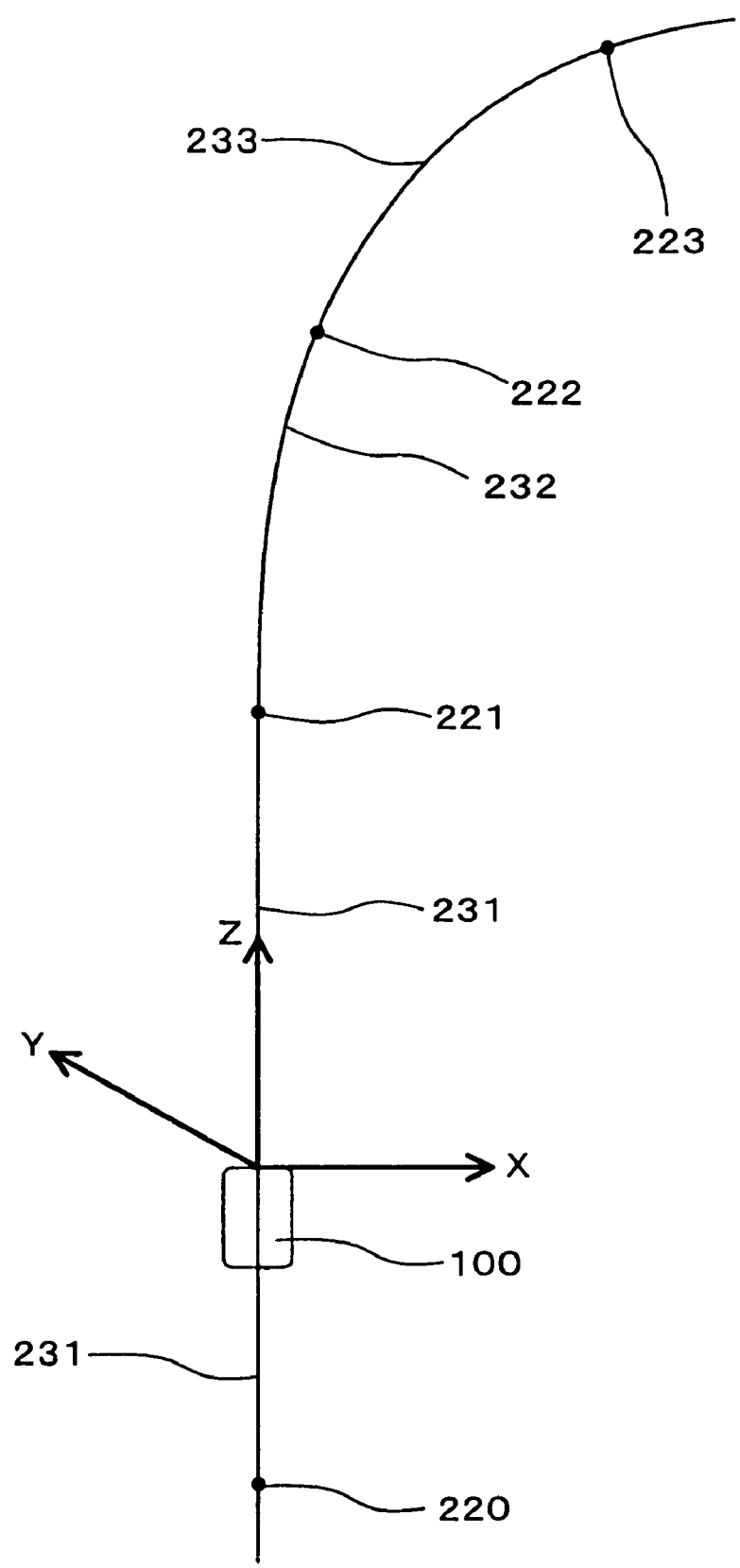
FIG. 22 is an explanatory diagram showing road data output from a road data output unit according to embodiment 6.

According to the embodiment, as shown in FIG. 19, the navigation system 200 provides the road data output unit 20. The road data output unit 20 outputs node data and arc data as the road data to the light distribution control ECU 30. The node data includes zeroth to third nodes. As shown in FIG. 22, a first node 221 is located immediately in front of the vehicle 100 along the traveling direction. A zeroth node 220 is located immediately to the rear of the vehicle 100. Ahead of the first node 221, there are two nodes, a second node 222 and a third node 223. The arc data includes first to third arcs. A first arc 231 connects the zeroth node 220 and the first node 221. A second arc 232 connects the first node 221 and the second node 222. A third arc 233 connects the second node 222 and the third node 223.

With reference to FIG. 22, the navigation system 200 according to the embodiment outputs node data that is a combination of ID data, three-dimensional position data, and attribute data. The ID data specifies each of the nodes 220 through 223. The three-dimensional position data represents three-dimensional relative positions of the nodes 220 through 223 based on the vehicle position. The attribute data indicates road types such as intersections, major national roads, arterial roads, highways, and junctions. The arc data is a combination of the following ID data and curvature data. The ID data corresponds to the nodes at both ends of the arcs 231, 232, and 233. The curvature data represents the curvature of an arc used for connection between nodes.

Figure 23:
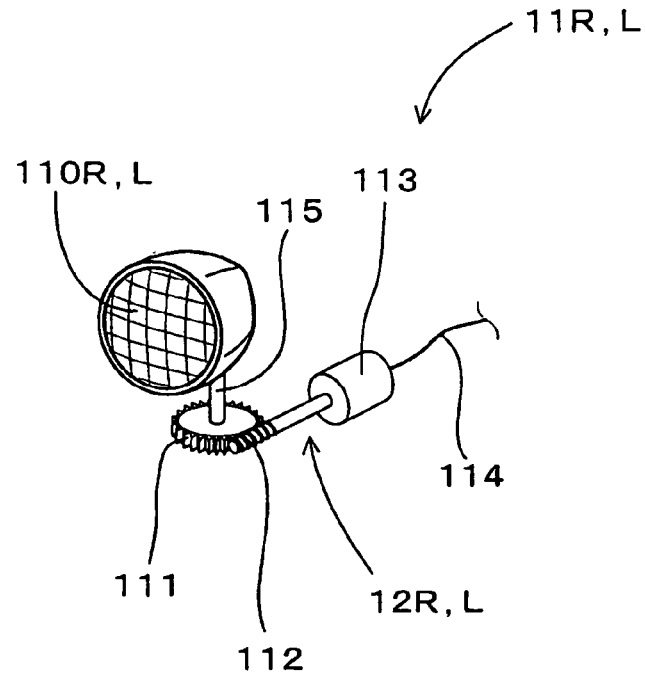
FIG. 23 is a perspective view showing a headlamp and a swivel control unit according to embodiment 6.

The vehicle headlamp apparatus 1 according to the embodiment is constructed to adjust swivel angles as shown in FIG. 23. The right swivel control unit 11R adjusts swivel angles of the right headlamp 110R. The left swivel control unit 11L adjusts swivel angles of the left headlamp 110L.

The swivel control units 11R and 11L have swivel apparatuses 12R and 12L, respectively. As shown in FIG. 23, the swivel apparatuses 12R and 12L are composed of a motor 113 and a drive mechanism. The motor 113 is electrically connected to the light distribution control ECU 30 (FIG. 19) via a control signal line 114. The drive mechanism is a combination of a worm gear 112 and a worm wheel 111 that engage with each other. The worm gear 112 is constructed to rotate integrally with an output shaft of the motor 113. The worm wheel 111 is constructed to rotate integrally with a rotation axis 115 for horizontally oscillating optical axes of the headlamps 110R and 110L.

As shown in FIG. 23, the swivel apparatuses 12R and 12L each transmit a turning force of the motor to the rotation axis 115, making it possible to horizontally change the optical axes of the headlamps 110R and 110L.

The vehicle headlamp apparatus 1 according to the embodiment is constructed to allow for swivel angles in the optical axis direction of the right headlamp 110R and the left headlamp 110L as shown in FIG. 19. Each of the swivel angles is adjustable within a range of +15 degrees (an angle range indicated by Ar in FIG. 19) horizontally centered on the vehicle axis 101 as an axis of the traveling vehicle.

As shown in FIG. 19, the steering angle sensor 41 is provided around a steering shaft 411. The steering angle sensor 41 measures a steering angle as an operation amount input to the steering wheel 40 and outputs the steering angle to the light distribution control ECU 30.

As shown in the drawing, the vehicle speed sensor 50 is constructed to detect rotations of a left wheel. In addition, the vehicle speed sensor may be provided for each of the left and right wheels to detect rotations of both wheels. In this case, it is possible to further improve the accuracy of vehicle speed measurements.

Figure 24:
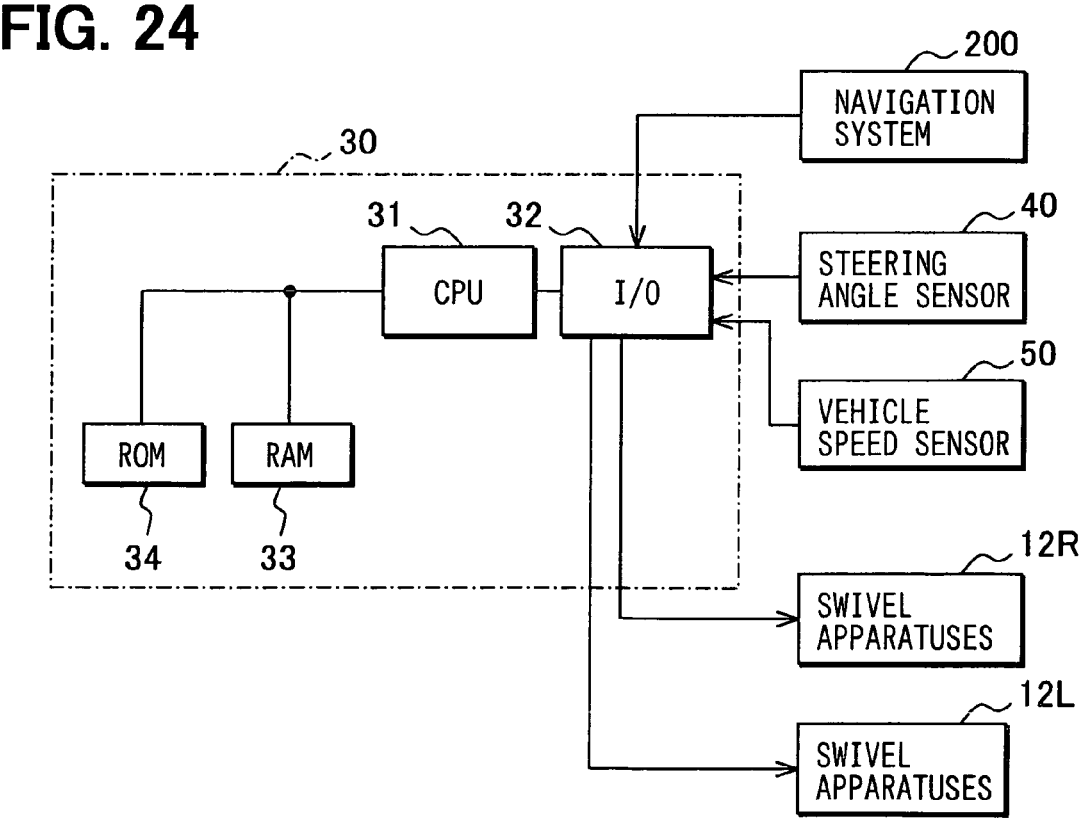
FIG. 24 is a block diagram showing the hardware configuration of a light distribution control ECU according to embodiment 6.

The light distribution control ECU 30 constitutes the swivel control units 11R and 11L. As shown in FIG. 24, the light distribution control ECU 30 has a processor 31, a ROM 34 (Read Only Memory), a RAM 33 (Random Access Memory), and an I/O circuit 32. The ROM 34 stores processing programs and the like. The RAM 33 functions as a memory area for temporary storage. The I/O circuit 32 inputs and outputs various signals. The light distribution control ECU 30 according to the embodiment uses the I/O circuit 32 to electrically connect with the navigation system 200, the steering angle sensor 41, the vehicle speed sensor 50, and the swivel apparatuses 12R and 12L.

The light distribution control ECU 30 according to the embodiment is supplied with the road data from the road data output unit 20 that constitutes part of the functions of the navigation system 200.

The ROM 34 of the light distribution control ECU 30 stores a control program to provide the vehicle headlamp apparatus 1 with light distribution control.

The control program contains first, second, and third sub-programs. The first sub-program calculates the navigation-estimated traveling direction θnav based on the road data and the like. The second sub-program calculates the steering-angle-estimated traveling direction θstr based on the steering angle and the like. The third sub-program controls the swivel apparatuses 12R and 12L.

The navigation-estimated traveling direction θnav provides the angle for the direction anticipating an estimated vehicle position. This position is expected after a specified time, i.e., Tset seconds, based on the road data input form the road data output unit 20 and the vehicle speed input from the vehicle speed sensor 50. The steering-angle-estimated traveling direction θstr provides the angle for the direction anticipating an estimated vehicle position. This position is expected after a specified time, i.e., Tset seconds, based on the steering angle input to the steering wheel and the vehicle speed input from the vehicle speed sensor 50.

The embodiment sets the specified time Tset to three seconds. Instead, the specified time Tset may be variable through the use of an adjustment switch and the like provided near a driver's seat so as to satisfy driver's preferences, level of driving proficiency, and the like.

Further, the specified time Tset can vary with the road types indicated by the attribute data about the nodes. For example, freeways and the like necessitate a relatively small load of paying attention to the vicinity of the vehicle. In such case, increasing the specified time Tset makes it possible to appropriately illuminate further areas.

Figure 25:
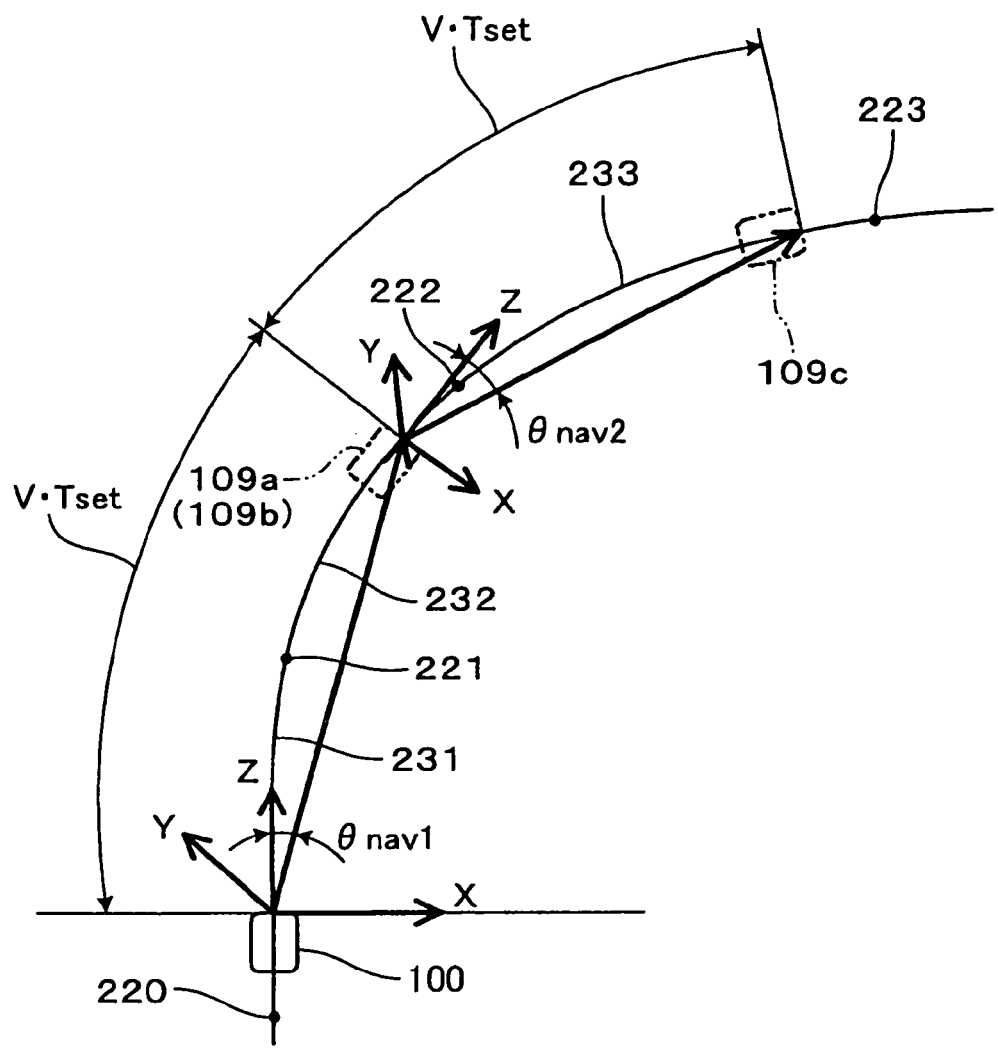
FIG. 25 is an explanatory diagram showing how to calculate $\theta nav1$ and $\theta nav2$ according to embodiment 6.

As shown in FIG. 25, a first function of the first sub-program is to reproduce a three-dimensional road shape using the vehicle 100 as a coordinate origin based on data of the zeroth node 220, the first node 221, the second node 222, the first arc 231, and the second arc 232. When the vehicle travels a route having this road shape by keeping the vehicle speed V (m/second), the function also calculates a position a vehicle 109a is to reach after the specified time Tset in seconds.

The first function is constructed to calculate a first navigation-estimated traveling direction θnav1 based on positional relationship between the vehicle 100 at the current position and the vehicle 109a after Tset seconds. The first navigation-estimated traveling direction θnav1 forms an angle for the vehicle 100 to see the vehicle 109a.

As shown in the drawing, a second function of the first sub-program is to reproduce a three-dimensional road shape using the vehicle 100 as a coordinate origin based on data of the zeroth node 220 through the third node 223 and the first arc 231 through the third arc 233. When the vehicle travels a route having this road shape by keeping the vehicle speed V (m/second), the function also calculates a position a vehicle 109c is to reach after the specified time Tset in seconds. In this case, the calculation is performed with reference to a vehicle 109b corresponding to the estimated vehicle position after the first transit time Tin. The second function is constructed to calculate a second navigation-estimated traveling direction θnav2 to form an angle for the vehicle 109b to see the vehicle 109c.

The embodiment sets the first transit time Tin to three seconds in the same manner as the specified time Tset. Therefore, FIG. 25 shows the vehicles 109a and 109b overlapping with each other according to the embodiment. Instead, it is also possible to differently set Tin and Tset.

Figure 26:
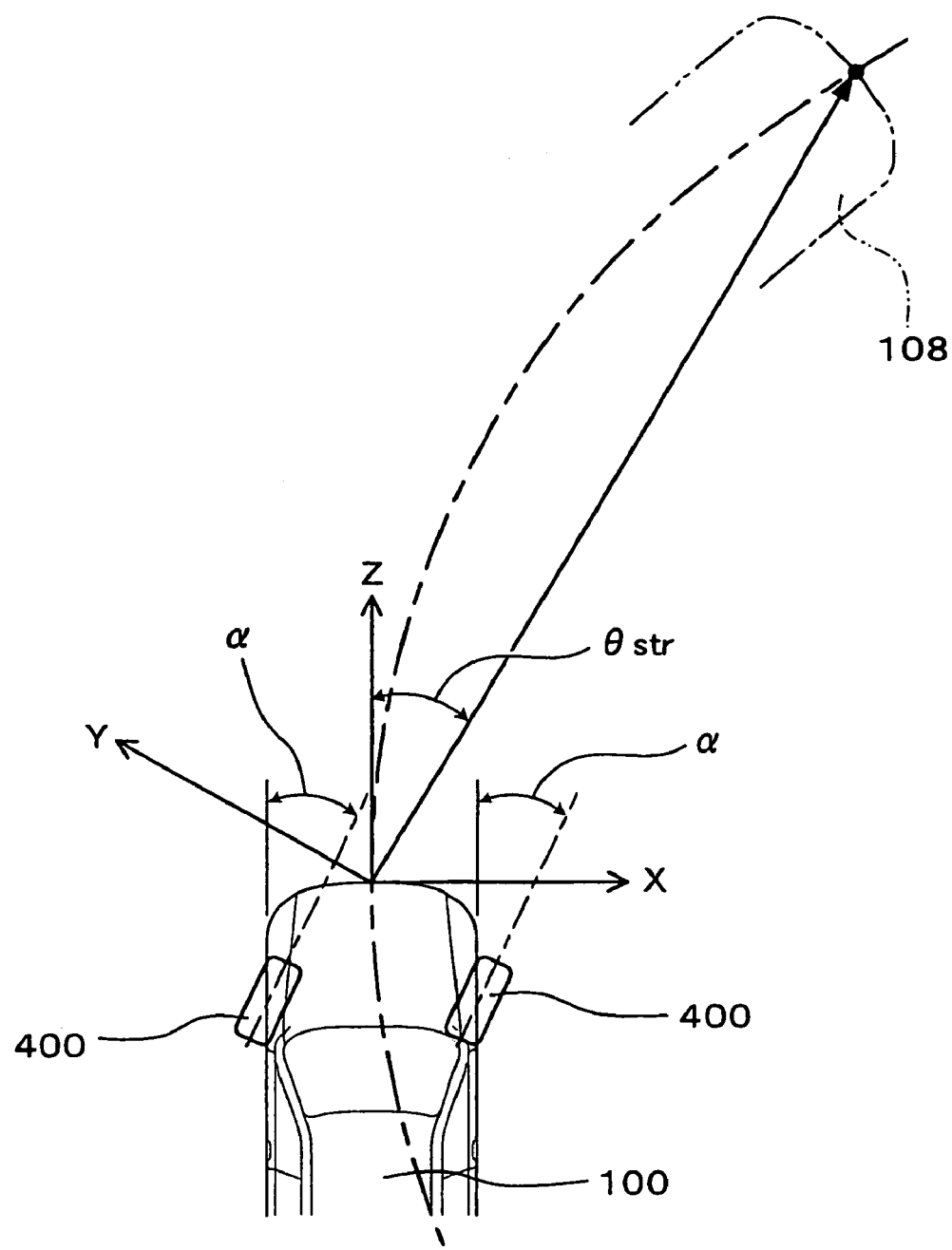
FIG. 26 is an explanatory diagram showing how to calculate $\theta str$ according to embodiment 6.

The second sub-program is a calculation routine. The second sub-program calculates a turning angle α of a wheel 400 based on the steering angle detected by the steering angle detection unit 41, as shown in FIG. 26. In addition, the second sub-program calculates an estimated route for the vehicle 100 when it travels by keeping the turning angle α and the vehicle speed. The second sub-program is constructed to calculate steering-angle-estimated traveling direction θstr based on positional relationship between the vehicle 100 at the current position and the vehicle 108 at a position estimated after Tset seconds. The steering-angle-estimated traveling direction θstr forms an angle to see the vehicle 108. The embodiment sets the specified time Tset for the second sub-program to three seconds in the same manner as the first sub-program.

The third sub-program controls the swivel apparatuses 12R and 12L based on θnav1 and θnav2, i.e., the calculation results of the first sub-program, and based on θstr, i.e., the calculation result of the second sub-program. In this manner, the third sub-program adjusts swivel angles of the headlamps 110R and 110L.

Figure 27:
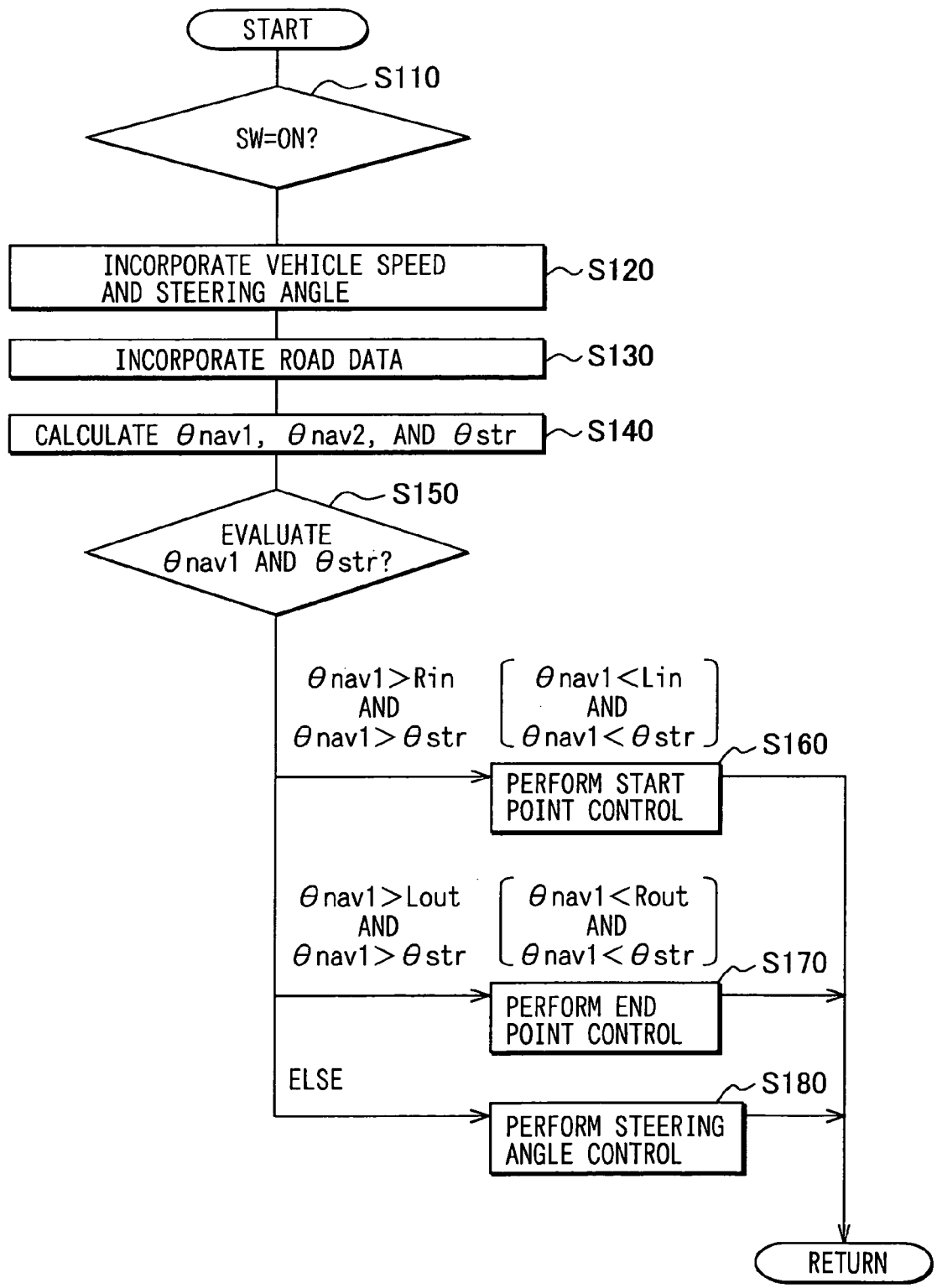
FIG. 27 is a flowchart showing a control procedure for headlamp's swivel angles according to embodiment 6.

The following describes the light distribution control based on the third sub-program. The light distribution control is performed based on control flowcharts in FIGS. 27 through 29. The following describes the detail of control steps constituting the control flowcharts. In terms of θnav1, θnav2, and θstr, the right direction is assumed to be positive while the neutral is assumed to be zero. The control flowchart in FIG. 27 is used to adjust the optical axis direction of the right headlamp 110R. In FIG. 27, the description in parentheses indicates differences in the control flowchart to adjust the optical axis direction of the left headlamp 110L.

At Step S110, the process determines whether or not a light switch turns on to indicate the turn-on state of the headlamps 110R and 110L. When the light switch turns on, the sub-program proceeds to Step S120. At Step S120, the sub-program incorporates a vehicle speed and a steering angle from the vehicle speed sensor 50 and the steering angle detection unit 41. At Step S130, the sub-program incorporates the road data from the road data output unit 20.

At Step S140, the sub-program executes the first and second sub-programs to calculate the angles θnav1 and θnav2 (FIG. 25) and θstr (FIG. 26). At Step S150, the sub-program evaluates θnav1 and θstr and performs a determination process to change the control applied to the right headlamp 110R (the left headlamp 110L).

The embodiment provides θnav1 with four threshold values. Specifically, threshold value Rin starts the start point control applied to the right headlamp 110R at the entry into a right curve. Threshold value Rout starts the end point control applied to the left headlamp 110L at the exit from a right curve. Threshold value Lin starts the start point control applied to the left headlamp 110L at the entry into a left curve. Threshold value Lout starts the end point control applied to the right headlamp 110R at the exit from a left curve. The embodiment configures the four threshold values so as to maintain the magnitude relation of Lin<Lout<0<Rout<Rin.

Under a condition of θnav1>Rin and θnav1>θstr (θnav1<Lin and θnav1<θstr), the sub-program proceeds to Step S160 to perform the start point control to be described. The start point control is provided as mode change control from the steering angle control mode to the navigation-cooperative control mode.

Under a condition of θnav1>Lout and θnav1>θstr (θnav1<Rout and θnav1<θstr), the sub-program proceeds to Step S170 to perform the end point control to be described. The end point control is provided as mode change control from the navigation-cooperative control mode to the steering angle control mode.

When the above-mentioned two conditions are not satisfied, the sub-program proceeds to Step S180 to perform the steering angle control mode.

Figure 28:
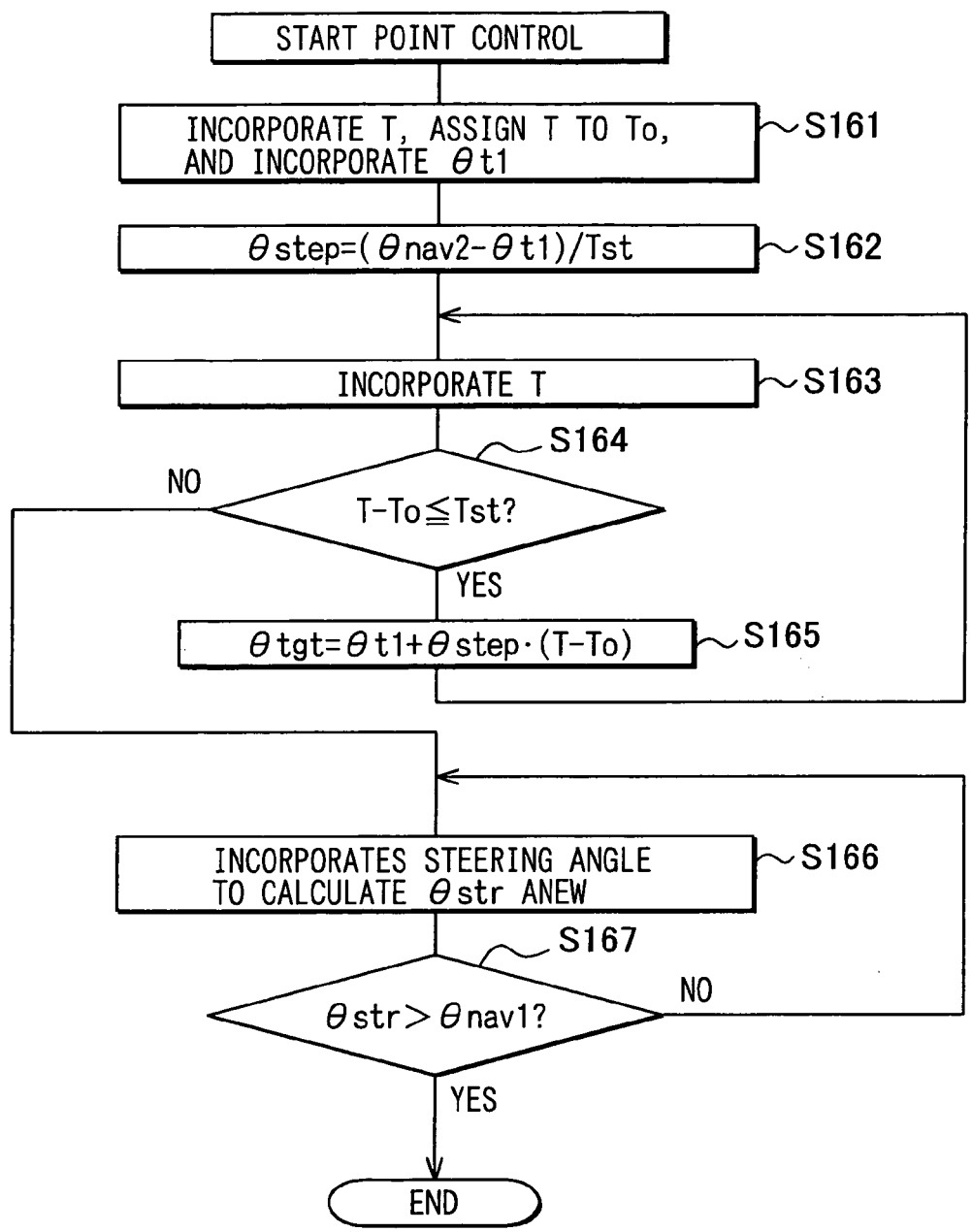
FIG. 28 is a flowchart showing a control procedure for start point control according to embodiment 6.

The control flowchart in FIG. 28 is used to describe the detail of the start point control at Step S160 as mentioned above.

At Step S161, the sub-program incorporates the current time T as a time to start the start point control and assigns the current time T to a start time To. At the start time To, the sub-program incorporates a swivel angle θt1 set by a swivel apparatus 12R. The swivel angle θt1 becomes the first transient swivel angle when the start point control starts. At Step S162, the sub-program finds an increment θstep per unit time by finding a difference between θnav1 as the first final swivel angle and θt1 as the first transient swivel angle Δθ1 and dividing the difference by a first transit time Tst.

At Step S163, the sub-program incorporates the current time T. At Step S164, the sub-program determines whether or not an elapsed time from the start time To to the current time T falls within the range of the first transit time Tst. When the elapsed time falls within the range of the first transit time Tst, the sub-program calculates a target swivel angle θtgt, i.e., a swivel angle as control target. The sub-program controls a right swivel apparatus 12R so that the swivel angle of the right headlamp 110R matches the target swivel angle θtgt. According to the embodiment, the sub-program finds the target swivel angle θtgt as shown at Step S165. That is, the sub-program multiplies the increment θstep per unit time by the elapsed time from the start time To to the current time T. The result is added to the first transient swivel angle θt1.

The start point control according to the embodiment calculates the target swivel angle θtgt as mentioned above. In this manner, the swivel angle linearly change from the first transient swivel angle θt1 to the first final swivel angle θstr1 within the first transit time Tst.

After an elapse of the first transit time Tst, the sub-program incorporates the steering angle at Step S166. The sub-program holds the target swivel angle θtgt until a newly calculated θstr exceeds θnav1. The sub-program then terminates the start point control and returns to the control according to the control flowchart as shown in FIG. 27. The embodiment likewise controls the swivel angle of the left headlamp 110L as mentioned above.

Figure 29:
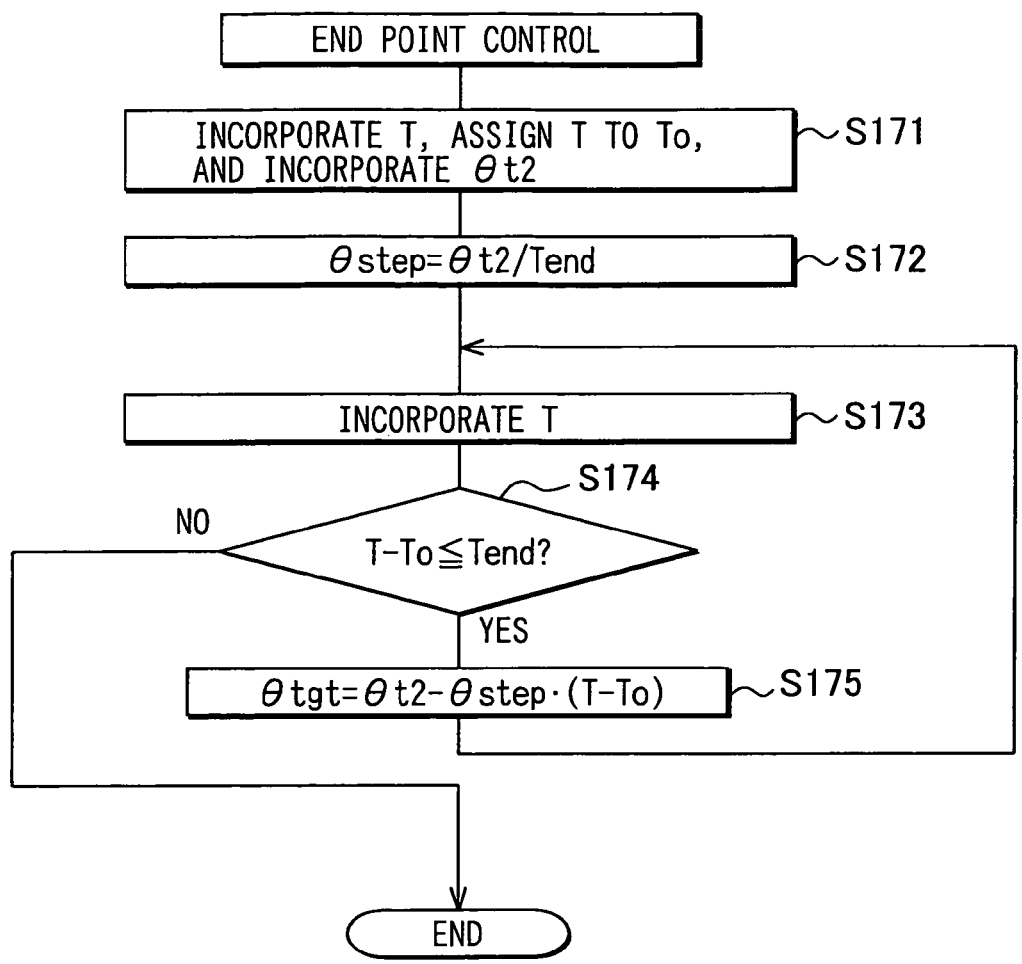
FIG. 29 is a flowchart showing a control procedure for end point control according to embodiment 6.

The control flowchart in FIG. 29 is used to describe the detail of the start point control at Step S170 as mentioned above.

At Step S171, the sub-program incorporates the current time T as a time to start the end point control and assigns the current time T to a start time To. At the start time To, the sub-program incorporates a swivel angle θt2 set by the swivel apparatus 12R. The swivel angle θt2 becomes the second transient swivel angle when the end point control starts. At Step S172, the sub-program divides θt2 as the second transient swivel angle by a second transit time Tend to find the increment θstep per unit time. The embodiment assigns zero to the initial swivel angle as the second final swivel angle.

At Step S173, the sub-program incorporates the current time T. At Step S174, the sub-program determines whether or not an elapsed time from the start time To to the current time T falls within the range of the second transit time Tend. When the elapsed time falls within the range of the second transit time Tend, the sub-program calculates a target swivel angle θtgt, i.e., a swivel angle as control target. The sub-program controls the right swivel apparatus 12R so that the swivel angle of the right headlamp 110R matches the target swivel angle θtgt. According to the embodiment, the target swivel angle θtgt is found as follows. The increment θstep per unit time is multiplied by an elapsed time from the start time To to the current time T. The result is subtracted from the second transient swivel angle θt2.

The end point control according to the embodiment calculates the target swivel angle θtgt as mentioned above. In this manner, the swivel angle linearly changes from the second transient swivel angle θt2 to the second final swivel angle=0 as the initial swivel angle within the second transit time Tend.

The swivel angle of the left headlamp 110L is controlled likewise.

According to the embodiment, as mentioned above, the first transit time Tin is set to three seconds and the second transit time Tend is set to three seconds. Instead, it is also possible to differently set Tin and Tend. Further, for example, an instrument panel in the vehicle 100 can be provided with an adjustment unit electrically connected to the light distribution control ECU 30. The adjustment unit can be used to be capable of adjusting the first transit time Tin or the second transit time Tend. When the transit times Tin and Tend are configured to be adjustable within the range of one to five seconds according to preferences, the optical axis control can be provided according to various drivers' preferences. Further, the transit times Tin and Tend can be varied in interlock with an illuminance adjustment unit for an illumination apparatus to illuminate the instrument panel, for example. Illumination settings on the instrument panel closely correlate with the driver's vision characteristics. Therefore, when the transit times Tin and Tend are changed in interlock with illumination settings on the instrument panel, it is possible to provide appropriate optical axis control reflecting the driver's vision characteristics.

Figure 30:
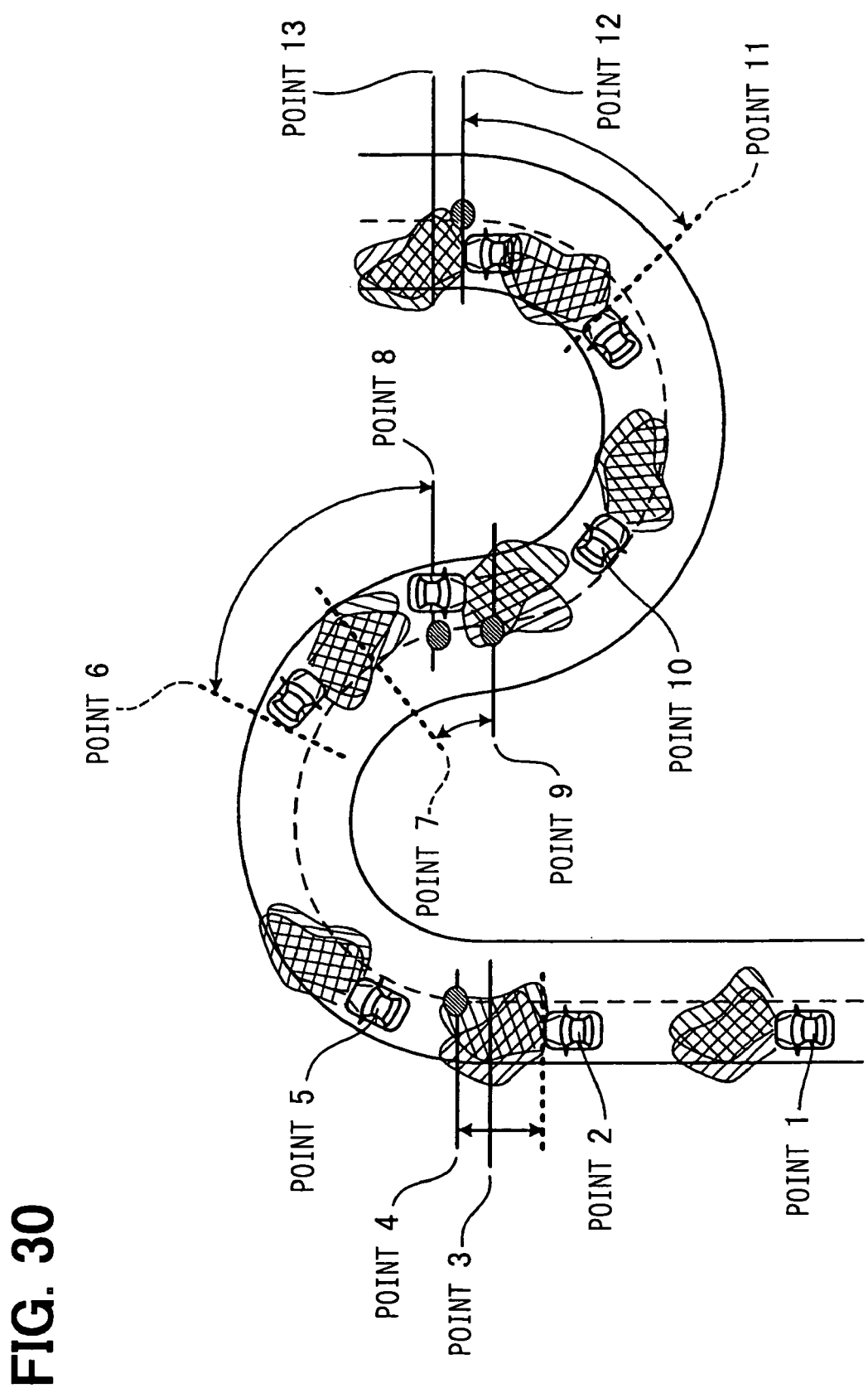
FIG. 30 is an explanatory diagram showing an S-shaped curve according to embodiment 6.

An S-curved traveling pattern in FIG. 30 is used as an example to describe the control based on the above-mentioned control flowcharts as shown in FIGS. 27 through 29. The S-shaped curve is a composite curve resulting from combining a first right curved region from a point 4 to a point 8 with a second left curved region from the point 8 to a point 12 using the point 8 as an inflection point.

Figure 31:
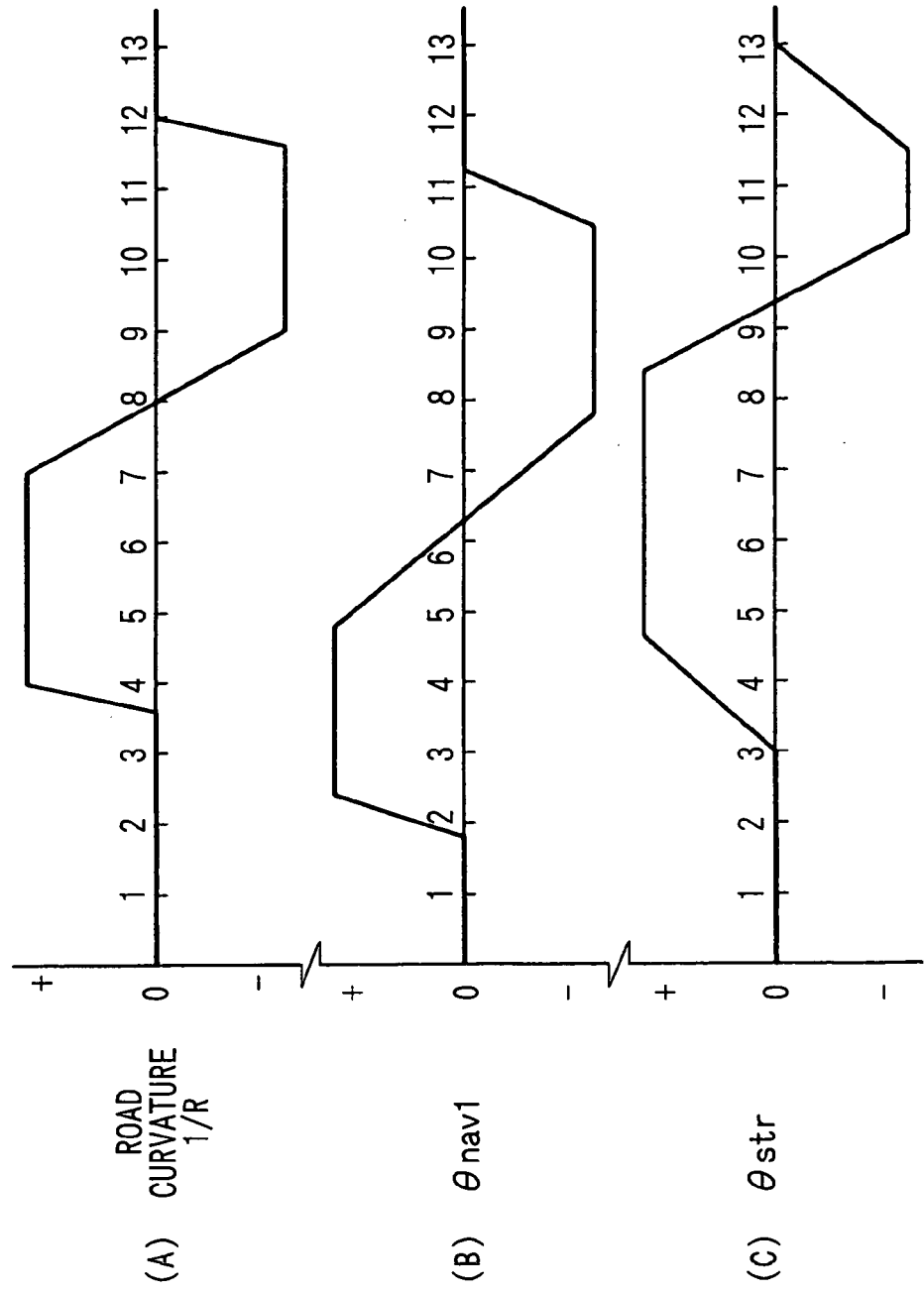
FIG. 31 presents graphs showing changes in road curvature (A), $\theta nav1$ (B), and $\theta str$ (C) at the S-shaped curve according to embodiment 6.

As shown in FIG. 31, the S-shaped curve allows a road curvature (A), θnav1 (B) and θstr (C) to vary.

As shown in (A) in FIG. 31, the road curvature is almost zero from the point 1 to a position before the point 4. The road curvature starts increasing from the position before the point 4 and becomes an approximately constant positive value after the point 4. The road curvature decreases from a point 7, reaches a zero cross point at a point 8, and decreases up to a point 9. The road curvature becomes an approximately constant negative value after the point 9. The road curvature starts increasing from a position before a point 12 and approaches almost zero at the point 12. In the drawing, an abscissa defines positions in the traveling direction of the road. An ordinate defines the road curvature (1/R) assuming values on the right curved side to be positive values.

FIG. 31 shows how θnav1 to be calculated by the first sub-program varies in (B). Here, an abscissa represents positions in the road direction. An ordinate represents the magnitude of θnav1 assuming values on the right curved side to be positive values.

The light distribution control ECU 30 calculates θnav1. When the vehicle reaches the point 2 before the vicinity of the point 4 where the right curve begins, the light distribution control ECU 30 can obtain a road shape before the point 4 belonging to the right corner section. Accordingly, θnav1 calculated by the first sub-program starts increasing from almost zero at the point 2 before the point 4 as an inflection point.

As shown in the drawing, the vehicle may reach a point 5 before the vicinity of the point 8 as an inflection point from the right curve to the left curve. In this case, the light distribution control ECU 30 can obtain a road shape before the point 8 as an inflection point. Accordingly, the angle θnav1 calculated by the first sub-program starts decreasing after the point 5 before the point 8. The angle θnav1 reaches the zero cross point at a point 6, continues to decrease, and reaches an approximately constant negative value near the point 8.

Thereafter, as shown in (B) of FIG. 31, the light distribution control ECU 30 can obtain a road shape before the point 8 as a curve end point at an intermediate point between points 10 and 11 before the point 12 as a curve end point for the left curve. Accordingly, the angle θnav1 calculated by the first sub-program starts increasing after the vicinity of the intermediate point between the points 10 and 11. The angle θnav1 becomes almost zero when the vehicle reaches the point 11.

FIG. 31 shows how the steering-angle-estimated traveling direction θstr to be calculated by the second sub-program varies in (C). That is, the angle θstr starts increasing after a point 3 before the point 4 and reaches an approximately constant positive value after the point 4. The angle θstr starts decreasing around an intermediate between the points 8 and 9 and reaches an approximately constant negative value after the point 10. Thereafter, the angle θstr starts increasing before the point 12 and becomes zero in the vicinity of a point 13.

Figure 32:
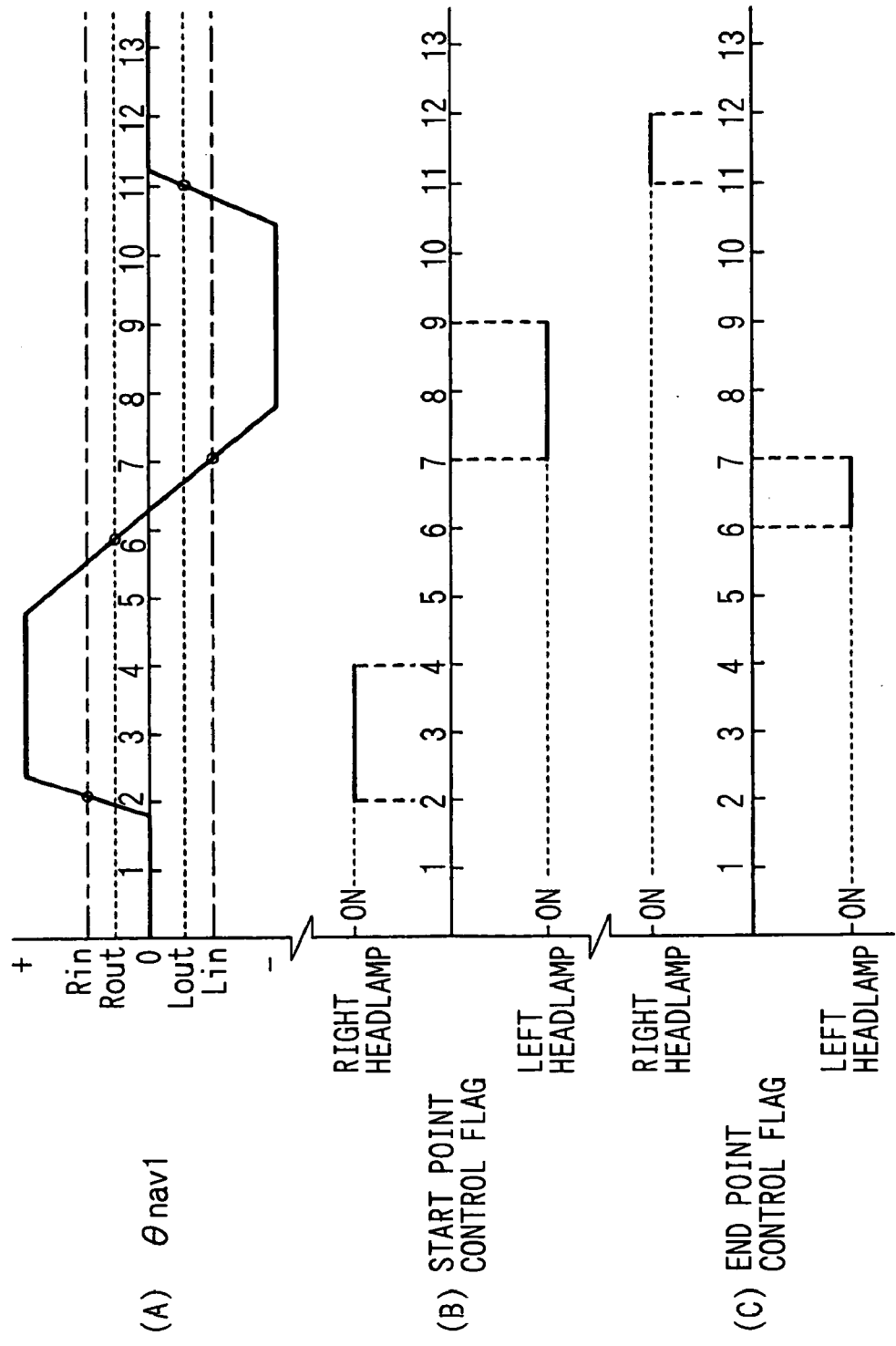
FIG. 32 presents graphs showing θnav1 (A) at the S-shaped curve according to embodiment 6, a start point control flag (B), and an end point control flag (C) with reference to θnav1.

The embodiment provides θnav1 with four threshold values as shown in FIG. 32. Specifically, as mentioned above, threshold value Rin starts the start point control applied to the right headlamp 110R at the entry into a right curve. Threshold value Rout starts the end point control applied to the left headlamp 110L at the exit from a right curve. Threshold value Lin starts the start point control applied to the left headlamp 110L at the entry into a left curve. Threshold value Lout starts the end point control applied to the right headlamp 110R at the exit from a left curve. The embodiment configures the four threshold values so as to maintain the magnitude relation of Lin<Lout<0<Rout<Rin.

As shown in FIGS. 31 and 32, the relation θnav1>Rin and θnav1>θstr is satisfied at the points 2 through 4. Accordingly, the start point control is performed for the right headlamp 110R (see (B) of FIG. 32). The point 4 according to the embodiment represents a point where the vehicle 100 reaches after passing through the point 2 with a lapse of the first transit time Tst.

The relation θnav1<Lin and θnav1<θstr is satisfied at the points 7 through 9. Accordingly, the start point control is performed for the left headlamp 110L (see (B) of FIG. 32). The point 9 according to the embodiment represents a point where the vehicle 100 reaches after passing through the point 4 with a lapse of the first transit time Tst.

The relation θnav1<Rout and θnav1<θstr is satisfied at the points 6 and 7. Accordingly, the end point control is performed for the left headlamp 110L (see (C) of FIG. 32).

The relation θnav1>Lout and θnav1>θstr is satisfied at the points 11 and 12. Accordingly, the end point control is performed for the right headlamp 110R (see (C) of FIG. 32).

The vehicle headlamp apparatus 1 according to the embodiment provides the right headlamp 110R with the navigation-cooperative control mode at the points 2 through 4 and the points 11 and 12 and with the steering angle control mode at the other points and positions. The vehicle headlamp apparatus 1 provides the left headlamp 110L with the navigation-cooperative control mode at the points 6 through 9 and with the steering angle control mode at the other points and positions.

Figure 33:
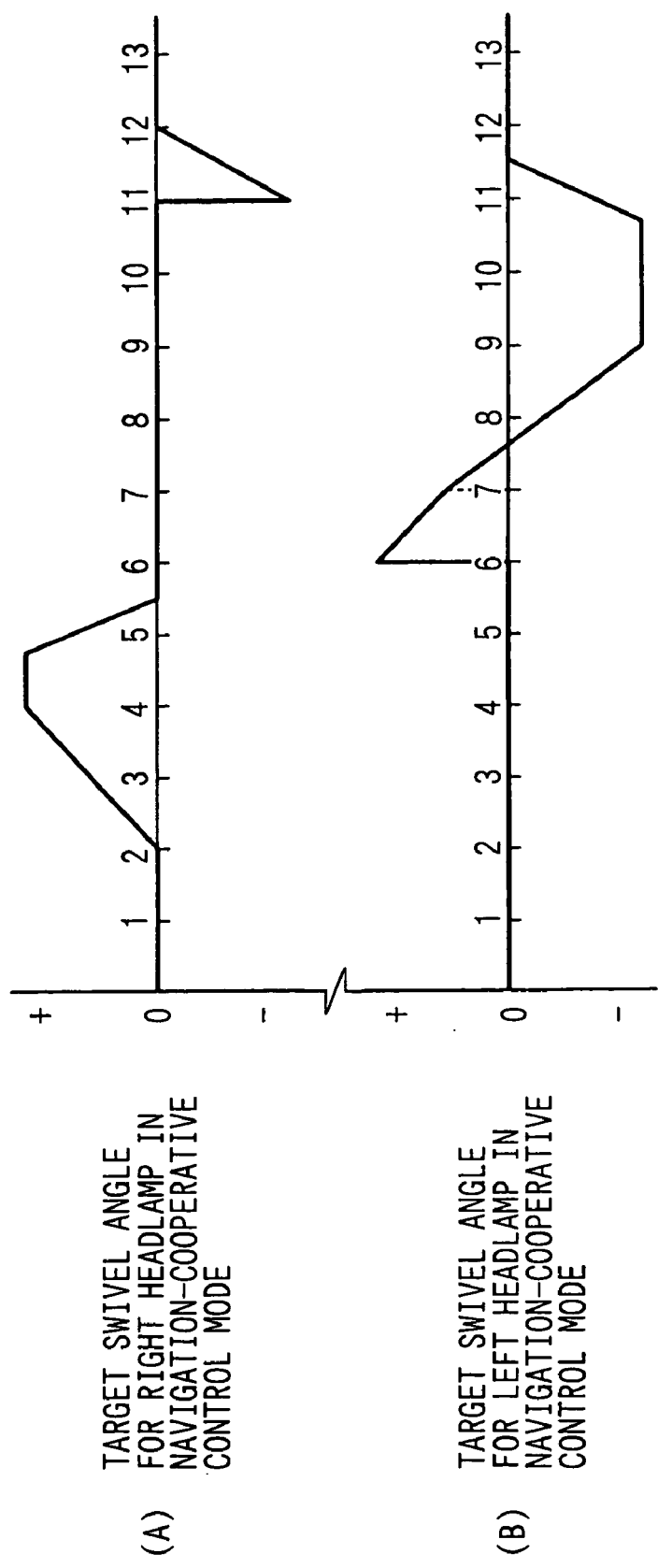
FIG. 33 presents graphs showing swivel angles (right headlamp (A) and left headlamp (B)) under navigation-cooperative control at the S-shaped curve according to embodiment 6.

FIG. 33 shows how each headlamp 110 is assigned the swivel angle in the navigation-cooperative control mode. The swivel angle of the right headlamp 110R is shown in (A). The swivel angle of the left headlamp 110L is shown in (B).

Figure 34:
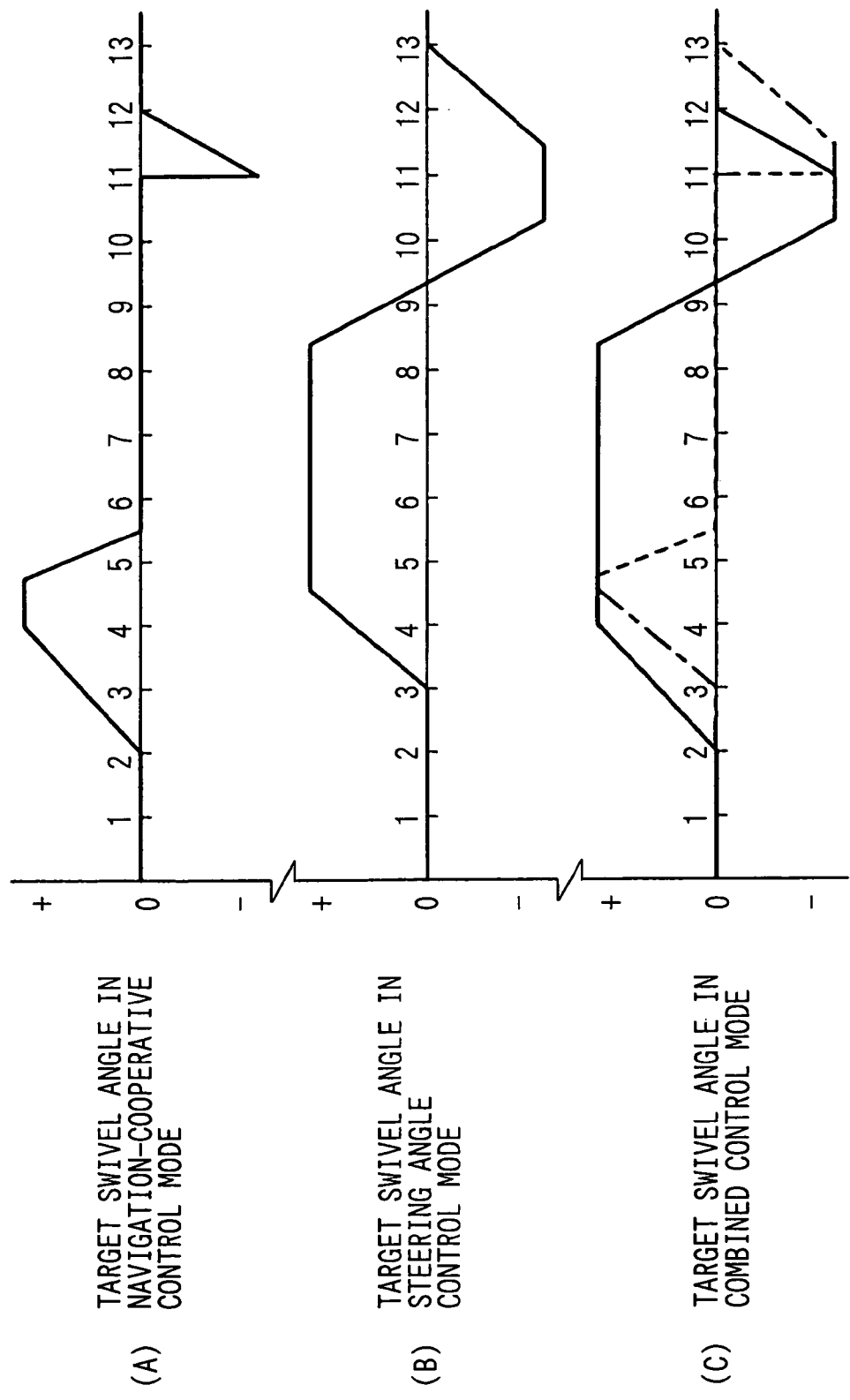
FIG. 34 presents graphs showing a swivel angle under navigation-cooperative control (A), a swivel angle under steering angle control (B), and a control swivel angle under one-side control (C) for the right headlamp at the S-shaped curve according to embodiment 6.

As a result, as shown in (C) of FIG. 34, the swivel angle of the right headlamp 110R results from a combination of (i) regions for performing the navigation-cooperative control mode at the points 2 through 4 and the points 11 and 12 ((A) of FIG. 34) and (ii) regions for performing the steering angle control mode elsewhere ((B) of FIG. 34).

As shown in (C) of FIG. 35, the swivel angle of the left headlamp 110L results from a combination of (i) regions for performing the navigation-cooperative control mode at the points 6 through 9 ((A) of FIG. 35) and (ii) regions for performing the steering angle control mode elsewhere ((B) of FIG. 35).

The embodiment exemplifies so-called "reversed control (or two-side control)" that defines an optical axis adjustment range for each headlamp 110 in left and right regions centered at the vehicle axis 101 as a traveling axis of the vehicle 100. Instead, it may be preferable to provide so-called "pulsating control (or one-side control)" that limits the optical axis adjustment range only in a region extending outward with reference to the vehicle's traveling axis. In this case, the swivel angles of the headlamps 110 in (C) of FIG. 34 and (C) of FIG. 35 are limited as shown in (C) of FIG. 36 and (C) of FIG. 37, respectively. That is, the swivel angle of the right headlamp 110R is limited to the right range (+side). The swivel angle of the left headlamp 110L is limited to the left range (−side).

Further, the vehicle headlamp apparatus 1 can be constructed to adjust swivel angles of the headlamps 110R and 110L only when the navigation system 200 provides route guidance in process. In this case, appropriate optical axis adjustment is available even when the navigation system 200 outputs road type "intersection" for the above-mentioned first node, for example. That is, it is possible to select the route targeted for the route guidance out of a plurality of routes branching from the "intersection." The appropriate navigation-estimated traveling directions θnav1 and θnav2 can be calculated based on the second and third nodes and the second and third arcs (see FIG. 25) on that route.

Embodiment 7

Based on embodiment 6, embodiment 7 adds Step S150$a$ for determination (or conditional expression) to enable the navigation-cooperative control mode as shown in FIG. 38.

At Step S150$a$ for determination in this embodiment, the sub-program first finds variation Δθnav1 for navigation-estimated traveling direction θav1 within the unit time of 50 milliseconds. The sub-program determines the magnitude relation between this Δθnav1 and a predefined threshold value. According to the embodiment, the navigation-cooperative control mode is not performed when Δθnav1 is greater than the threshold value of 10 degrees. This is because the reliability of θnav1 may be assumed to be low when Δθnav1, the variation of the navigation-estimated traveling direction θnav1, is greater than the threshold value.

The other construction considerations and working effects are similar to those of embodiment 6.

Furthermore, a variation for turning Rnav1 based on navigation output may be used as the navigation output reliability. This Rnav1 denotes a turning radius of a road ahead based on navigation output and is used as a constituent value for θnav1. In this case, the sub-program finds variation Δ(1/Rnav1) of the curvature (1/Rnav1) for the navigation within the unit time of 50 milliseconds, for example. The sub-program determines the magnitude relation between this Δ(1/Rnav1) and a predefined threshold value. For example, the navigation-cooperative control mode is not performed when Δ(1/Rnav1) is smaller than the threshold value of (1/20(m)). This is because the reliability of curvature calculation results for the navigation may be assumed to be low when Δ(1/Rnav1), the variation of the curvature for the navigation, is greater than the threshold value.

Further, Step S150$a$ for determination may incorporate an acquisition count for GPS signals used by the position detection sensor for positioning and determine whether or not the acquisition count is smaller than a threshold value of three. In this case, the navigation-cooperative control mode is canceled when the acquisition count for GPS signals is small, causing a possibility of insufficient positioning accuracy provided by a global positioning system. This makes it possible to help prevent inappropriate optical axis adjustment due to the navigation-cooperative control mode that may result from insufficient positioning accuracy for vehicle positions.

Furthermore, Step S150$a$ for determination may determine whether or not a distance between the following vehicle positions becomes greater than or equal to a threshold value of 10 m. That is, one vehicle position is measured by a self navigation system composed of a combination of a gyro sensor and a vehicle speed sensor. The other vehicle position is measured by the global positioning system. There may be a long distance between the vehicle position measured by the self navigation system and the vehicle position measured by the global positioning system. In such case, the position detection sensor may not ensure sufficient positioning accuracy for vehicle positions. When the navigation-cooperative control mode is constructed not to be performed in this case, it is possible to help prevent the optical axis direction of the headlamp 110 from being adjusted incorrectly.

Moreover, an evaluation value may be used to represent the position accuracy of the above-mentioned electronic map information to be referenced to output the road data out of data stored in the map database. Step S150$a$ for determination may determine whether or not the evaluation value becomes smaller than the threshold value. There may be a case where the evaluation value is too small to sufficiently ensure the position accuracy of the electronic map information. In this case, canceling the navigation-cooperative control mode makes it possible to help prevent the optical axis direction of the headlamp 110 from being adjusted incorrectly.

An example of the evaluation value is the degree of reliability that is provided for each position data in the electronic map information to indicate the position accuracy. Another example of the evaluation value available is a level provided for the road type data to indicate the position accuracy. Generally, the electronic map information contains different position accuracies according to road types. It is possible to use the level provided correspondingly to the road type data as the evaluation value.

Still further, it may be preferable to combine at least two determinations from the above-mentioned Steps S150$a$ for determination. The navigation-cooperative control mode can be canceled when the logical multiplication or addition produces a positive result. In this case, it is possible to provide more appropriate timing to cancel the navigation-cooperative control mode and more appropriate control over a headlamp optical axis adjustment apparatus.

It will be obvious to those skilled in the art that various changes may be made in the above-described embodiments of the present invention. However, the scope of the present invention should be determined by the following claims.

What is claimed is:

1. A vehicle headlamp apparatus for horizontally swiveling a headlamp of a vehicle, the apparatus recognizing (i) information on shape of a travel road, on which the vehicle travels, and (ii) a current position of the vehicle on the travel road, the apparatus comprising:

a control unit configured to perform a first operation to control a swivel angle of the headlamp based on a steering angle of the vehicle and a speed of the vehicle and the control unit configured to perform a second operation to control the swivel angle based on the information on shape of the travel road, wherein if the vehicle approaches and enters a curved road, the control unit controls, in the first operation, the swivel angle until the vehicle reaches an entry control start point, which is a predetermined control setup distance short of a curved road start point indicating a beginning of the curved road, and the control unit controls, in the second operation, the swivel angle after the vehicle reaches the entry control start point.

2. The vehicle headlamp apparatus of claim 1, wherein the control unit start, in the second operation, controlling the swivel angle to gradually reach a predetermined target angle after the vehicle reaches the entry control start point and continues controlling the swivel angle until the swivel angle reaches the predetermined target angle, and the control unit controls, in the first operation, the swivel angle after the swivel angle reaches the predetermined target angle.

3. The vehicle headlamp apparatus of claim 1, wherein the control, in the second operation, is a navigation-cooperative control to control the swivel angle based on the information on shape of the travel road;

the information on shape of the travel road includes information on a plurality of navigation points having the curved road start point, a curvature radius of the curved road, and curved road direction information indicating whether the curved road is a right curved road or a left curved road; and the information on shape of the travel road is obtained from a navigation unit having a road database storing the navigation points disposed according to road information.

4. The vehicle headlamp apparatus of claim 1, wherein the predetermined target angle is obtained based on an equation $\theta 1=\sin^{-1}(V1 \times T/2R) \times 180/\pi$, wherein $\theta 1$ is the target swivel angle, R is a curvature radius of the curved road received from a navigation unit, V1 is a speed of the vehicle detected at the entry control start point, and T is a control setup time.

5. A vehicle headlamp apparatus for horizontally swiveling a headlamp of a vehicle, the apparatus recognizing (i) information on shape of a travel road, on which the vehicle travels, and (ii) a current position of the vehicle on the travel road, the apparatus comprising:

a control unit configured to perform a first operation to control a swivel angle of the headlamp based on a steering angle of the vehicle and a speed of the vehicle;

the control unit configured to perform a first operation to control the swivel angle based on the information on shape of the travel road, wherein if the vehicle travels a curved road and exits from the curved road, the control unit controls, in the first operation, the swivel angle until the vehicle reaches an exit control start point, which is a predetermined control setup distance short of a curved road end point indicating an end of the curved road, and the control unit controls, in the second operation, the swivel angle after the vehicle reaches the exit control start point.

6. The vehicle headlamp apparatus of claim 5, wherein the control unit starts, in the second operation, controlling the swivel angle to gradually reach a predetermined target angle after the vehicle reaches the exit control start point and continues controlling the swivel angle until the swivel angle reaches the predetermined target angle, and the control unit controls, in the first operation, the swivel angle after the swivel angle reaches the predetermined target angle.

7. The vehicle headlamp apparatus of claim 5, wherein the control, in the second operation, is a navigation-cooperative control to control the swivel angle based on the information on shape of the travel road;

the information on shape of the travel road includes information on a plurality of navigation points having the curved road end point, a curvature radius of the curved road, and curved road direction information indicating whether the curved road is a right curved road or a left curved road; and the information on shape of the travel road is obtained from a navigation unit having a road database storing the navigation points disposed according to road information.

8. The vehicle headlamp apparatus of claim 5, wherein the predetermined target angle is set to zero.

9. A vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curved road end point to indicate an end of the curved road, a curvature radius of the curved road, and curved road direction information indicating whether the curved road is a right curved road or a left curved road and wherein the control unit is assigned a control setup distance to be used for the navigation-cooperative control;

wherein the control unit recognizes the vehicle to be traveling on a straight road and performs the steering angle control until a position detected by the position detection unit reaches an entry control start point positioned the control setup distance short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle as a target angle for the swivel angle based on the curvature radius and the curved road direction information about the curved road and based on a speed detected by the speed detection unit;

wherein the control unit operates the drive mechanism to gradually change the swivel angle up to the target swivel angle while a position detected by the position detection unit changes from the entry control start point to the curved road start point;

wherein the control unit reexecutes the steering angle control during or after execution of the navigation-cooperative control when a steeiing angle detected by the steering angle detection unit reaches the target swivel angle;

wherein the control unit recognizes the vehicle to be exiting from the curved road and starts the navigation-cooperative control at an exit from the curved road when a position detected by the position detection unit reaches an exit control start point positioned the control setup distance short of the curved road end point;

wherein, under the navigation-cooperative control, the control unit operates the drive mechanism to gradually change the swivel angle up to 0° while a position detected by the position detection unit changes from the exit control start point to the curved road end point; and wherein the control unit reexecutes the steering angle control during or after execution of the navigation-cooperative control when a steering angle detected by the steering angle detection unit reaches 0°.

10. A vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curvature radius of the curved road, and curved road direction information indicating whether the curved road is a right curved road or a left curved road and wherein the control unit is assigned a control setup distance to be used for the navigation-cooperative control;

wherein the control unit recognizes the vehicle to be traveling on a straight road and performs the steering angle control until a position detected by the position detection unit reaches an entry control start point positioned the control setup distance short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle as a target angle for the swivel angle based on the curvature radius and the curved road direction information about the curved road and based on a speed detected by the speed detection unit; and wherein the control unit operates the drive mechanism to gradually change the swivel angle up to the target swivel angle while a position detected by the position detection unit changes from the entry control start point to the curved road start point.

11. A vehicle headlamp apparatus comprising:

a headlamp provided on a front of a vehicle;

a drive mechanism for horizontally moving the headlamp;

a steering angle detection unit for detecting a steering angle of the vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road end point to indicate an end of a curved road out of the plurality of navigation points, a curvature radius of the curved road, and curved road direction information indicating whether the curved road is a right curved road or a left curved road and wherein the control unit is assigned a control setup distance to be used for the navigation-cooperative control;

wherein the control unit performs the steering angle control until a position detected by the position detection unit reaches an exit control start point positioned the control setup distance short of the curved road end point;

wherein the control unit recognizes the vehicle to be exiting from the curved road and stars the navigation-cooperative control at an exit from the curved road when a position detected by the position detection unit reaches the exit control start point; and wherein, under the navigation-cooperative control, the control unit operates the drive mechanism to gradually change the swivel angle up to 0° while a position detected by the position detection unit changes from the exit control start point to the curved road end point.

12. A vehicle headlamp apparatus comprising:

a headlamp provided on a front of a vehicle;

a drive mechanism for horizontally moving the headlamp;

a steering angle detection unit for detecting a steering angle of thc vehicle;

a position detection unit for detecting a position of the vehicle;

a speed detection unit for detecting a speed of the vehicle;

a navigation unit having a road database which stores a plurality of navigation points disposed according to road information; and a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curved road end point to indicate an end of the curved road, a curvature radius of the curved road, and curved road direction information indicating whether the curved road is a right curved road or a left curved road and wherein the control unit is assigned a control setup time to be used for the navigation-cooperative control;

wherein the control unit finds an assumed entry mileage from a multiplication between a speed detected by the speed detection unit and the control setup time and recognizes the vehicle to be traveling on a straight road and performs the steering angle control until a position detected by the position detection unit reaches an entry control start point positioned the assumed entry mileage short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle as a target angle for the swivel angle based on the curvature radius and the curved road direction information about the curved road and based on a speed detected by the speed detection unit;

wherein the control unit operates the drive mechanism to gradually change the swivel angle up to the target swivel angle while the control setup time elapses;

wherein the control unit reexecutes the steering angle control during or after execution of the navigation-cooperative control when a steering angle detected by the steering angle detection unit reaches the target swivel angle;

wherein the control unit finds an assumed exit mileage from a multiplication between a speed detected by the speed detection unit and the control setup time and recognizes the vehicle to be exiting from the curved road and stars the navigation-cooperative control at an exit from the curved road when a position detected by the position detection unit reaches an exit control start point positioned the assumed exit mileage short of the curved road end point;

wherein, under the navigation-cooperative control, the control unit operates the drive mechanism to gradually change the swivel angle up to 0° while a position detected by the position detection unit changes from the exit control start point to the curved road end point; and wherein the control unit reexecutes the steering angle control during or after execution of the navigation-cooperative control when a current steering angle detected by the steering angle detection unit reaches 0°.

13. A vehicle headlamp apparatus comprising:
a headlamp provided on a front of a vehicle;
a drive mechanism for horizontally moving the headlamp;
a steering angle detection unit for detecting a steering angle of the vehicle;
a position detection unit for detecting a position of the vehicle;
a speed detection unit for detecting a speed of the vehicle;
a navigation unit having a road database which stores a plurality of navigation points disposed according to road information; and
a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road start point to indicate a beginning of a curved road out of the plurality of navigation points, a curvature radius of the curved road, and curved road direction information indicating whether the curved road is a right curved road or a left curved road and wherein the control unit is assigned a control setup time to be used for the navigation-cooperative control;

wherein the control unit finds an assumed mileage from a multiplication between a speed detected by the speed detection unit and the control setup time and recognizes the vehicle to be traveling on a straight road and performs the steering angle control until a position detected by the position detection unit reaches an entry control start point positioned the assumed mileage short of the curved road start point;

wherein the control unit recognizes the vehicle to be entering the curved road and starts the navigation-cooperative control at an entry into the curved road when a position detected by the position detection unit reaches the entry control start point;

wherein, under the navigation-cooperative control, the control unit finds a target swivel angle as a target angle for the swivel angle based on the curvature radius and the curved road direction information about the curved road and based on a speed detected by the speed detection unit; and wherein the control unit operates the drive mechanism to gradually change the swivel angle up to the target swivel angle ($\theta$1) while the control setup time elapses.

14. A vehicle headlamp apparatus comprising:
a headlamp provided on a front of a vehicle;
a drive mechanism for horizontally moving the headlamp;
a steering angle detection unit for detecting a steering angle of the vehicle;
a position detection unit for detecting a position of the vehicle;
a speed detection unit for detecting a speed of the vehicle;
a navigation unit having a road database which stores a plurality of navigation points disposed according to road information; and
a control unit for being capable of selectively performing steering angle control and navigation-cooperative control, wherein the steering angle control operates the drive mechanism based on a steering angle detected by the steering angle detection unit and based on a speed detected by the speed detection unit and controls a swivel angle formed between a forward direction of the vehicle and a radiation direction of the headlamp and wherein the navigation-cooperative control operates the drive mechanism using the navigation unit and controls the swivel angle, wherein the control unit receives, from the navigation unit, a curved road end point to indicate an end of a curved road out of the plurality of navigation points, a curvature radius of the curved road, and curved road direction information indicating whether the curved road is a right curved road or a left curved road and wherein the control unit is assigned a control setup time to he used for the navigation-cooperative control;

wherein the control unit finds an assumed mileage from a multiplication between a speed detected by the speed detection unit and the control setup time and performs the steering angle control until a position detected by the position detection unit reaches an exit control start point positioned the assumed mileage short of the curved road end point;

wherein the control unit recognizes the vehicle to be exiting from the curved road and starts the navigation-cooperative control at an exit from the curved road when a position detected by the position detection unit reaches the exit control start point; and wherein, under the navigation-cooperative control, the control unit operates the drive mechanism to gradually change the swivel angle up to 0° while a position detected by the position detection unit changes from the exit control start point to the curved road end point.

15. The vehicle headlamp apparatus according to claim 9,
wherein the control unit is assigned a control setup time to be used for the navigation-cooperative control; and
wherein, under the navigation-cooperative control at the entry into the curved road, the control unit finds the target swivel angle ($\theta 1$) from $\theta 1 = \sin^{-1}(V \times T/2R)$, where R is the curvature radius for the curved road, V is a position detected by the speed detection unit, and T is the control setup time.

16. The vehicle headlamp apparatus according to claim 12,
wherein, under the navigation-cooperative control at the entry into the curved road, the control unit finds the target swivel angle ($\theta 1$)
from $\theta 1 = \sin^{-1}(V \times T/2R)$, where R is the curvature radius for the curved road, V is a position detected by the speed detection unit, and T is the control setup time.

17. The vehicle headlamp apparatus according to claim 9,
wherein, under the navigation-cooperative control, which is started when the position detected by the position detection unit reaches the entry control start point, the control unit finds a vehicle's mileage (x) from the entry control start point towards the curved road start point using x=V×t and finds a transient swivel angle ($\Delta\theta 1$) for changing the swivel angle to the target swivel angle ($\theta 1$) using $\Delta\theta 1 = \theta 1 \times x/L$, where t is an elapsed time from a time point when a position detected by the position detection unit reaches the entry control start point, V is a speed detected by the speed detection unit, and L is the control setup distance; and wherein the control unit operates the drive mechanism to vary the swivel angle until the vehicle's mileage reaches the control setup distance so that the swivel angle at each of the elapsed times successively matches the transient swivel angle.

18. The vehicle headlamp apparatus according to claim 17,
wherein the control unit performs the steering angle control until the vehicle's mileage reaches the control setup distance when a steering angle detected by the steering angle detection unit exceeds the transient swivel angle.

19. The vehicle headlamp apparatus according to claim 9,
wherein, under the navigation-cooperative control, which is started when the position detected by the position detection unit reaches the exit control start point, the control unit finds a vehicle's mileage (x) from the exit control start point towards the curved road end point using x=V×t and finds a transient swivel angle ($\Delta\theta 2$) for changing the swivel angle from a return swivel angle ($\theta 2$) to 0° using $\Delta\theta 2 = \theta 2 \times (1-x/L)$, where t is an elapsed time from a time point when a position detected by the position detection unit reaches the exit control start point, V is a speed detected by the speed detection unit, L is the control setup distance, and the return swivel angle is a steering angle detected by the steering angle detection unit at a time point when a position detected by the position detection unit reaches the exit control start point; and wherein the control unit operates the drive mechanism to vary the swivel angle until the vehicle's mileage reaches the control setup distance so that a swivel angle's return amount at each of the elapsed times successively matches the transient swivel angle.

20. The vehicle headlamp apparatus according to claim 19,
wherein the control unit performs the steering angle control until the vehicle's mileage reaches the control setup distance when a steering angle detected by the steering angle detection unit becomes smaller than the transient swivel angle.

21. The vehicle headlamp apparatus according to claim 12,
wherein, under the navigation-cooperative control, which is started when the position detected by the position detection unit reaches the entry control start point, the control unit finds a transient swivel angle ($\Delta\theta 1$) for changing the swivel angle to the target swivel angle ($\theta 1$) using $\Delta\theta 1 = \theta 1 \times t/T$, where t is an elapsed time since a position detected by the position detection unit reaches the entry control start point, and T is the control setup time; and wherein the control unit operates the drive mechanism to vary the swivel angle until the elapsed time reaches the control setup time so that the swivel angle at each of the elapsed times successively matches the transient swivel angle.

22. The vehicle headlamp apparatus according to claim 21,
wherein the control unit performs the steering angle control until the elapsed time reaches the control setup rime when a steering angle detected by the steering angle detection unit exceeeds the transient swivel angle.

23. The vehicle headlamp apparatus according to claim 12,
wherein, under the navigation-cooperative control, which is started when the position detected by the position detection unit reaches the exit control start point, the control unit finds a transient swivel angle ($\Delta\theta 2$) for changing the swivel angle from a return swivel angle ($\theta 2$) to 0° using $\Delta\theta 2 = \theta 2 \times (1-t/T)$, where t is an elapsed time since a position detected by the position detection unit reaches the exit control start point, T is the control setup rime, and the return swivel angle is a steering angle detected by the steering angle detection unit at a time point when a position detected by the position detection unit reaches the exit control start point; and wherein the control unit operates the drive mechanism to vary the swivel angle until the elapsed time reaches the control setup time so that a swivel angle's return amount at each of the elapsed times successively matches the transient swivel angle.

24. The vehicle headlamp apparatus according to claim 23,
wherein the control unit performs the steering angle control until the elapsed time reaches the control setup time when a steering angle detected by the steering angle detection unit becomes smaller than the transient swivel angle.

25. The vehicle headlamp apparatus according to clam 9,
wherein, under navigation-cooperative control, which is started when the position detected by the position detection unit reaches the entry control start point, the control unit keeps the swivel angle equal to the target swivel angle after the swivel angle reaches the target swivel angle until a steering angle detected by the steering angle detection unit reaches the target swivel angle.

26. The vehicle headlamp apparatus according to clam 9,
wherein, under navigation-cooperative control, which is started when the position detected by the position detection unit reaches the exit control start point, the control unit keeps the swivel angle equal to 0° after the swivel angle reaches 0° until a steering angle detected by the steering angle detection unit reaches 0°.

27. The vehicle headlamp apparatus according to clam 9,
wherein, under navigation-cooperative control, which is started when the position detected by the position detection unit reaches the entry control start point, the control unit assumes incorrect recognition of the curved road to perform the steering angle control when the swivel angle reaches the target swivel angle, then, a specified time elapses or the vehicle travels a specified distance, but a steering angle detected by the steering angle detection unit does not reach the target swivel angle.

28. The vehicle headlamp apparatus according to clam 9,
wherein, under navigation-cooperative control, which is started when the position detected by the position detection unit reaches the exit control start point, the control unit assumes incorrect recognition of the curved road to perform the steering angle control when the swivel angle reaches 0°, then, a specified time elapses or the vehicle travels a specified distance, but a steering angle detected by the steering angle detection unit does not reach 0°.

29. The vehicle headlamp apparatus according to claim 9,
wherein the headlamp includes a pair of a right headlamp and a left headlamp, both of which are provided left and right at the front of the vehicle; and
wherein the control unit provides the steering angle control and the navigation-cooperative control for the pair of the right headlamp and the left headlamp.

30. The vehicle headlamp apparatus according to claims 9,
wherein the headlamp includes a pair of a right headlamp and a left headlamp, both of which are provided left and right at the front of the vehicle; and
wherein the control unit provides the navigation-cooperative control, which is started when the position detected by the position detection unit reaches the entry control start point, for the right headlamp on the curved road being a right curved road winding right of the vehicle and for the left headlamp on the curved road being a left curved road winding left of the vehicle.

31. The vehicle headlamp apparatus according to claim 9,
wherein the headlamp includes a pair of a right headlamp and a left headlamp, both of which are provided left and right at the front of the vehicle; and
wherein the control unit provides the navigation-cooperative control, which is started when the position detected by the position detection unit reaches the exit control start point, for the left headlamp on the curved road being a right curved road winding right of the vehicle and for the right headlamp on the curved road being a left curved road winding left of the vehicle.

32. The vehicle headlamp apparatus according to claim 15,
wherein, while repeatedly providing the steering angle control and the navigation-cooperative control, the control unit determines under navigation-cooperative control, which is started when the position detected by the position detection unit reaches the entry control start point, whether or not a condition $V \times T \leq A$ is satisfied, where A assumed to be a radiation distance of the headlamp, V to be a speed detected by the speed detection unit, and T to be the control setup time, and when the condition is not satisfied, the control unit does not perform the navigation-cooperative control and continues execution of the steering angle control.

33. The vehicle headlamp apparatus according to claim 9,
wherein, while repeatedly providing the steering angle control and the navigation-cooperative control, the control unit, under navigation-cooperative control, which is started when the position detected by the position detection unit reaches the entry control start point, does not perform the navigation-cooperative control and continues execution of the steering angle control when the curved road starts from the curved road start point corresponding to a junction or an intersection.

34. The vehicle headlamp apparatus according to claim 9,
wherein, while repeatedly providing the steering angle control and the navigation-cooperative control, the control unit, under navigation-cooperative control, which is started when the position detected by the position detection unit reaches the exit control start point, does not perform the navigation-cooperative control and continues execution of the steering angle control when the curved road ends with the curved road end point corresponding to a junction or an intersection.

35. A headlamp apparatus provided in a vehicle, the headlamp apparatus comprising:
a drive mechanism for horizontally moving a headlamp of the vehicle;
a navigation unit for providing curved road information including, with respect to a curved road, (i) at least one of a curved road start point and a curved road end point, (ii) a curvature radius, and (iii) curved road direction information; and
a control unit for switching between steering angle control and navigation-cooperative control, wherein a control setup distance is set for the navigation-cooperative control,
wherein in the steering angle control, a swivel angle formed between a forward direction of the vehicle and a radiation direction of the headlamp is controlled by operating the drive mechanism based on a steering angle of the vehicle and a speed of the vehicle and wherein in the navigation-cooperative control, the swivel angle is controlled by operating the drive mechanism using the navigation unit, wherein the control unit executes at least one of a curve entry process and a curve exit process, wherein in the curve entry process, until the vehicle reaches an entry control start point positioned the control setup distance short of the curved road start point, the steering control is caused to take place, and when and after the vehicle reaches the entry control start point, the navigation-cooperative control at an entry into a curved road is caused to take place so that the drive mechanism gradually changes the swivel angle up to a target swivel angle until the vehicle reaches the curved road start point, wherein the target swivel angle is computed based on the curvature radius, the curved road direction information, and a speed of the vehicle, and wherein in the curve exit process, until the vehicle reaches an exit control start point positioned the control setup distance short of the curved road end point, the steering angle control is caused to take place, and when and after the vehicle reached the exit control start point, the navigation-cooperative control at an exit from a curved road is caused to take place so that the drive mechanism gradually changes the swivel angle to 0°.

36. The vehicle headlamp apparatus according to claim 35, wherein the control setup distance for the navigation-cooperative control is computed from a multiplication between a speed of the vehicle and a predetermined control setup time.

37. A vehicle headlamp apparatus for a vehicle, the apparatus comprising:

a control unit including:

a steering angle obtaining unit configured to obtain a steering angle signal, which corresponds to a steering angle of the vehicle, from a steering angle detection unit for detecting the steering angle;

a position obtaining unit configured to obtain a position signal, which corresponds to a position of the vehicle, from a position detection unit for detecting the position;

a speed obtaining unit configured to obtain a speed signal, which corresponds to a speed of the vehicle, from a speed detection unit for detecting the speed; and a navigation information obtaining unit configured to obtain navigational information, which is information on a plurality of navigation points, from a navigation unit having a road database storing the navigation points disposed according to road information, wherein the control unit further includes a swivel angle control unit configured to selectively perform steering angle control and navigation-cooperative control, wherein the steering angle control is to control a swivel angle formed between a forward direction of the vehicle and a radiation direction of the headlamp based on (i) a steering angle signal obtained by the steering angle obtaining unit and (ii) a speed signal obtained by the speed obtaining unit, wherein the navigation-cooperative control is to control the swivel angle based on navigational information obtained from the navigation information obtaining unit, wherein the swivel angle control unit receives, from the navigation information obtaining unit, a curved road start point to indicate a beginning of a curved road out of the plurality of navigation points, a curved road end point to indicate an end of the curved road, a curvature radius of the curved road, and curved road direction information indicating whether the curved road is a right curved road or a left curved road and wherein the swivel angle control unit is assigned a control setup distance to be used for the navigation-cooperative control;

wherein the swivel angle control unit recognizes the vehicle to be traveling on a straight road and performs the steering angle control until a position detected by the position detection unit reaches an entry control start point positioned the control setup distance short of the curved road start point;

wherein the swivel angle control unit recognizes the vehicle to be entering the curved road and starts the navigation-cooperative control at an entry into the curved road when a position detected by the position detection unit reaches the entry control start point;

wherein, under the navigation-cooperative control, the swivel angle control unit finds a target swivel angle as a target angle for the swivel angle based on the curvature radius and the curved road direction information about the curved road and based on a speed detected by the speed detection unit;

wherein the swivel angle control unit operates the drive mechanism to gradually change the swivel angle up to the target swivel angle while a position detected by the position detection unit changes from the entry control start point to the curved road start point;

wherein the swivel angle control unit reexceutes the steering angle control during or after execution of the navigation-cooperative control when a steering angle detected by the steering angle detection unit reaches the target swivel angle;

wherein the swivel angle control unit recognizes the vehicle to be exiting from the curved road and starts the navigation-cooperative control at an exit from the curved road when a position detected by the position detection unit reaches an exit control start point positioned the control setup distance short of the curved road end point;

wherein, under the navigation-cooperative control, the swivel angle control unit operates the drive mechanism to gradually change the swivel angle up to 0° while a position detected by the position detection unit changes from the exit control start point to the curved road end point; and wherein the swivel angle control unit reexecutes the steering angle control during or after execution of the navigation-cooperative control when a steering angle detected by the steering angle detection unit reaches 0°.

38. A vehicle headlamp apparatus comprising:

a control unit including:

a steering angle obtaining unit configured to obtain a steering angle signal, which corresponds to a steering angle of the vehicle, from a steering angle detection unit for detecting the steering angle;

a position obtaining unit configured to obtain a position signal, which corresponds to a position of the vehicle, from a position detection unit for detecting the position;

a speed obtaining unit configured to obtain a speed signal, which corresponds to a speed of the vehicle, from a speed detection unit for detecting the speed; and a navigation information obtaining unit configured to obtain navigational information, which is information on a plurality of navigation points, from a navigation unit having a road database storing the navigation points disposed according to road information, wherein the control unit further includes a swivel angle control unit configured to selectively perform steering angle control and navigation-cooperative control, wherein the steering angle control is to control a swivel angle formed between a forward direction of the vehicle and a radiation direction of the headlamp based on (i) a steering angle signal obtained by the steering angle obtaining unit and (ii) a speed signal obtained by the speed obtaining unit, wherein the navigation-cooperative control is to control the swivel angle based on navigational information obtained from the navigation information obtaining unit, wherein the swivel angle control unit receives, from the navigation information obtaining unit, a curved road start point to indicate a beginning of a curved road out of the plurality of navigation points, a curvature radius of the curved road, and curved road direction information indicating whether the curved road is a right curved road or a left curved road and wherein the swivel angle control unit is assigned a control setup distance to be used for the navigation-cooperative control;

wherein the swivel angle control unit recognizes the vehicle to be traveling on a straight road and performs the steering angle control until a position detected by the position detection unit reaches an entry control start point positioned the control setup distance short of the curved road start point;

wherein the swivel angle control unit recognizes the vehicle to be entering the curved road and starts the navigation-cooperative control at an entry into the curved road when a position detected by the position detection unit reaches the entry control start point;

wherein, under the navigation-cooperative control, the swivel angle control unit finds a target swivel angle as a target angle for the swivel angle based on the curvature radius and the curved road direction information about the curved road and based on a speed detected by the speed detection unit; and wherein the swivel angle control unit operates the drive mechanism to gradually change the swivel angle up to the target swivel angle while a position detected by the position detection unit changes from the entry control start point to the curved road start point.

39. A vehicle headlamp apparatus comprising:

a control unit including:

a steering angle obtaining unit configured to obtain a steering angle signal, which corresponds to a steering angle of the vehicle, from a steering angle detection unit for detecting the steering angle;

a position obtaining unit configured to obtain a position signal, which corresponds to a position of the vehicle, from a position detection unit for detecting the position;

a speed obtaining unit configured to obtain a speed signal, which corresponds to a speed of the vehicle, from a speed detection unit for detecting the speed; and a navigation information obtaining unit configured to obtain navigational information, which is information on a plurality of navigation points, from a navigation unit having a road database storing the navigation points disposed according to road information, wherein the control unit further includes a swivel angle control unit configured to selectively perform steering angle control and navigation-cooperative control, wherein the steering angle control is to control a swivel angle formed between a forward direction of the vehicle and a radiation direction of the headlamp based on (i) a steering angle signal obtained by the steering angle obtaining unit and (ii) a speed signal obtained by the speed obtaining unit, wherein the navigation-cooperative control is to control the swivel angle based on navigational information obtained from the navigation information obtaining unit, wherein the swivel angle control unit receives, from the navigation information obtaining unit, a curved road end point to indicate an end of a curved road out of the plurality of navigation points, a curvature radius of the curved road, and curved road direction information indicating whether the curved road is a right curved road or a left curved road and wherein the swivel angle control unit is assigned a control setup distance to be used for the navigation-cooperative control;

wherein the swivel angle control unit performs the steering angle control until a position detected by the position detection unit reaches an exit control start point positioned the control setup distance short of the curved road end point;

wherein the swivel angle control unit recognizes the vehicle to be exiting from the curved road and starts the navigation-cooperative control at an exit from the curved road when a position detected by the position detection unit reaches the exit control start point; and wherein, under the navigation-cooperative control, the swivel angle control unit operates the drive mechanism to gradually change the swivel angle up to 0° while a position detected by the position detection unit changes from the exit control start point to the curved road end point.

40. A vehicle headlamp apparatus comprising:

a control unit including;

a steering angle obtaining unit configured to obtain a steering angle signal, which corresponds to a steering angle of the vehicle, from a steering angle detection unit for detecting the steering angle;

a position obtaining unit configured to obtain a position signal, which corresponds to a position of the vehicle, from a position detection unit for detecting the position;

a speed obtaining unit configured to obtain a speed signal, which corresponds to a speed of the vehicle, from a speed detection unit for detecting the speed; and a navigation information obtaining unit configured to obtain navigational information, which is information on a plurality of navigation points, from a navigation unit having a road database storing the navigation points disposed according to road information, wherein the control unit further includes a swivel angle control unit configured to selectively perform steering angle control and navigation-cooperative control, wherein the steering angle control is to control a swivel angle formed between a forward direction of the vehicle and a radiation direction of the headlamp based on (i) a steering angle signal obtained by the steering angle obtaining unit and (ii) a speed signal obtained by the speed obtaining unit, wherein the navigation-cooperative control is to control the swivel angle based on navigational information obtained from the navigation information obtaining unit, wherein the swivel angle control unit receives, from the navigation information obtaining unit, a curved road start point to indicate a beginning of a curved road out of the plurality of navigation points, a curved road end point to indicate an end of the curved road, a curvature radius of the curved road, and curved road direction information indicating whether the curved road is a right curved road or a left curved road and wherein the swivel angle control unit is assigned a control setup time to be used for the navigation-cooperative control;

wherein the swivel angle control unit finds an assumed entry mileage from a multiplication between a speed detected by the speed detection unit and the control setup time and recognizes the vehicle to be traveling on a straight road and performs the steering angle control until a position detected by the position detection unit reaches an entry control start point positioned the assumed entry mileage short of the curved road start point;

wherein the swivel angle control unit recognizes the vehicle to be entering the curved road and starts the navigation-cooperative control at an entry into the curved road when a position detected by the position detection unit reaches the entry control start point;

wherein, under the navigation-cooperative control, the swivel angle control unit finds a target swivel angle as a target angle for the swivel angle based on the curvature radius and the curved road direction information about the curved road and based on a speed detected by the speed detection unit;

wherein the swivel angle control unit operates the drive mechanism to gradually change the swivel angle up to the target swivel angle while the control setup time elapses;

wherein the swivel angle control unit reexecutes the steering angle control during or after execution of the navigation-cooperative control when a steering angle detected by the steering angle detection unit reaches the target swivel angle;

wherein the swivel angle control unit finds an assumed exit mileage from a multiplication between a speed detected by the speed detection unit and the control setup time and recognizes the vehicle to be exiting from the curved road and starts the navigation-cooperative control at an exit from the curved road when a position detected by the position detection unit reaches an exit control start point positioned the assumed exit mileage short of the curved road end point;

wherein, under the navigation-cooperative control, the swivel angle control unit operates the drive mechanism to gradually change the swivel angle up to 0° while a position detected by the position detection unit changes from the exit control start point to the curved road end point; and wherein the swivel angle control unit reexecutes the steering angle control during or after execution of the navigation-cooperative control when a current steering angle detected by the steering angle detection unit reaches 0°.

41. A vehicle headlamp apparatus comprising:

a control unit including:

a steering angle obtaining unit configured to obtain a steering angle signal, which corresponds to a steering angle of the vehicle, from a steering angle detection unit for detecting the steering angle;

a position obtaining unit configured to obtain a position signal, which corresponds to a position of the vehicle, from a position detection unit for detecting the position;

a speed obtaining unit configured to obtain a speed signal, which corresponds to a speed of the vehicle, from a speed detection unit for detecting the speed; and a navigation information obtaining unit configured to obtain navigational information, which is information on a plurality of navigation points, from a navigation unit having a road database storing the navigation points disposed according to road information, wherein the control unit further includes a swivel angle control unit configured to selectively perform steering angle control and navigation-cooperative control, wherein the steering angle control is to control a swivel angle formed between a forward direction of the vehicle and a radiation direction of the headlamp based on (i) a steering angle signal obtained by the steering angle obtaining unit and (ii) a speed signal obtained by the speed obtaining unit, wherein the navigation-cooperative control is to control the swivel angle based on navigational information obtained from the navigation information obtaining unit, wherein the swivel angle control unit receives, from the navigation information obtaining unit, a curved road start point to indicate a beginning of a curved road out of the plurality of navigation points, a curvature radius of the curved road, and curved road direction information indicating whether the curved road is a right curved road or a left curved road and wherein the swivel angle control unit is assigned a control setup time to be used for the navigation-cooperative control;

wherein the swivel angle control unit finds an assumed mileage from a multiplication between a speed detected by the speed detection unit and the control setup time and recognizes the vehicle to be traveling on a straight road and performs the steering angle control until a position detected by the position detection unit reaches an entry control start point positioned the assumed mileage short of the curved road start point;

wherein the swivel angle control unit recognizes the vehicle to be entering the curved road and starts the navigation-cooperative control at an entry into the curved road when a position detected by the position detection unit reaches the entry control start point;

wherein, under the navigation-cooperative control, the swivel angle control unit finds a target swivel angle as a target angle for the swivel angle based on the curvature radius and the curved road direction information about the curved road and based on a speed detected by the speed detection unit; and wherein the swivel angle control unit operates the drive mechanism to gradually change the swivel angle up to the target swivel angle ($\theta 1$) while the control setup time elapses.

42. A vehicle headlamp apparatus comprising:

a control unit including:
- a steering angle obtaining unit configured to obtain a steering angle signal, which corresponds to a steering angle of the vehicle, from a steering angle detection unit for detecting the steering angle;
- a position obtaining unit configured to obtain a position signal, which corresponds to a position of the vehicle, from a position detection unit for detecting the position;
- a speed obtaining unit configured to obtain a speed signal, which corresponds to a speed of the vehicle, from a speed detection unit for detecting the speed; and
- a navigation information obtaining unit configured to obtain navigational information, which is information on a plurality of navigation points, from a navigation unit having a road database storing the navigation points disposed according to road information, wherein the control unit further includes a swivel angle control unit configured to selectively perform steering angle control and navigation-cooperative control, wherein the steering angle control is to control a swivel angle formed between a forward direction of the vehicle and a radiation direction of the headlamp based on (i) a steering angle signal obtained by the steering angle obtaining unit and (ii) a speed signal obtained by the speed obtaining unit, wherein the navigation-cooperative control is to control the swivel angle based on navigational information obtained from the navigation information obtaining unit, wherein the swivel angle control unit receives, from the navigation information obtaining unit, a curved road end point to indicate an end of a curved road out of the plurality of navigation points, a curvature radius of the curved road, and curved road direction information indicating whether the curved road is a right curved road or a left curved road and wherein the swivel angle control unit is assigned a control setup time to be used for the navigation-cooperative control;

wherein the swivel angle control unit finds an assumed mileage from a multiplication between a speed detected by the speed detection unit and the control setup time and performs the steering angle control until a position detected by the position detection unit reaches an exit control start point positioned the assumed mileage short of the curved road end point;

wherein the swivel angle control unit recognizes the vehicle to be exiting from the curved road and starts the navigation-cooperative control at an exit from the curved road when a position detected by the position detection unit reaches the exit control start point; and wherein, under the navigation-cooperative control, the swivel angle control unit operates the drive mechanism to gradually change the swivel angle up to 0° while a position detected by the position detection unit changes from the exit control start point to the curved road end point.

* * * * *